US011705060B2

(12) United States Patent
Lee et al.

(10) Patent No.: US 11,705,060 B2
(45) Date of Patent: Jul. 18, 2023

(54) ELECTRONIC DEVICE AND METHOD FOR PREDICTING RESIDUAL IMAGE OF DISPLAY AND COMPENSATING FOR RESIDUAL IMAGE OF THE DISPLAY

(71) Applicant: Samsung Electronics Co., Ltd., Gyeonggi-do (KR)

(72) Inventors: Jaesung Lee, Gyeonggi-do (KR); Taewoong Lee, Gyeonggi-do (KR); Kyungtae Kim, Gyeonggi-do (KR); Kwangtai Kim, Gyeonggi-do (KR); Donghyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/568,288

(22) Filed: Jan. 4, 2022

(65) Prior Publication Data

US 2022/0180806 A1 Jun. 9, 2022

Related U.S. Application Data

(63) Continuation of application No. PCT/KR2021/018090, filed on Dec. 2, 2021.

(30) Foreign Application Priority Data

Dec. 4, 2020 (KR) .................. 10-2020-0168816
Mar. 22, 2021 (KR) .................. 10-2021-0036893

(51) Int. Cl.
*G09G 3/00* (2006.01)
*G06F 1/16* (2006.01)
(Continued)

(52) U.S. Cl.
CPC ......... *G09G 3/3208* (2013.01); *G06F 1/1652* (2013.01); *G09G 3/035* (2020.08);
(Continued)

(58) Field of Classification Search
CPC .. G09G 3/035; G09G 3/20; G09G 2340/0435; G09G 2340/04;
(Continued)

(56) References Cited

U.S. PATENT DOCUMENTS 9,997,096 B2 * 6/2018 Shin ................. G06F 3/1446
10,990,208 B2 * 4/2021 Jung ................. H04M 1/0235
(Continued)

FOREIGN PATENT DOCUMENTS

JP 2005-321702 A 11/2005
KR 10-2016-0114246 A 10/2016
(Continued)

OTHER PUBLICATIONS

International Search Report dated Mar. 3, 2022.
Written Opinion dated Mar. 3, 2022.

*Primary Examiner* — Dismery Mercedes
(74) *Attorney, Agent, or Firm* — Cha & Reiter, LLC

(57) ABSTRACT

An electronic device and method are disclosed. The electronic device includes a housing, a flexible display having a variable display area including: a visible first region, and a second region that is stowable/extendable, a display driver integrated circuit (DDI), and a processor. The processor implements the method, including: when the housing is disposed in a first state in which the second region is stowed, control the flexible display to display a user interface (UI) screen through the first region based on a first driving frequency and a first light emission frequency, control the flexible display to display a compensation image through the second region based on a second driving frequency and a second light emission frequency, wherein the second driving frequency is equal to or less than the first driving frequency, and the second light emission frequency is less than the first light emission frequency.

20 Claims, 41 Drawing Sheets

(51) Int. Cl.
*G09G 3/3291* (2016.01)
*G09G 3/3208* (2016.01)

(52) U.S. Cl.
CPC ..... *G09G 3/3291* (2013.01); *G09G 2320/046* (2013.01); *G09G 2330/021* (2013.01); *G09G 2340/0407* (2013.01); *G09G 2340/0435* (2013.01); *G09G 2354/00* (2013.01)

(58) Field of Classification Search
CPC ..... G09G 2340/0407; G09G 2330/021; G09G 2310/04; G09G 2320/02; G09G 2320/0252; G09G 2320/0242; G09G 2320/0626; G09G 2354/00; G06F 1/1652; G06F 1/1647; G06F 1/1677; G06F 2203/04102
See application file for complete search history.

(56) References Cited

U.S. PATENT DOCUMENTS

| | | | | |
|---|---|---|---|---|
| 11,151,917 | B1* | 10/2021 | Kim | G06F 1/1637 |
| 11,216,138 | B2* | 1/2022 | Yamazaki | G06F 3/0448 |
| 11,222,602 | B2* | 1/2022 | Kim | G09G 3/3266 |
| 11,238,832 | B2* | 2/2022 | An | G09G 5/391 |
| 2006/0194619 | A1 | 8/2006 | Wilcox et al. | |
| 2013/0275910 | A1* | 10/2013 | Kim | G06F 1/1652 |
| | | | | 715/800 |
| 2014/0320479 | A1* | 10/2014 | Kaneko | G09G 3/3648 |
| | | | | 345/212 |
| 2014/0378183 | A1* | 12/2014 | Xiong | G06F 1/1647 |
| | | | | 455/566 |
| 2015/0146069 | A1 | 5/2015 | Yamazaki et al. | |
| 2015/0170607 | A1* | 6/2015 | Shin | G09G 3/3406 |
| | | | | 345/690 |
| 2016/0033999 | A1 | 2/2016 | Browning | |
| 2016/0284272 | A1 | 9/2016 | Her et al. | |
| 2017/0038641 | A1 | 2/2017 | Yamazaki | |
| 2018/0032106 | A1 | 2/2018 | Yu et al. | |
| 2020/0013331 | A1 | 1/2020 | Kobayashi | |
| 2020/0286451 | A1 | 9/2020 | Kim et al. | |
| 2020/0357362 | A1 | 11/2020 | Shin et al. | |
| 2021/0012751 | A1 | 1/2021 | An et al. | |
| 2022/0068220 | A1* | 3/2022 | Kim | G09G 3/3233 |

FOREIGN PATENT DOCUMENTS

| | | |
|---|---|---|
| KR | 10-2018-0014386 A | 2/2018 |
| KR | 10-2019-0071486 A | 6/2019 |
| KR | 10-2019-0110318 A | 9/2019 |
| KR | 10-2020-0070657 A | 6/2020 |
| KR | 10-2020-0108135 A | 9/2020 |
| KR | 10-2020-0128925 A | 11/2020 |
| KR | 10-2257370 B1 | 5/2021 |
| KR | 10-2317295 B1 | 10/2021 |
| WO | 02/47363 A2 | 6/2002 |

* cited by examiner

ELECTRONIC DEVICE AND METHOD FOR PREDICTING RESIDUAL IMAGE OF DISPLAY AND COMPENSATING FOR RESIDUAL IMAGE OF THE DISPLAY

CROSS REFERENCE TO RELATED APPLICATION(S)

This application is a continuation application, claiming priority under § 365 (c), of an International application No. PCT/KR2021/018090, filed on Dec. 2, 2021, which is based on and claims the benefit of a Korean patent application number 10-2020-0168816, filed on Dec. 4, 2020, and Korean patent application number 10-2021-0036893 filed on Mar. 22, 2021, in the Korean Intellectual Property Office, the disclosures of which is incorporated by reference herein in its entirety.

TECHNICAL FIELD

Certain embodiments of the disclosure relate to an electronic device including a flexible display.

BACKGROUND ART

Electronic devices have evolved from simple quadrangular shapes to more diversified shapes. For example, there has been extensive research and development into implementing flexible and/or rollable displays for electronic devices.

For example, an electronic device incorporating a flexible display may be configured as to enable folded, bent, rolled, and/or unfolded configurations, etc.

An organic light emitting diode (OLED) may be utilized a flexible display. For example, a flexible display may have flexible physical characteristics, and pixels within the display panel may be implemented as to include OLEDs.

A display panel including OLEDs may experience issues with "residual image," and "burn-in" phenomenon. The residual image problem may occur because of hysteresis characteristics of the thin film transistor disposed in the pixels. "Burn-in" may occur due to a difference in the operational time (e.g., accumulated light-emitting time) of the OLEDs, with regard to multiple pixels thereof.

Summary

Various embodiments of the disclosure may provide an electronic device including a flexible display, and a method for predicting and/or compensating for potential residual image or burn-in of the flexible display.

Technical problems to be solved in the disclosure are not limited to the above-mentioned technical problems, and other technical problems not mentioned herein can be clearly understood from the following description by those skilled in the art to which the disclosure pertains.

An electronic device is disclosed herein. According to certain embodiments, the electronic device may include a housing, a flexible display having a display area that is visually exposed to an external environment and adjustable in size, including a first region maintained in exposure to the external environment, and a second region extendable to increase the display area visually exposed to the external environment, according a configuration of the housing, a display driver integrated circuit (DDI) configured to drive the flexible display, and a processor, configured to: when the housing is disposed in a first state in which the second region is stowed in the housing, control, via the DDI, the flexible display to display a user interface (UI) screen through the first region based on a first driving frequency and a first light emission frequency, and control, via the DDI, the flexible display to display a compensation image through the second region based on a second driving frequency and a second light emission frequency, wherein the second driving frequency is equal to or less than the first driving frequency, and the second light emission frequency is less than the first light emission frequency.

A method of an electronic device is disclosed. The method according to certain embodiments of the disclosure may be operative in the electronic device including a flexible display, the flexible display having a first region maintained in exposure to an external environment, and a second region extendable to increase a display area exposed to the external environment. The method may include in a first state in which the second region is stowed in a housing of the electronic device, displaying a user interface (UI) screen on the first region, according to a first driving frequency and a first light emission frequency, and displaying a compensation image on the second region, according to a second driving frequency and a second light emission frequency, wherein the second driving frequency is equal to or less than the first driving frequency, and wherein the second light emission frequency is less than the first light emission frequency.

An electronic device and a method according to certain embodiments of the disclosure may predict and/or compensate for the residual image or burin-in phenomenon of a flexible display, thereby reducing the defect of residual image or blur remaining on the screen.

Various other advantageous effects inferred directly or indirectly through the disclosure may be provided.

DETAILED DESCRIPTION

Figure 1:
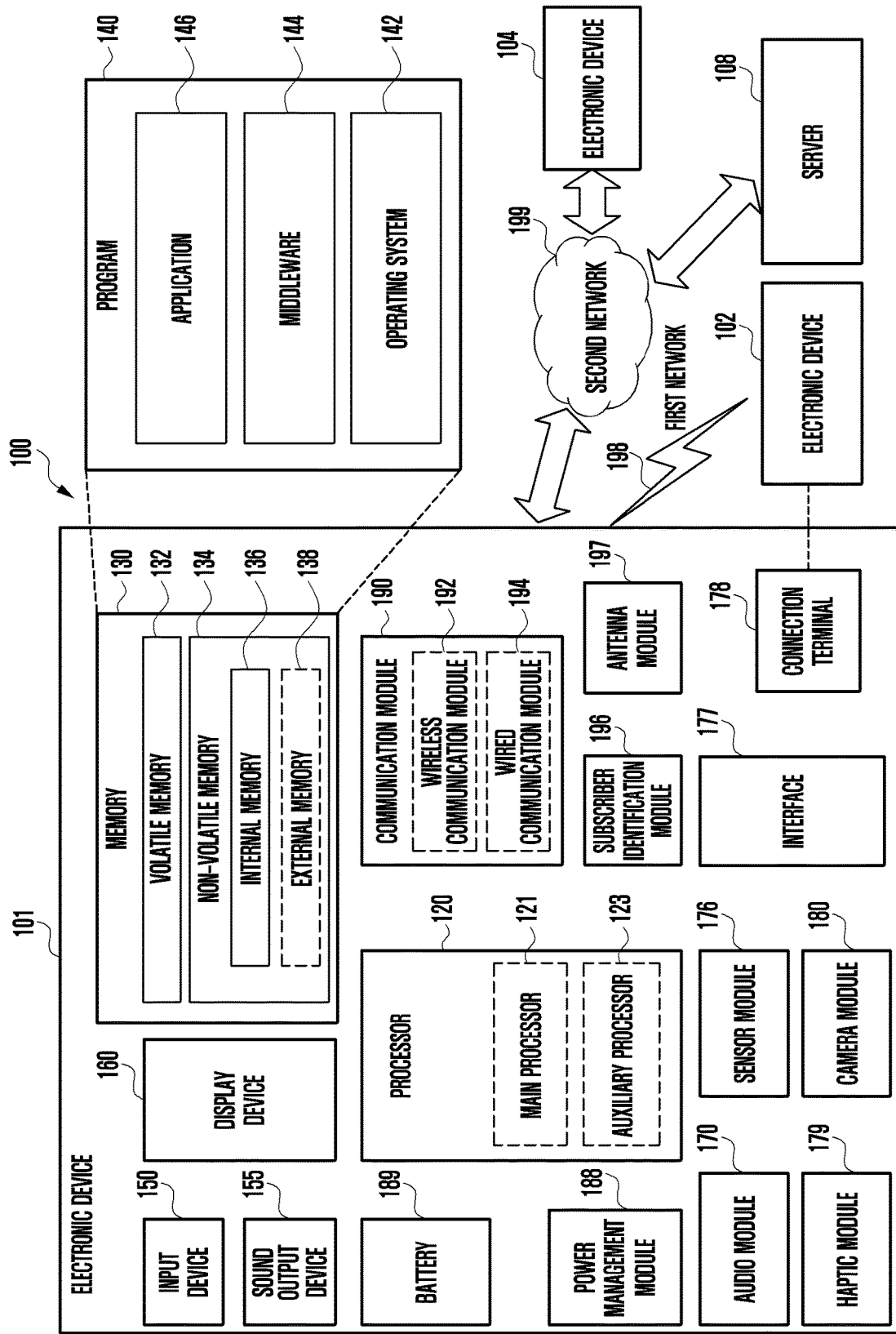
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC). The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
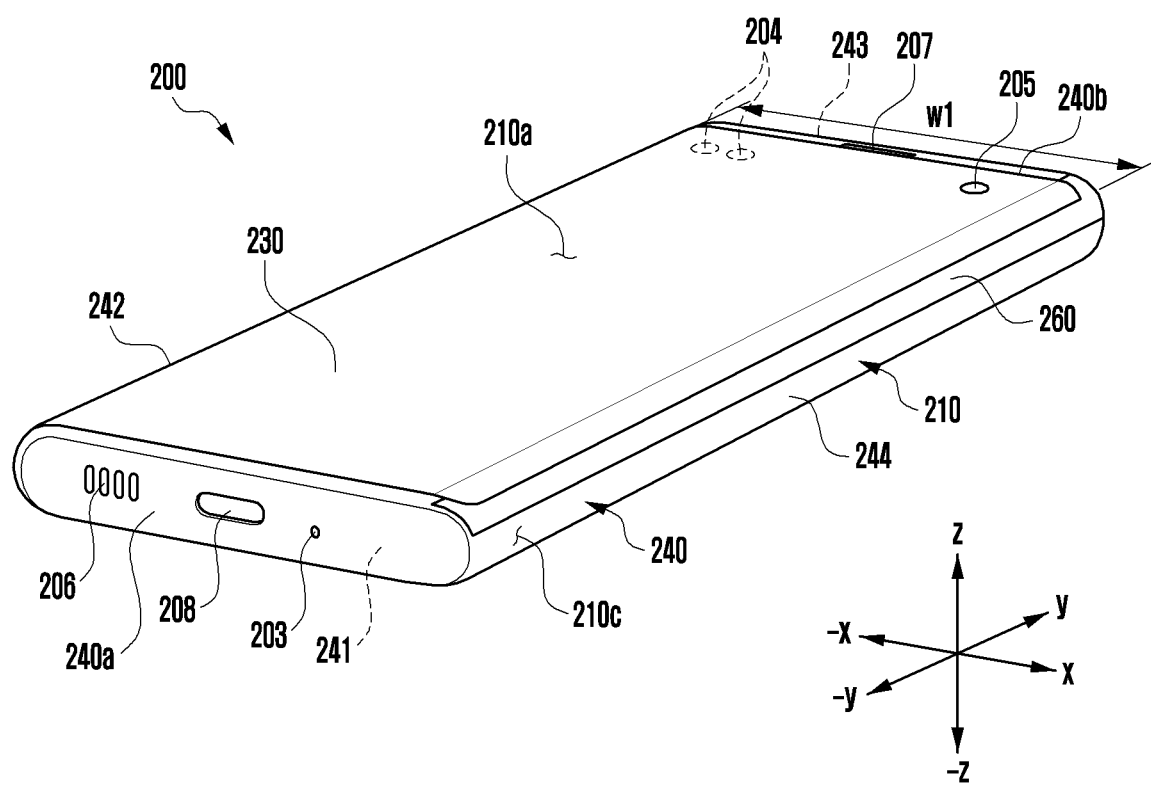
FIG. 2A is a front perspective view of an electronic device showing a first state according to certain embodiments.
Figure 2B:
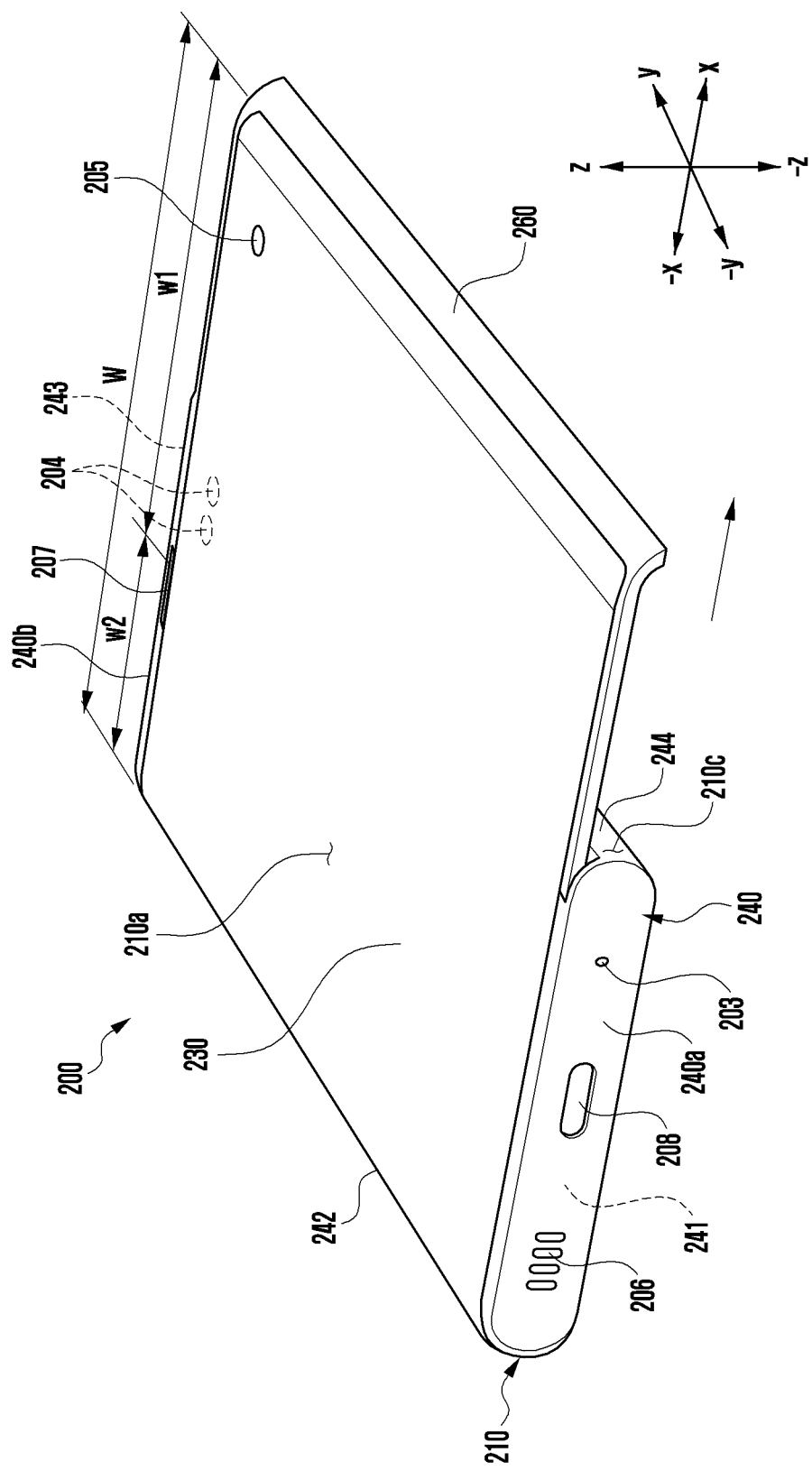
FIG. 2B is a front perspective view of an electronic device showing a second state according to certain embodiments.
Figure 3A:
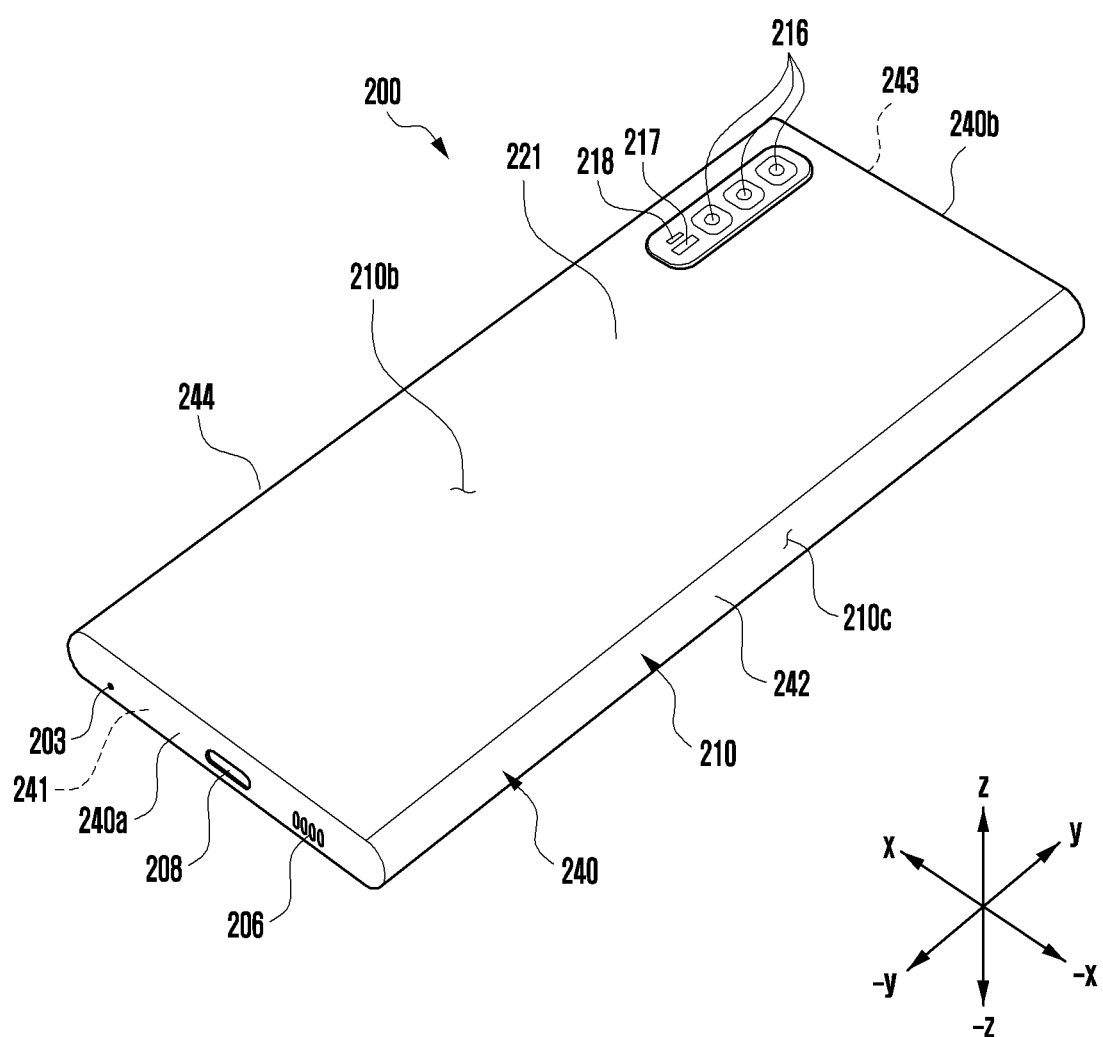
FIG. 3A is a rear perspective view of an electronic device showing a first state according to certain embodiments.
Figure 3B:
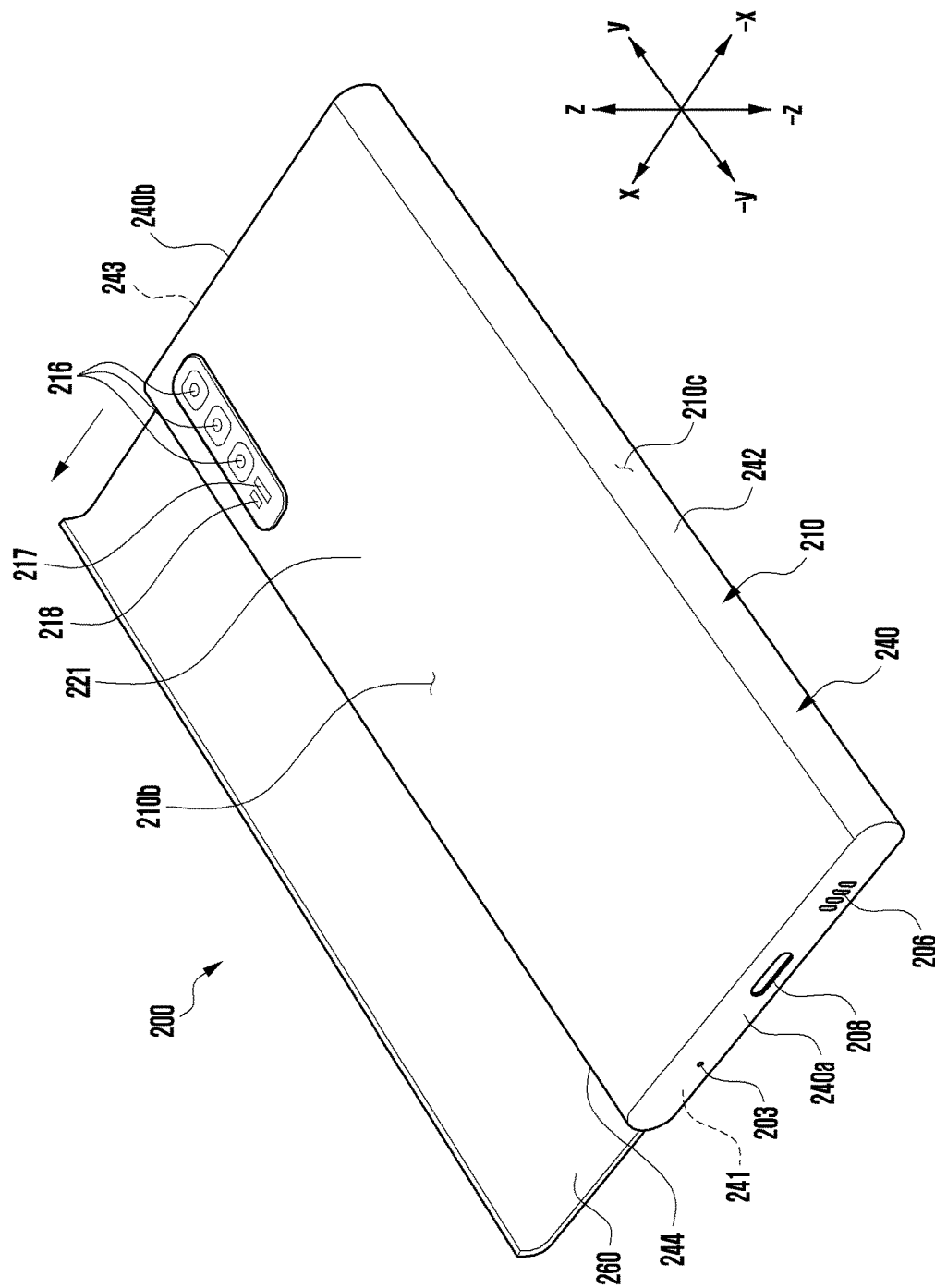
FIG. 3B is a rear perspective view of an electronic device showing a second state according to certain embodiments.

FIGS. 2A and 2B are front perspective views of an electronic device 200 showing a first state and a second state according to certain embodiments herein. FIGS. 3A and 3B are rear perspective views of the electronic device 200 showing a first state and a second state according to certain embodiments herein.

The electronic device 200 in FIG. 2A may be at least partially similar to the electronic device 101 in FIG. 1, or may further include other embodiments of the electronic device.

Referring to FIG. 2A to FIG. 3B, the electronic device 200 may include a housing 240 (e.g., a side frame) and a slide plate 260 which is coupled to the housing 240 so as to be at least partially movable from the housing 240 and supports at least a portion of the flexible display 230 (e.g., the display module 160 in FIG. 1). According to an embodiment, the slide plate 260 may include a bendable hinge rail (e.g., the hinge rail 261 in FIG. 4) coupled to the end thereof. For example, when the slide plate 260 performs a sliding operation from the housing 240, the hinge rail (e.g., the hinge rail 261 in FIG. 4) may move into the inner space (e.g., the inner space 2403 in FIG. 4) of the housing 240 while supporting the flexible display 230. According to an embodiment, the electronic device 200 may include a housing structure 210 which includes a front surface 210a (e.g., a first surface) facing a z-direction (e.g., a third direction), a rear surface 210b (e.g., a second surface) facing a −z-direction (e.g., a fourth direction) opposite to the z-direction, and a side surface 210c surrounding the space between the front surface 210a and the rear surface 210b and at least partially exposed outwards. According to an embodiment, the rear surface 210b may be formed through a rear cover 221 coupled to the housing 240. According to an embodiment, the rear cover 221 may be formed of polymer, coated or colored glass, ceramic, metal (e.g., aluminum, stainless steel (STS), or magnesium), or a combination of at least two of the materials. In an embodiment, the rear cover 221 may be formed integrally with the housing 240. According to an embodiment, the side surface 210c may be disposed so as to be at least partially exposed outwards through the housing 240.

According to certain embodiments, the housing 240 may include a first side surface 241 having a first length, a second side surface 242 extending from the first side surface 241 and having a second length longer than the first length in a direction substantially perpendicular to the first side surface 241, a third side surface 243 which extends from the second side surface 242, is substantially parallel to the first side surface 241, and has the first length, and a fourth side surface 244 which extends from the third side surface 243, is substantially parallel to the second side surface 242, has the second length. According to an embodiment, the slide plate 260 may support the flexible display 230, and may be opened from the second side surface 242 toward the fourth side surface 244 (e.g., in an x-direction or a first direction) so as to enlarge the display region of the flexible display 230 or may be closed from the fourth side surface 244 toward the second side surface 242 (e.g., in a −x-direction or a second direction) so as to reduce the display region of the flexible display 230. According to an embodiment, the electronic device 200 may include a first side cover 240a and a second side cover 240b for covering the first side surface 241 and the third side surface 243. According to an embodiment, the first side surface 241 and the third side surface 243 may be disposed so as not to be exposed outwards through the first side cover 240a and the second side cover 240b.

According to certain embodiments, the electronic device 200 may include the flexible display 230 disposed to be supported by the slide plate 260. According to an embodiment, the flexible display 230 may include a first region (e.g., the first region 231 in FIG. 4) supported by the slide plate 260 and a second region (e.g., the second region 232 in FIG. 4) extending from the first region 231 and supported by the hinge rail 261. According to an embodiment, the second region 232 of the flexible display 230 may be disposed such that, when the electronic device 200 is in a first state (e.g., a closed state or a state in which the slide plate 260 moves into the housing 240), the second region 232 moves into the inner space (e.g., the inner space 2403 in FIG. 4) of the housing 240 and is not exposed outwards. When the electronic device 200 is in a second state (e.g., an opened state or a state in which the slide plate 260 moves out of the housing 240), the slide plate 260 may be exposed outwards so as to extend from the first region 231 while being supported by the hinge rail 261.

Therefore, the electronic device 200 may include a rollable-type electronic device in which the area of a display screen of the flexible display 230 is changed by the movement of the slide plate 260 from the housing 240.

According to certain embodiments, the electronic device 200 may be called a "slidable electronic device 200" or an "expandable electronic device 200" as the display region of the flexible display 230 is enlarged based on the sliding of the slide plate 260 from the housing 240, or may be called a "rollable electronic device 200" as at least a portion of the flexible display 230 is configured to be wound in the inner space (e.g., the inner space 2403 in FIG. 4) of the housing 240 in the first state.

According to certain embodiments, the first state may be called a first shape, and the second state may be called a second shape. For example, the first shape may include a normal state, a reduced state, or a closed state, and the second shape may include an opened state. In an embodiment, the electronic device 200 may form a third state (e.g., an intermediate state) which is a state between the first state and the second state. For example, the third state may be called a third shape, and the third shape may include a free-stop state.

According to certain embodiments, the slide plate 260 may be coupled to the housing 240 and can move in a sliding manner so as to be at least partially inserted into or drawn out of the housing 240. For example, the electronic device 200 may be configured to have, in the first state, a first width w1 from the second side surface 242 to the fourth side surface 244. According to an embodiment, the electronic device 200 may be configured to have, in the second state, a second width w2 from the second side surface 242 to the fourth side surface 244. According to an embodiment, in the second state, the electronic device 200 may have the width w2 by which the hinge rail 261 inserted in the housing 240 moves out of the electronic device.

According to certain embodiments, the slide plate 260 may be operated by a user's manipulation. In an embodiment, the slide plate 260 may automatically operate through a driving mechanism disposed in the inner space (e.g., the inner space 2403 in FIG. 4) of housing 240. According to an embodiment, the electronic device 200 may be configured to control an operation of the slide plate 260 through the driving mechanism when an event for opened/closed state switching (e.g., switching between the first state and the second state) of the electronic device 200 is detected by a processor (e.g., processor 120 in FIG. 1). In an embodiment, the processor (e.g., the processor 120 in FIG. 1) of the electronic device 200 may perform control to display an object in various manners and execute application programs, in response to the display region of the flexible display 230 changed based on the first state, the second state, or the third state (e.g., the intermediate state).

According to certain embodiments, the electronic device 200 may include at least one among an input device 203, sound output devices 206 and 207, sensor modules 204 and 217, camera modules 205 and 216, a connector port 208, a key input device (not shown), or an indicator (not shown). In another embodiment, in the case of the electronic device 200, at least one of the above-describe elements may be omitted, or other elements may be additionally included.

According to certain embodiments, the input device 203 may include a microphone 203. In an embodiment, the input device 203 may include multiple microphones 203 disposed so as to sense the direction of a sound. The sound output devices 206 and 207 may include speakers 206 and 207. The speakers 206 and 207 may include an external speaker 206 and a receiver 207 for conversation. In another embodiment, the sound output devices 206 and 207 may also include a speaker (e.g., a piezoelectric speaker operating without a separate speaker hole).

According to certain embodiments, the sensor modules 204 and 217 may generate an electrical signal or a data value corresponding to an operation state inside the electronic device 200 or an external environment state. The sensor modules 204 and 217 may include, for example, a first sensor module 204 (e.g., a proximity sensor or an illuminance sensor) disposed in the front surface of the electronic device and/or a second sensor module 217 (e.g., an HRM sensor) disposed in the rear surface of the electronic device. According to an embodiment, the first sensor module 204 may be disposed below the flexible display 230 in the front surface of the electronic device. According to an embodiment, the first sensor module 204 may further include at least one among a proximity sensor, an illuminance sensor 204, a time-of-flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biosensor, a temperature sensor, or a humidity sensor.

According to certain embodiments, the camera modules 205 and 216 may include a first camera module 205 disposed in the front surface of the electronic device 200, and a second camera module 216 disposed on the rear surface of the electronic device 200. According to an embodiment, the electronic device 200 may include a flash 218 positioned near the second camera module 216. According to an embodiment, each of the camera modules 205 and 216 may include one or multiple lenses, an image sensor, and/or an image signal processor. According to an embodiment, the first camera module 205 may be disposed below the flexible display 230, and may be configured to capture an image of a subject through a part of an active region of the flexible display 230. According to an embodiment, the flash 218 may include, for example, a light-emitting diode or a xenon lamp. In an embodiment, at least two lenses (wide-angle or telephoto lenses) and image sensors may be in one surface of the electronic device 200.

According to certain embodiments, the electronic device 200 may include at least one antenna (not shown). According to an embodiment, the at least one antenna, for example, may wirelessly communicate with an external electronic device (e.g., the electronic device 104 in FIG. 1), or may wirelessly transmit or receive power for charging to or from the external electronic device. According to an embodiment, the antenna may include a legacy antenna, an mmWave antenna, a near-field communication (NFC) antenna, a wireless charging antenna, and/or a magnetic secure transmission (MST) antenna.

According to certain embodiments, the housing 240 (e.g., the side frame) may be at least partially formed of a conductive material (e.g., a metal material). According to an embodiment, in the case of the housing 240, at least the first side surface 241 and/or the third side surface 243, which is not involved in driving of the slide plate 260, may be formed of a conductive material, and may be divided into multiple conductive portions which are electrically insulated from each other through a non-conductive material. According to an embodiment, the multiple conductive portions may be electrically connected to a wireless communication circuit (e.g., the wireless communication module 192 in FIG. 1) disposed in the electronic device 200 so as to be used as antennas operating in various frequency bands.

Figure 4:
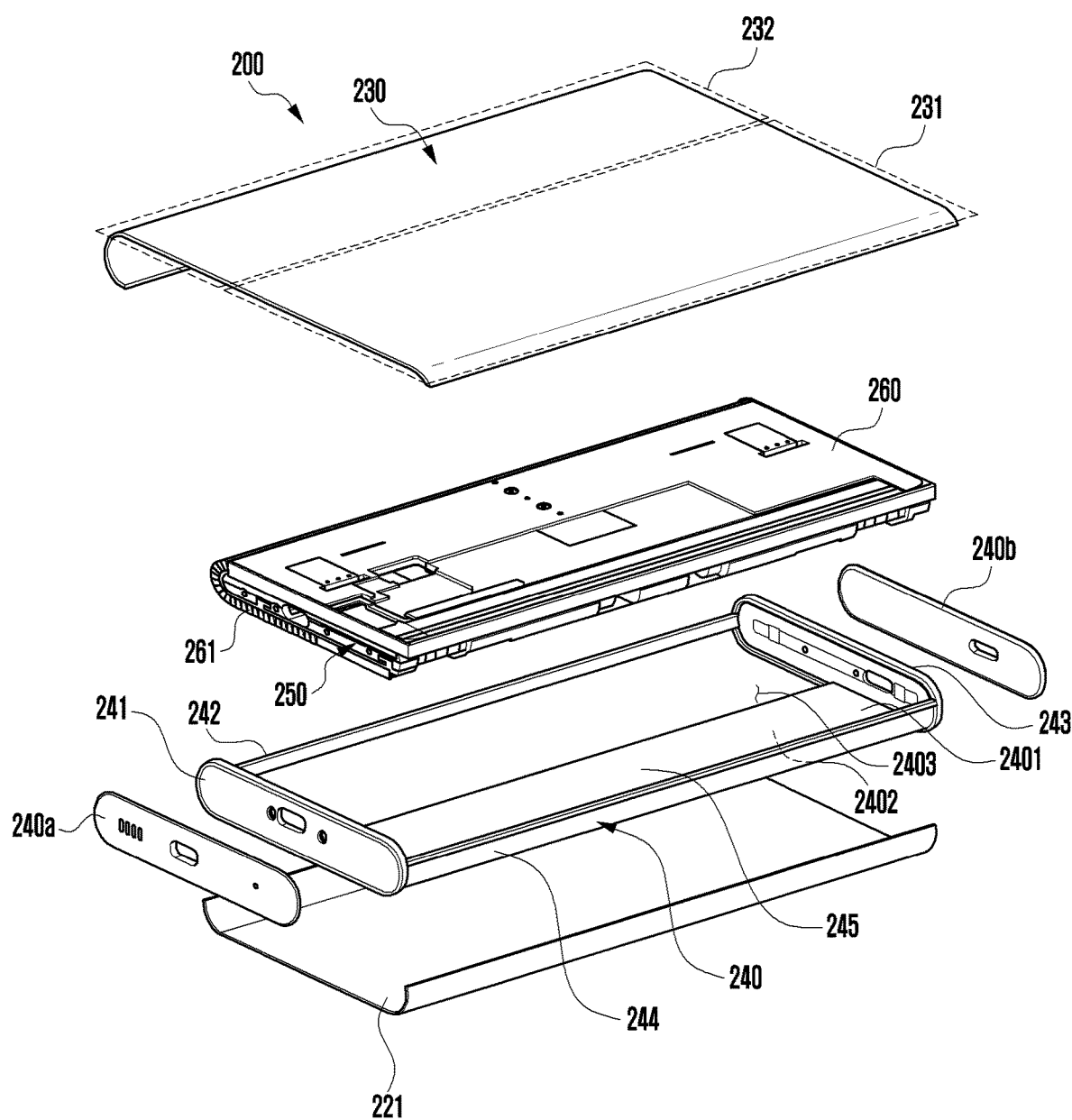
FIG. 4 is an exploded perspective view of an electronic device according to certain embodiments.

FIG. 4 is an exploded perspective view of the electronic device 200 according to certain embodiments herein.

Referring to FIG. 4, the electronic device 200 may include a housing 240 which includes a first surface 2401, a second surface 2402 facing a direction opposite to that of the first surface 2401, and a side surface (e.g., the side surface 210c in FIG. 2A) surrounding an inner space 2403 between the first surface 2401 and the second surface 2402, a bracket housing 250 disposed in the inner space 2403 of the housing 240 while facing the first surface 2401, a slide plate 260 including a hinge rail 261 coupled so as to be slidable from the bracket housing 250, a flexible display 230 disposed to be supported by the slide plate 260 and the hinge rail 261, and a rear cover 221 disposed to face the second surface 2402.

According to an embodiment, the flexible display 230 may include a first region 231 supported by the slide plate 260 and a second region 232 extending from the first region 231 and supported by the hinge rail 261.

According to an embodiment, the housing 240 may include a support plate 245 at least partially extending from at least one side surface (e.g., the fourth side surface 244) into the inner space 2403. According to an embodiment, the support plate 245 may be formed to have a structure for supporting electronic components (e.g., the bracket housing 250) disposed in the inner space of the electronic device 200. In an embodiment, the support plate 245 may be structurally coupled to the housing 240. According to an embodiment, the housing 240 may include a first side surface 241 having a first length, a second side surface 242 which extends in the substantially perpendicular direction from the first side surface 241 and has a second length longer than the first length, a third side surface 243 which extends from the second side surface 242, is substantially parallel to the first side surface 241, and has the first length, and a fourth side surface 244 which extends from the third side surface 243, is substantially parallel to the second side surface 242, and has the second length.

According to an embodiment, the electronic device 200 may include a first side cover 240a and a second side cover 240b for covering the first side surface 241 and the third side surface 243. According to an embodiment, the first side surface 241 and the third side surface 243 may disposed so as not to be exposed outwards through the first side cover 240a and the second side cover 240b.

In an embodiment, at least a portion of the second region 232 may also disposed to be viewable from the outside through the rear cover 221 in a state in which the second region 232 of the flexible display 230 is inserted in the inner space 2403 of the housing 240 (e.g., a slide-in state). In this case, the rear cover 221 may be formed of a transparent material and/or a translucent material.

Figure 5A:
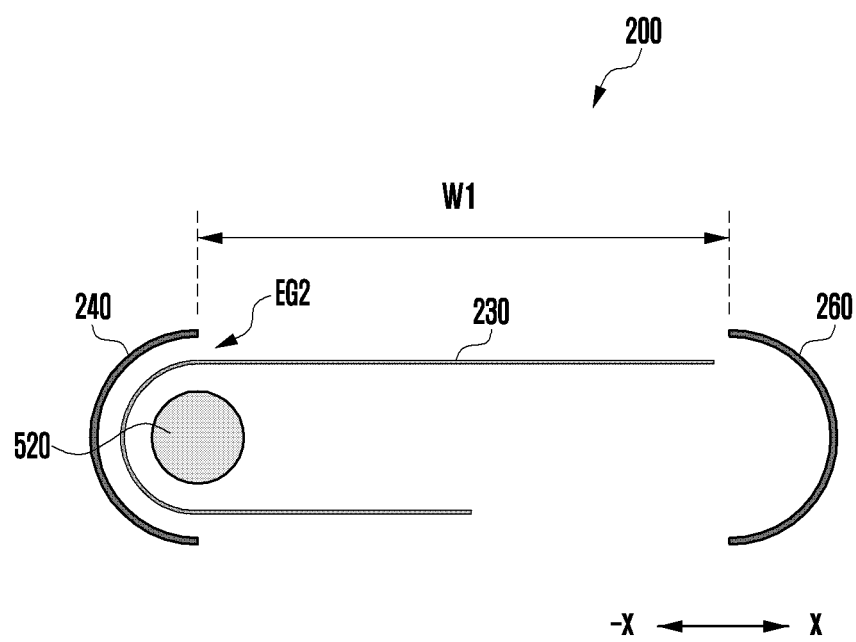
FIG. 5A is a cross-sectional view illustrating a first state of an electronic device according to an embodiment in which a roller is positioned in a second direction of the electronic device.
Figure 5B:
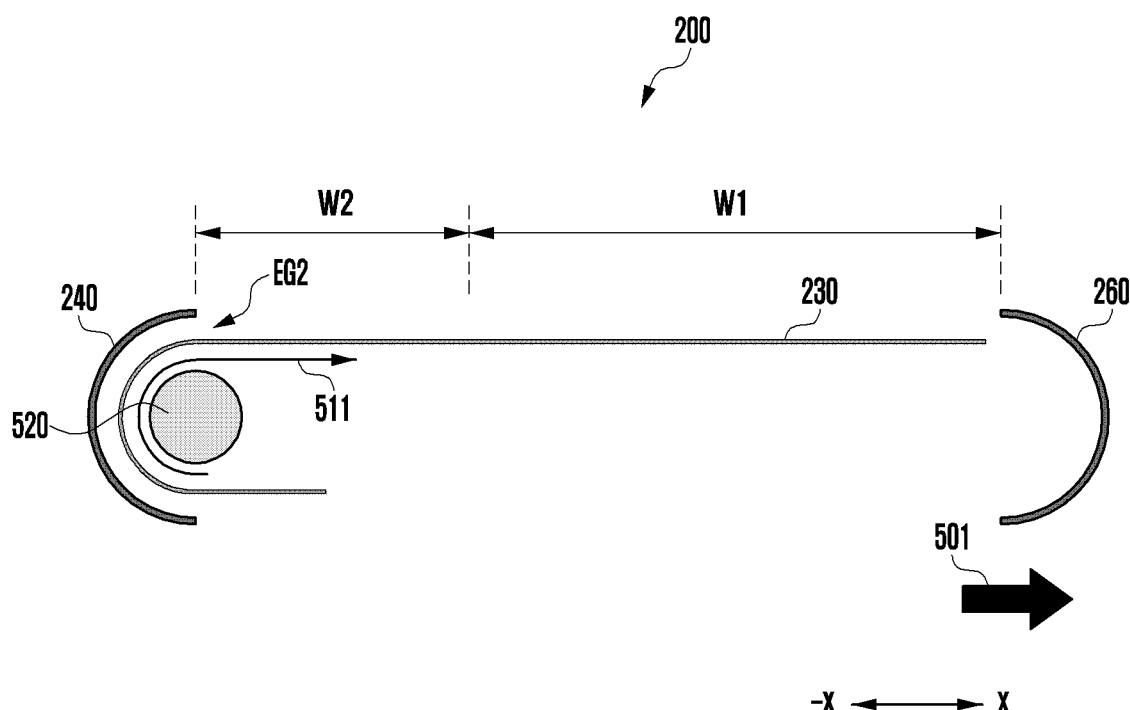
FIG. 5B is a cross-sectional view illustrating a second state of an electronic device according to an embodiment in which a roller is positioned in a second direction of the electronic device.

FIG. 5A is a cross-sectional view illustrating a first state of an electronic device according to an embodiment herein in which a roller is positioned in a second direction (e.g., the −x-direction) of the electronic device. FIG. 5B is a cross-sectional view illustrating a second state of an electronic device according to an embodiment herein in which a roller is positioned in a second direction (e.g., the −x-direction) of the electronic device.

The electronic device 200 illustrated in FIGS. 5A and 5B may be at least partially similar to the electronic device 200 illustrated in FIGS. 2A to 4, or may further include other embodiments of the electronic device 200. Hereinafter, only features, which are different from those of the electronic device 200 illustrated in FIGS. 2A to 4 or have not been described, will be described with reference to FIGS. 5A and 5B.

Referring to FIGS. 5A and 5B, the electronic device 200 according to an embodiment may include a housing 240 and a slide plate 260 extendable in a first direction (e.g., the x-direction) from the housing 240. Herein, the housing 240 may be defined as a first housing 240, and the slide plate 260 may be defined as a second housing 260.

According to an embodiment, the electronic device 200 may include a roller 520, and the roller 520 may be disposed in the inner space (e.g., the inner space 2403 in FIG. 4) of the housing 240.

According to an embodiment, the roller 520 may be positioned in a second direction (e.g., an −x-direction) of the electronic device 200, and may rotate in a designated direction on the basis of the movement of the slide plate 260. According to an embodiment, the roller 520 may be positioned adjacent to a second side surface (e.g., the second side surface 242 in FIG. 4) of the electronic device 200.

According to an embodiment, the roller 520 may rotate in the clockwise direction according to movement of the slide plate 260 in a first direction (e.g., the x-direction). The roller 520 may rotate in the counterclockwise direction according to movement of the slide plate 260 in the second direction (e.g., the −x-direction).

According to an embodiment, the display region of the flexible display 230 may vary depending on the rotation of the roller 520.

For example, as illustrated in FIG. 5A, the roller 520 may rotate in the counterclockwise direction according to movement of the slide plate 260 in the second direction (e.g., the −x-direction). When the roller 520 rotates in the counterclockwise direction, at least a portion (e.g., the second region 232 in FIG. 4) of the flexible display 230 may slide into the housing 240 through a second edge portion EG2 positioned in the second direction (e.g., the −x-direction) of the electronic device 200. The second edge portion EG2 may be defined as a portion of the housing 240 adjacent to the second side surface (e.g., the second side surface 242 in FIG. 4) of the electronic device 200. According to an embodiment, when the at least portion (e.g., the second region 232) of the flexible display 230 slides into the housing 240, the display region of the flexible display 230 may have a first width W1. For example, as illustrated in FIG. 5A, the display region of the flexible display 230 may have the first width W1 in a first state of the electronic device 200.

For example, as illustrated in FIG. 5B, the roller 520 may rotate in the clockwise direction according to movement 501 of the slide plate 260 in the first direction (e.g., the x-direction). When the roller 520 rotates in the clockwise direction, at least a portion (e.g., the second region 232) of the flexible display 230, which is positioned in the housing 240, may slide out, like arrow 511 in FIG. 5B, through the second edge portion EG2 positioned in the second direction (e.g., the −x-direction) of the electronic device 200. According to an embodiment, when the at least portion (e.g., the second region 232) of the flexible display 230 slides out from the inside of the housing 240, the display region of the flexible display 230 may have a width which corresponds to the sum of the first width W1 and a second width W2. For example, as illustrated in FIG. 5B, the display region of the flexible display 230 may have a width corresponding to the sum of the first width W1 and the second width W2 in a second state of the electronic device 200.

According to an embodiment, as illustrated in FIGS. 5A and 5B, the at least portion (e.g., the second region 232 in FIG. 4) of the flexible display 230, which is slid in the housing 240 in the first state of the electronic device 200, may be disposed side by side with another portion (e.g., the first region 231 in FIG. 4) of the flexible display 230, which is exposed out of the housing 240.

Figure 6A:
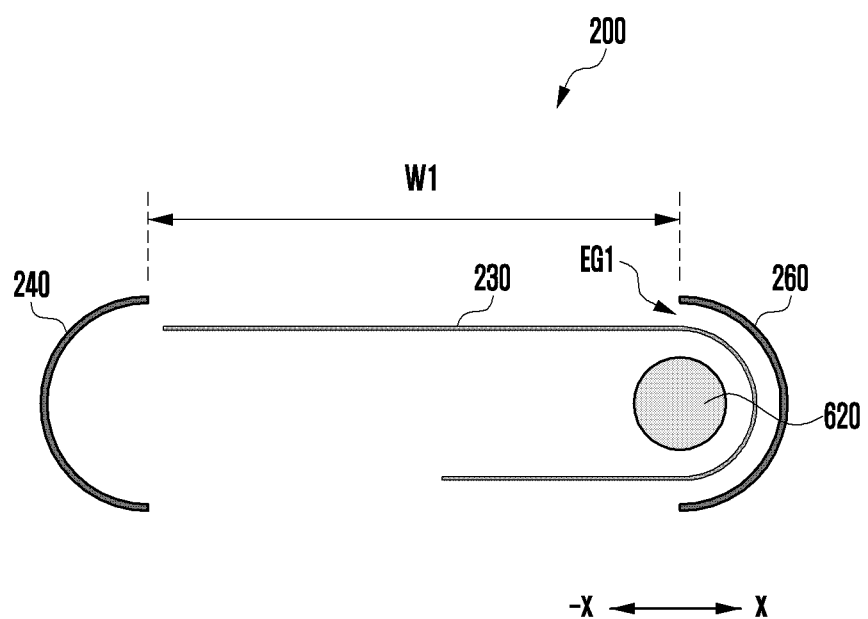
FIG. 6A is a cross-sectional view illustrating a first state of an electronic device according to an embodiment in which a roller is positioned in a first direction of the electronic device.
Figure 6B:
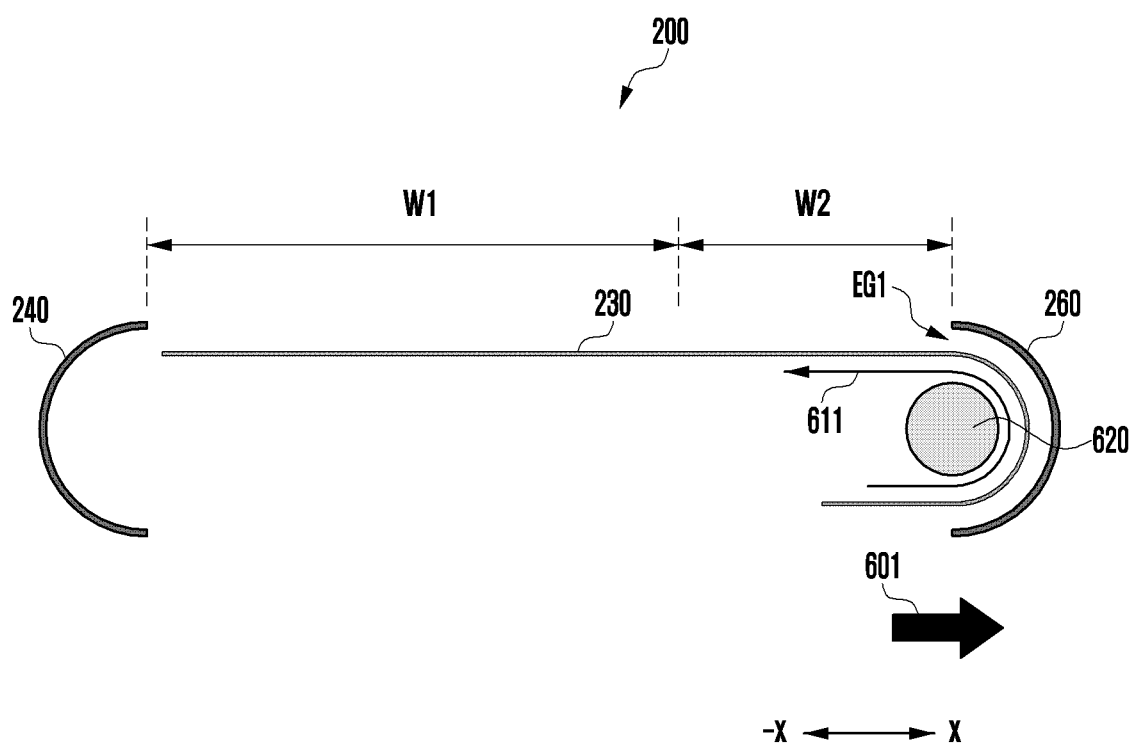
FIG. 6B is a cross-sectional view illustrating a second state of an electronic device according to an embodiment in which a roller is positioned in a first direction of the electronic device.

FIG. 6A is a cross-sectional view illustrating a first state of an electronic device according to an embodiment herein in which a roller is positioned in a first direction (e.g., the x-direction) of the electronic device. FIG. 6B is a cross-sectional view illustrating a second state of an electronic device according to an embodiment herein in which a roller is positioned in a first direction (e.g., the x-direction) of the electronic device.

The electronic device 200 illustrated in FIGS. 6A and 6B may be at least partially similar to the electronic device 200 illustrated in FIGS. 2A to 4, or may further include other embodiments of the electronic device 200. Hereinafter, only features, which are different from those of the electronic device 200 illustrated in FIGS. 2A to 4 or have not been described, will be described with reference to FIGS. 6A and 6B.

Referring to FIGS. 6A and 6B, the electronic device 200 according to an embodiment may include a housing 240 and a slide plate 260 extendable in a first direction (e.g., the x-direction) from the housing 240. Herein, the housing 240 may be defined as a first housing 240, and the slide plate 260 may be defined as a second housing 260.

According to an embodiment, the electronic device 200 may include a roller 620, and the roller 620 may be disposed in the inner space (e.g., the inner space 2403 in FIG. 4) of the housing 240.

According to an embodiment, the roller 620 may be positioned in a first direction (e.g., the x-direction) of the electronic device 200, and may rotate in a designated direction on the basis of the movement of the slide plate 260. According to an embodiment, the roller 620 may be positioned adjacent to a fourth side surface (e.g., the fourth side surface 244 in FIG. 4) of the electronic device 200.

According to an embodiment, the roller 620 may rotate in the counterclockwise direction according to movement of the slide plate 260 in the first direction (e.g., the x-direction). The roller 620 may rotate in the clockwise direction according to movement of the slide plate 260 in a second direction (e.g., the −x-direction).

According to an embodiment, the display region of the flexible display 230 may vary depending on the rotation of the roller 620.

For example, as illustrated in FIG. 6A, the roller 620 may rotate in the clockwise direction according to movement of the slide plate 260 in the second direction (e.g., the −x-direction). When the roller 620 rotates in the clockwise direction, at least a portion (e.g., the second region 232) of the flexible display 230 may slide into the housing 240 through a first edge portion EG1 positioned in the first direction (e.g., the x-direction) of the electronic device 200. The first edge portion EG1 may be defined as a portion of the slide plate 260 adjacent to the fourth side surface (e.g., the fourth side surface 244 in FIG. 4) of the electronic device 200. According to an embodiment, when the at least portion (e.g., the second region 232) of the flexible display 230 slides into the housing 240, the display region of the flexible display 230 may have a first width W1. For example, as illustrated in FIG. 6A, the display region of the flexible display 230 may have the first width W1 in a first state of the electronic device 200.

For example, as illustrated in FIG. 6B, the roller 620 may rotate in the counterclockwise direction according to movement 601 of the slide plate 260 in the first direction (e.g., the x-direction). When the roller 620 rotates in the counterclockwise direction, at least a portion (e.g., the second region 232 in FIG. 4) of the flexible display 230, which is positioned in the housing 240, may slide out, like arrow 611 in FIG. 6B, through the first edge portion EG1 positioned in the first direction (e.g., the x-direction) of the electronic device 200. According to an embodiment, when the at least portion (e.g., the second region 232) of the flexible display 230 slides out from the inside of the housing 240, the display region of the flexible display 230 may have a width which corresponds to the sum of the first width W1 and a second width W2. For example, as illustrated in FIG. 6B, the display region of the flexible display 230 may have a width corresponding to the sum of the first width W1 and the second width W2 in a second state of the electronic device 200.

Figure 7A:
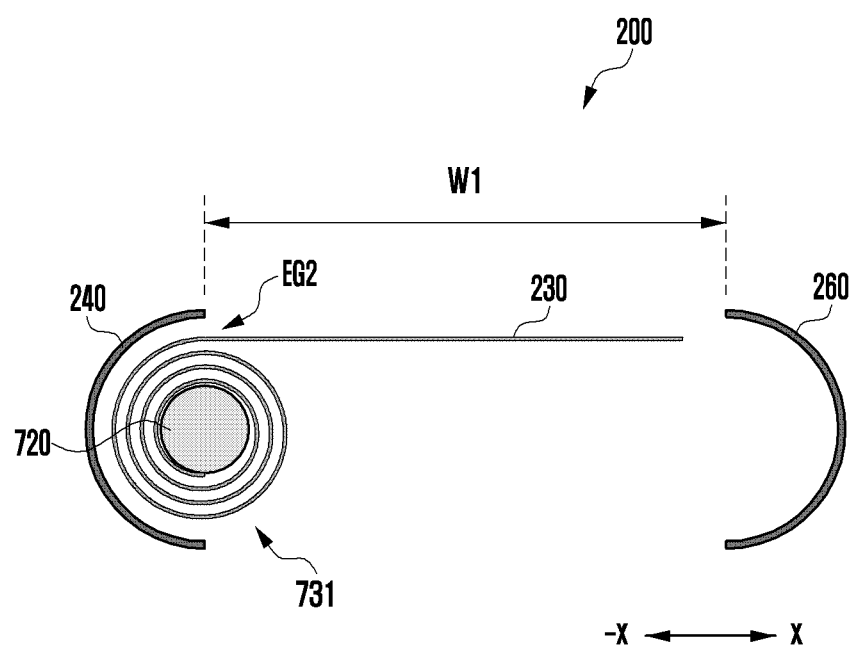
FIG. 7A is a cross-sectional view illustrating a first state of an electronic device according to another embodiment in which a roller is positioned in a second direction of the electronic device.
Figure 7B:
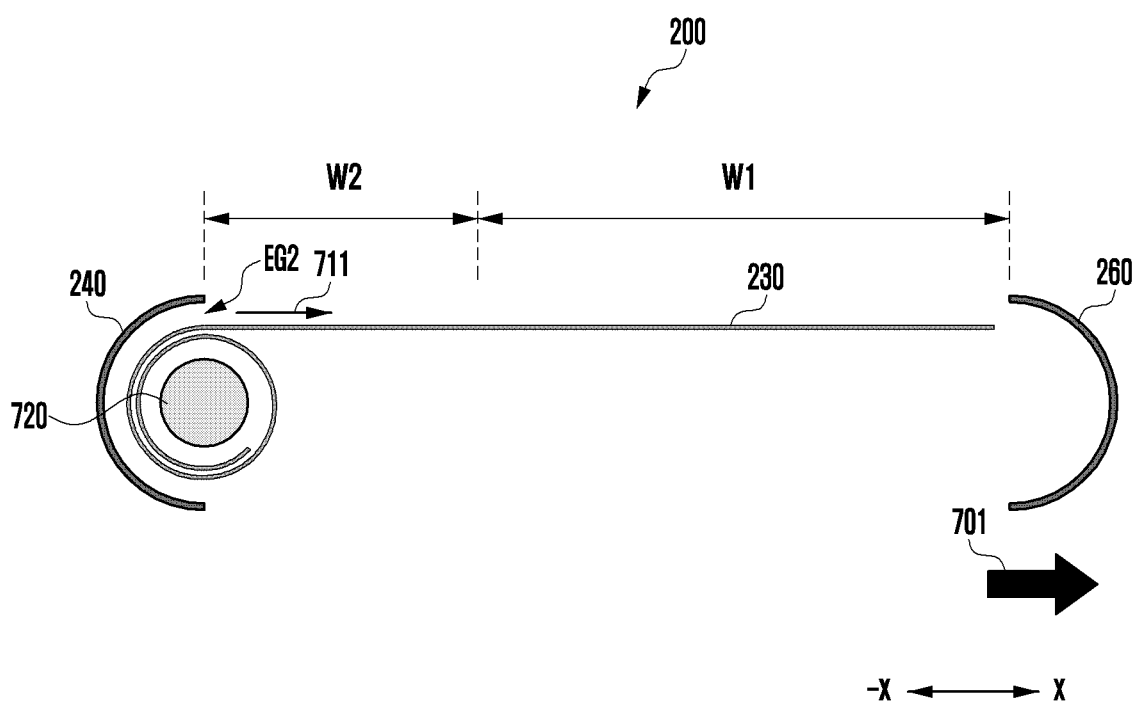
FIG. 7B is a cross-sectional view illustrating a second state of an electronic device according to another embodiment in which a roller is positioned in a second direction of the electronic device.

FIG. 7A is a cross-sectional view illustrating a first state of an electronic device according to another embodiment herein in which a roller is positioned in a second direction (e.g., the −x-direction) of the electronic device. FIG. 7B is a cross-sectional view illustrating a second state of an electronic device according to another embodiment herein in which a roller is positioned in a second direction (e.g., the −x-direction) of the electronic device.

The electronic device 200 illustrated in FIGS. 7A and 7B may be at least partially similar to the electronic device 200 illustrated in FIGS. 5A and 5B, or may further include other embodiments of the electronic device 200. Hereinafter, only features, which are different from those of the electronic device 200 illustrated in FIGS. 5A and 5B or have not been described, will be described with reference to FIGS. 7A and 7B.

Referring to FIGS. 7A and 7B, the electronic device 200 according to an embodiment may include a roller 720, and the roller 720 may be disposed in the inner space (e.g., the inner space 2403 in FIG. 4) of a housing 240.

According to an embodiment, the roller 720 may be positioned in a second direction (e.g., the −x-direction) of the electronic device 200, and may rotate in a designated direction on the basis of the movement of a slide plate 260. According to an embodiment, the roller 720 may be positioned adjacent to a second side surface (e.g., the second side surface 242 in FIG. 4) of the electronic device 200.

According to an embodiment, the roller 720 may rotate in the clockwise direction according to movement 701 of the slide plate 260 in a first direction (e.g., the x-direction). The roller 720 may rotate in the counterclockwise direction according to movement of the slide plate 260 in the second direction (e.g., the −x-direction).

According to an embodiment, as illustrated in FIG. 7A, at least a portion (e.g., the second region 232 in FIG. 4) of the flexible display 230 may slide into the housing 240 according to rotation of the roller 720 in the counterclockwise direction. According to an embodiment, the at least portion of the flexible display 230 may be wound along the outer circumferential surface of the roller 720 like arrow 731 while sliding into the housing 240. For example, the at least portion of the flexible display 230 may be wound on the outer circumferential surface of the roller 720 in the form of jelly roll in a first state of the electronic device 200.

According to an embodiment, like arrow 711 in FIG. 7B, at least a portion (e.g., the second region 232) of the flexible display 230 may slide out from the inside of the housing 240 according to rotation of the roller 720 in the clockwise direction. For example, the at least portion of the flexible display 230, wound along the outer circumferential surface of the roller 720, may slide out of the housing 240 according to rotation of the roller 720 in the clockwise direction.

Figure 8A:
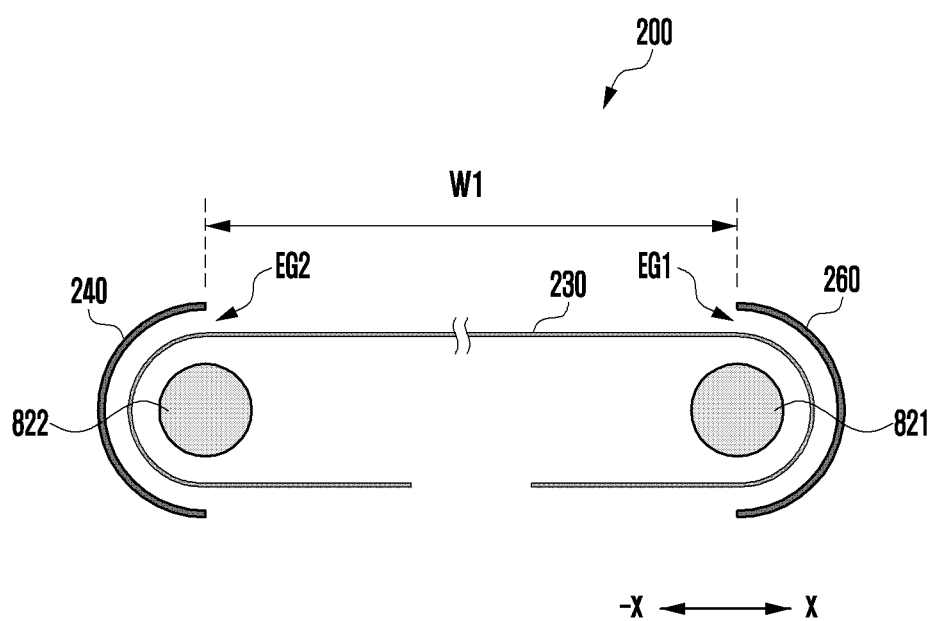
FIG. 8A is a cross-sectional view illustrating a first state of an electronic device according to another embodiment in which a roller is positioned in each of a first direction and a second direction of the electronic device.
Figure 8B:
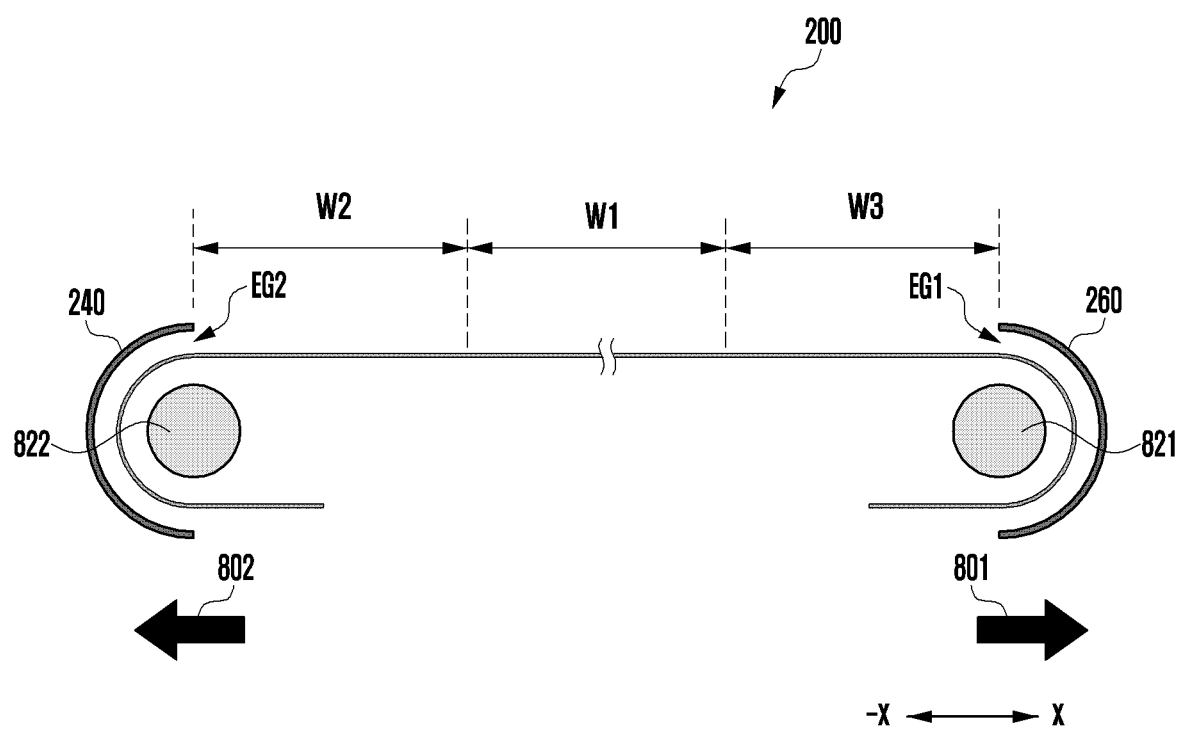
FIG. 8B is a cross-sectional view illustrating a second state of an electronic device according to another embodiment in which a roller is positioned in each of a first direction and a second direction of the electronic device.

FIG. 8A is a cross-sectional view illustrating a first state of an electronic device according to another embodiment herein in which a roller is positioned in each of a first direction (e.g., the x-direction) and a second direction (e.g., the −x-direction) of the electronic device. FIG. 8B is a cross-sectional view illustrating a second state of an electronic device according to another embodiment herein in which a roller is positioned in each of a first direction (e.g., the x-direction) and a second direction (e.g., the −x-direction) of the electronic device.

The electronic device 200 illustrated in FIGS. 8A and 8B may be at least partially similar to the electronic device 200 illustrated in FIGS. 2A to 4, or may further include other embodiments of the electronic device 200. Hereinafter, only features, which are different from those of the electronic device 200 illustrated in FIGS. 2A to 4 or have not been described, will be described with reference to FIGS. 8A and 8B.

Referring to FIGS. 8A and 8B, the electronic device 200 according to an embodiment may include a first housing 240 extendable in the second direction (e.g., the −x-direction), and a second housing 260 extendable in the first direction (e.g., the x-direction).

According to an embodiment, the electronic device 200 may include a first roller 821 and a second roller 822, and the first roller 821 and the second roller 822 may be disposed in the inner space (e.g., the inner space 2403 in FIG. 4) of the housing 240.

According to an embodiment, the first roller 821 may be positioned in a first direction (e.g., the x-direction) of the electronic device 200, and may rotate in a designated direction on the basis of the movement of the second housing 260. According to an embodiment, the first roller 821 may be positioned adjacent to a fourth side surface (e.g., the fourth side surface 244 in FIG. 4) of the electronic device 200.

According to an embodiment, the first roller 821 may rotate in the clockwise direction according to movement of the second housing 260 in the second direction (e.g., the −x-direction). For example, illustrated in FIG. 8A, when the first roller 821 rotates in the clockwise direction, at least a portion of a flexible display 230 may slide into the housing 260 through a first edge portion EG1. The first edge portion EG1 may be defined as a portion of the second housing 260, adjacent to a fourth side surface (e.g., the fourth side surface 244 in FIG. 4) of the electronic device 200.

According to an embodiment, the first roller 821 may rotate in the counterclockwise direction according to movement 801 of the second housing 260 in the first direction (e.g., the x-direction). For example, as illustrated in FIG. 8B, when the first roller 821 rotates in the counterclockwise direction, at least a portion of the flexible display 230 may slide out from the inside of the second housing 260 through the first edge portion EG1. According to an embodiment, the display region of the flexible display 230 may increase by a third width W3 from the first direction (e.g., the x-direction) as the at least portion of the flexible display 230 slides out through the first edge portion EG1.

According to an embodiment, the second roller 822 may rotate in the counterclockwise direction according to movement of the first housing 240 in the first direction (e.g., the x-direction). For example, as illustrated in FIG. 8A, when the first roller 821 rotates in the counterclockwise direction, at least a portion of the flexible display 230 may slide into the first housing 240 through a second edge portion EG2. The second edge portion EG2 may be defined as a portion of the first housing 240 adjacent to a second side surface (e.g., the second side surface 242 in FIG. 4) of the electronic device 200.

According to an embodiment, the second roller 822 may rotate in the clockwise direction according to movement 802 of the first housing 240 in the second direction (e.g., the −x-direction). For example, as illustrated in FIG. 8B, when the second roller 822 rotates in the clockwise direction, at least a portion of the flexible display 230 may slide out from the inside of the first housing 240 through the second edge portion EG2. According to an embodiment, the display region of the flexible display 230 may increase by a second width W2 from the second direction (e.g., the −x-direction) as the at least portion of the flexible display 230 slides out through the second edge portion EG2.

Referring to FIG. 8A, when at least a portion (e.g., the second region 232) of the flexible display 230 slides into the first housing 240 and/or the second housing 260, the display region of the flexible display 230 may have a first width W1. For example, as illustrated in FIG. 8A, the display region of the flexible display 230 may have the first width W1 in a first state of the electronic device 200.

Referring to FIG. 8B, when at least a portion (e.g., the second region 232) of the flexible display 230 slides out from the inside of the first housing 240 and the second housing 260, the display region of the flexible display 230 may have a width which corresponds to the sum of the first width W1, the second width W2, and the third width W3. For example, as illustrated in FIG. 8B, the display region of the flexible display 230 may have a width corresponding to the sum of the first width W1, the second width W2, and the third width W3 in a second state of the electronic device 200.

Figure 9:
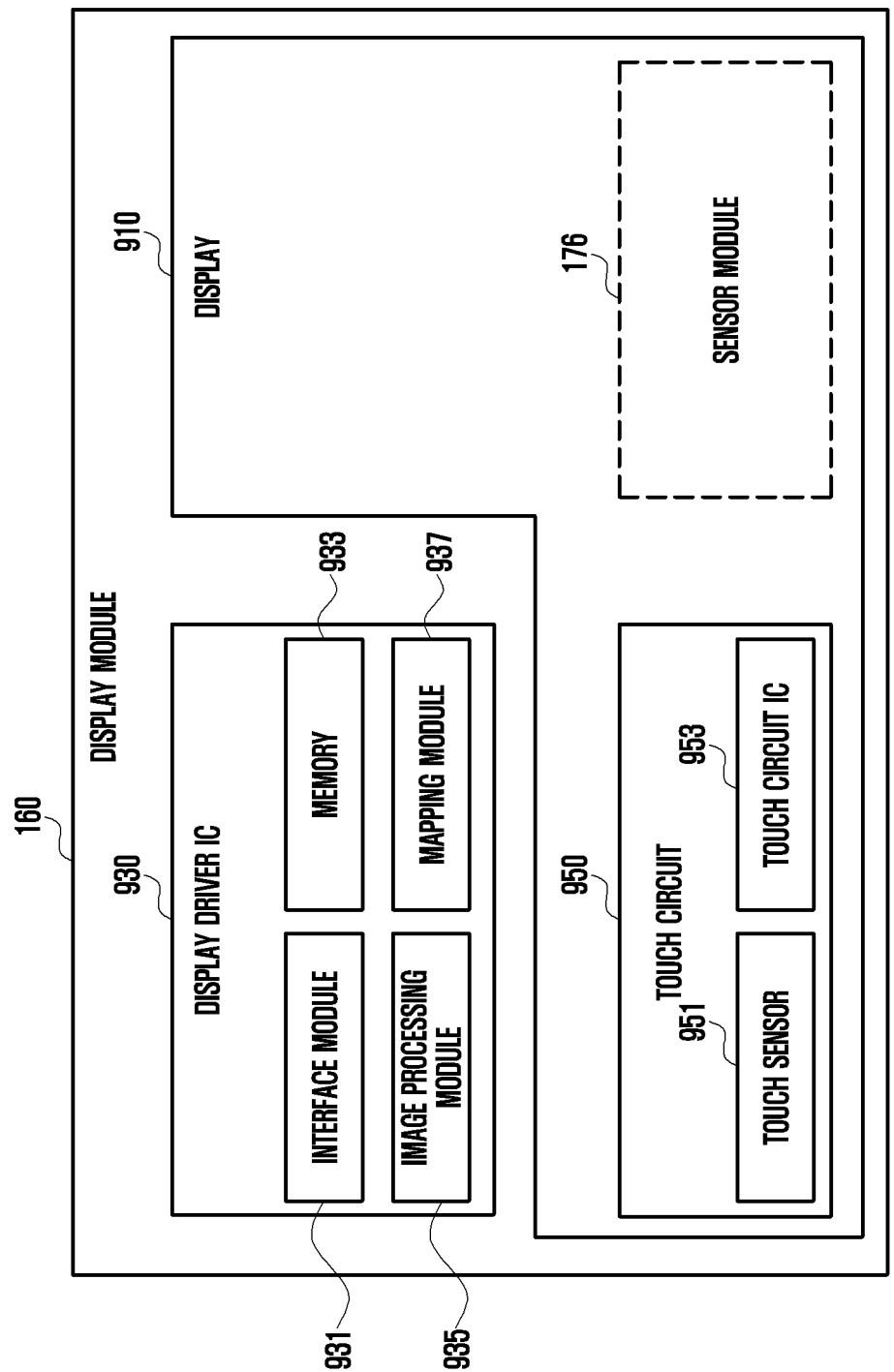
FIG. 9 is a block diagram of a display module according to certain embodiments.

FIG. 9 is a block diagram of a display module 160 according to certain embodiments. Referring to FIG. 9, the display module 160 may include a display 910, and a display driver IC (DDI) 930 configured to control the display. The DDI 930 may include an interface module 931, a memory 933 (e.g., a buffer memory), an image-processing module 935, or a mapping module 937. The DDI 930, for example, may receive image data, or image information including an image control signal corresponding to a command for controlling the image data from another element of the electronic device 101 through the interface module 931. For example, according to an embodiment, the image information may be received from a processor 120 (e.g., the main processor 121 (e.g., the application processor) or the auxiliary processor 123 (e.g., a graphic processing device) operating independently of the function of the main processor 121). The DDI 930 may communicate with a touch circuit 950, a sensor module 176 or the like through the interface module 931. Further, the DDI 930 may store at least a part of the received image information in the memory 933 in, for example, a frame unit. The image-processing module 935, for example, may pre-process or post-process (e.g., adjust the resolution, the brightness, or the size) at least a part of the image data, based at least on characteristics of the image data or characteristics of the display 910. The mapping module 937 may generate a voltage value or a current value which corresponds to the image data pre-processed or post-processed by the image-processing module 935. According to an embodiment, the generation of the voltage value or the current value may be performed based at least partially on, for example, attributions (e.g., the arrangement of pixels (RGB stripe or pentile structure), or the size of each of subpixels) of pixels of the display 910. At least some pixels of the display 910, for example, may be driven based at least partially on the voltage value or the current value, and thus visual information (e.g., text, images, or icons) corresponding to the image data may be displayed through the display 910.

According to an embodiment, the display module 160 may further include the touch circuit 950. The touch circuit 950 may include a touch sensor 951 and a touch sensor IC 953 configured to control the touch sensor. The touch sensor IC 953, for example, may control the touch sensor 951 in order to sense a touch input or a hovering input at a specific position on the display 910. For example, the touch sensor IC 953 may sense the touch input or the hovering input by measuring changes in a signal (e.g., a voltage, a light amount, resistance, or an electric charge amount) regarding the specific position on the display 910. The touch sensor IC 953 may provide the processor 120 with information (e.g., position, area, pressure, or time) about the sensed touch input or hovering input. According to an embodiment, at least a part (e.g., the touch sensor IC 953) of the touch circuit 950 may be included as a part of the display driver IC 930 or the display 910, or a part of an element (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176, or a control circuit therefor. The at least one sensor or the control circuit therefor may be embedded in a part (e.g., the display 910 or the DDI 930) of the display module 160 or in a part of the touch circuit 950. For example, when the sensor module 176 embedded in the display module 160 includes a biosensor (e.g., the fingerprint sensor), the biosensor may acquire biometric information (e.g., a fingerprint image), associated with a touch input, through a partial region of the display 910. In another example, when the sensor module 176 embedded in the display module 160 includes a pressure sensor, the pressure sensor may acquire pressure information associated with a touch input through a partial or the entire region of the display 910. According to an embodiment, the touch sensor 951 or the sensor module 176 may be disposed between pixels of a pixel layer of the display 910, or above or below the pixel layer.

An electronic device (e.g., the electronic device 101 in FIG. 1) according to certain embodiments may include a housing (e.g., the housing 240 in FIG. 2A), a flexible display (e.g., the flexible display 230 in FIG. 2A) having a display region visually exposed outwards, the area of the display region being adjusted according to movement of at least a portion (e.g., the slide plate 260 in FIG. 2B) of the housing 240, the flexible display 230 including a first region (e.g., the first region 231 in FIG. 2B) fixedly visually exposed outwards, and a second region (e.g., the second region 232 in FIG. 2B) extending from one end of the first region 231 and variably visually exposed outwards based on a type of the housing 240, a display driver IC (DDI) (e.g., the DDI 930 in FIG. 9) configured to drive the flexible display 230, and a processor (e.g., the processor 120 in FIG. 1), wherein in a first state in which the second region 232 is not visually exposed outwards, the processor 120 performs control such that the DDI 930 drives, based on a first driving frequency and a first light emission frequency, the flexible display 230 to display a user screen through the first region 231, and performs control such that the DDI 930 drives, based on a second driving frequency and a second light emission frequency, the flexible display 230 to display a compensation image through the second region 232. The second driving frequency may be equal to or lower than the first driving frequency, and the second light emission frequency may be lower than the first light emission frequency.

According to an embodiment, in the first state, the processor 120 may update the user screen for each frame corresponding to the first driving frequency, and may update the compensation image at a k (k>1) frame period corresponding to the second driving frequency.

According to an embodiment, in the first state, the processor 120 may control the first region 231 to display the user screen for a first light emission time corresponding to the first light emission frequency, and may control the second region 232 to display the compensation image for a second light emission time corresponding to the second light emission frequency, and the second light emission time may be shorter than the first light emission time.

According to an embodiment, the first region 231 and the second region 232 may be disposed adjacent to each other in the scan direction of the flexible display 230. In the first state, the processor 120 may control the DDI 930 to supply a first scan signal to gate lines disposed in the first region 231 for each frame, and may control the DDI 930 to supply a second scan signal to gate lines disposed in the second region 232 at the k frame period.

According to an embodiment, in the first state, the processor 120 may output, during a first frame to a (k−1)th frame, a first horizontal synchronization signal for controlling output timing of the first scan signal without outputting a second horizontal synchronization signal for controlling output timing of the second scan signal, and may output the first horizontal synchronization signal and the second horizontal synchronization signal during a k-th frame.

According to an embodiment, the first region 231 and the second region 232 may be disposed adjacent to each other in the scan direction of the flexible display 230, and the processor 120 may, in the first state, control the DDI 930 to supply a first light emission signal to light emission signal lines disposed in the first region 231 for each frame, and control the DDI 930 to supply a second light emission signal to light emission signal lines disposed in the second region 232 at the k frame period.

According to an embodiment, in the first state, the processor 120 may output, during a first frame to a (k−1)th frame, a first light emission clock signal for generating the first light emission signal without outputting a second light emission clock signal for generating the second light emission signal, and may output the first light emission clock signal and the second light emission clock signal during a k-th frame.

According to an embodiment, in the first state, the processor 120 may supply the first light emission signal to each of the light emission signal lines disposed in the first region 231 "a" number of times for each frame, and may supply the second light emission signal to each of the light emission signal lines disposed in the second region 232 "b" number of times smaller than the "a" number of times at the k frame period.

According to an embodiment, the first region 231 and the second region 232 may be disposed adjacent to each other in a direction perpendicular to the scan direction of the flexible display 230, and the processor 120 may, in the first state, output, for each frame, a first data enable signal for controlling output timing of a data signal supplied to data lines disposed in the first region 231, and may output, at the k frame period, a second data enable signal for controlling output timing of a data signal supplied to data lines disposed in the second region 232.

According to an embodiment, in the first state, the processor 120 may output the first data enable signal without outputting the second data enable signal during a first frame to a (k−1)th frame, and may output the first data enable signal and the second data enable signal during a k-th frame.

According to an embodiment, the processor 120 may sense starting of switching from the first state to a second state in which the second region 232 is visually exposed outwards by being drawn out from the inner space of the housing 240, may sense that the electronic device 101 is gripped by a user, may configure the deviation between the first driving frequency and the second driving frequency as a first deviation value when it is determined that the electronic device 101 has been gripped by the user's hand, and may configure the deviation between the first driving frequency and the second driving frequency as a second deviation value greater than the first deviation value when it is determined that the electronic device 101 has not been gripped by the user's hand.

According to an embodiment, in the first state, the processor 120 may configure the deviation between the first driving frequency and the second driving frequency as the first deviation value when it is determined that one side surface of the housing 240 has been gripped (e.g., but not both sides), and may configure the deviation between the first driving frequency and the second driving frequency as the second deviation value when it is determined that both side surfaces of the housing 240 have been gripped.

According to an embodiment, in the first state, the processor 120 may determine the remaining capacity of a battery of the electronic device 101 when the battery is being charged by receiving power from an external device, and, when the remaining capacity of the battery corresponds to a fully charged state, may configure the first driving frequency and the second driving frequency to have an identical value, and may configure the first light emission frequency and the second light emission frequency to have an identical value.

According to an embodiment, in the first state, the processor 120 may perform control, when the remaining capacity of the battery corresponds to a first interval smaller than a first reference value, such that the second region 232 does not display a screen while the second region 232 is not visually exposed outwards, and may increase the second driving frequency and the second light emission frequency in proportion to the remaining capacity of the battery when the remaining capacity of the battery is equal to or greater than the first reference value.

According to an embodiment, the processor 120 may sense starting of switching from the first state to a second state in which the second region 232 is visually exposed outwards by being drawn out from the inner space of the housing 240, or sense starting of switching from the second state to the first state, and may display a compensation image displayed through at least a portion of the second region 232, which is not visually exposed outwards, while the switching is performed, and may update the compensation image for each predetermined frame corresponding to the second driving frequency.

According to an embodiment, the processor 120 may sense starting of switching from the first state to a second state in which the second region 232 is visually exposed outwards by being drawn out from the inner space of the housing 240, or sense starting of switching from the second state to the first state, and may display a compensation image displayed through at least a portion of the second region 232, which is not visually exposed outwards, while the switching is performed, and may update the compensation image for each frame at which the switching is sensed, regardless of a predetermined frame corresponding to the second driving frequency.

In a method of an electronic device 101 according to certain embodiments, the electronic device 101 may include a flexible display 230 including a first region 231 fixedly visually exposed outwards, and a second region 232 extending from one end of the first region 231 and variably visually exposed outwards, based on a type of a housing 240, and the method may include, in a first state in which the second region 232 is not visually exposed outwards, displaying a user screen through the first region 231, based on a first driving frequency and a first light emission frequency, and displaying a compensation image through the second region 232, based on a second driving frequency and a second light emission frequency, such that the second driving frequency is equal to or lower than the first driving frequency, and the second light emission frequency is lower than the first light emission frequency.

According to an embodiment, the method may include, in the first state, updating the user screen for each frame corresponding to the first driving frequency, and updating the compensation image at a k (k>1) frame period corresponding to the second driving frequency.

According to an embodiment, the method may include, in the first state, displaying the user screen by the first region 231 for a first light emission time corresponding to the first light emission frequency, and displaying the compensation image by the second region 232 for a second light emission time corresponding to the second light emission frequency, such that the second light emission time is shorter than the first light emission time.

According to an embodiment, the method may include, in the first state, controlling the first region 231 to display the user screen for a first light emission time corresponding to the first light emission frequency, and controlling the second region 232 to display the compensation image for a second light emission time corresponding to the second light emission frequency, such that the second light emission time is shorter than the first light emission time.

Figure 10:
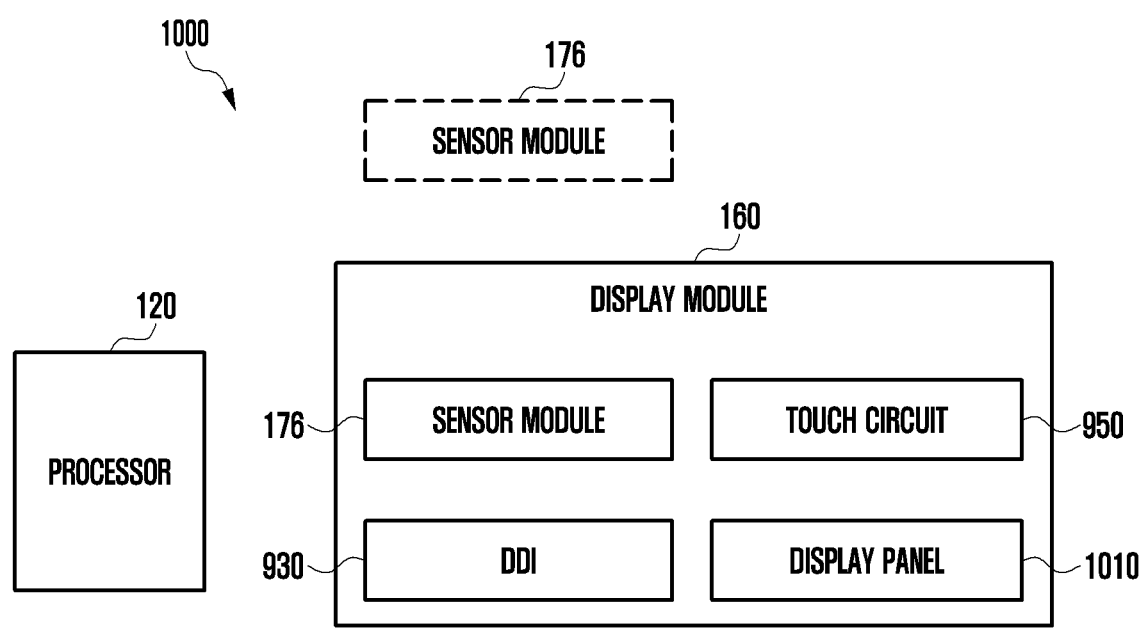
FIG. 10 is a block diagram of an electronic device according to certain embodiments.

FIG. 10 is a block diagram of an electronic device 1000 according to certain embodiments.

The electronic device 1000 illustrated in FIG. 10 may be at least partially similar to the electronic device 101 illustrated in FIG. 1 or may include other embodiments. Hereinafter, in connection with FIG. 10, features of the electronic device 1000, which have not been described or have been changed, will be mainly described.

Referring to FIG. 10, the electronic device 1000 according to an embodiment may include a processor 120, a display module 160, and a sensor module 176. According to an embodiment, the display module 160 may include the sensor module 176, a touch circuit 950, a DDI 930, and/or a display panel 1010.

According to an embodiment, the processor 120 may control overall operation of the display module 160. According to an embodiment, the processor 120 may control the DDI 930 to drive the display panel 1010. According to an embodiment, the processor 120 may output a synchronization signal, image data, and/or compensation data such that the DDI 930 drives the display panel 1010.

According to an embodiment, the synchronization signal may include a vertical synchronization signal for controlling start timing of each frame, a horizontal synchronization signal for controlling output timing of a scan signal applied to a gate line (not shown) of the display panel 1010, a data enable signal for controlling output timing of a data signal applied to a data line (not shown) of the display panel 1010, a gate clock signal for generating a scan signal, and a light emission clock signal for generating a light emission signal.

According to an embodiment, the image data may be digital data for displaying a user screen. The user screen may include, for example, an application execution screen, a background screen, and a user interface. According to certain embodiments, the user screen may be called an active content.

According to an embodiment, the compensation data may be digital data for displaying a designated compensation image by the second region 232 in a first state in which the entirety of the second region 232 is not viewed outside. According to an embodiment, the compensation data may be digital data for displaying a designated compensation image by a portion of the second region 232, which is not viewed outside, in a third state in which the portion of the second region 232 is not viewed outside.

According to an embodiment, the DDI 930 may receive image data and/or compensation data from the processor 120, and may drive the display panel 1010 to display a user screen based on the image data and a compensation image based on the compensation data. According to an embodiment, the DDI 930 may store compensation data in a memory (e.g., the memory 933 in FIG. 9), may acquire compensation data with reference to the memory 933 for each designated frame, and may drive the display panel 1010 to display a compensation image based on the acquired compensation data. In an embodiment, the DDI 930 itself may generate compensation data without receiving compensation data from the processor 120.

According to an embodiment, the processor 120 may sense the state of the electronic device 1000 through the sensor module 176, and may control, based on the state of the electronic device 1000, a screen displayed through the display panel 1010 and a driving frequency and/or a light emission frequency for each partial region of the display panel 1010. According to an embodiment, the sensor module 176 may include at least one sensor for sensing the state of the electronic device 1000, and may be included in the display module 160, or may be disposed, as a component separate from the display module 160, in the inner space of a housing (e.g., the housing 240 in FIG. 2).

Figure 11:
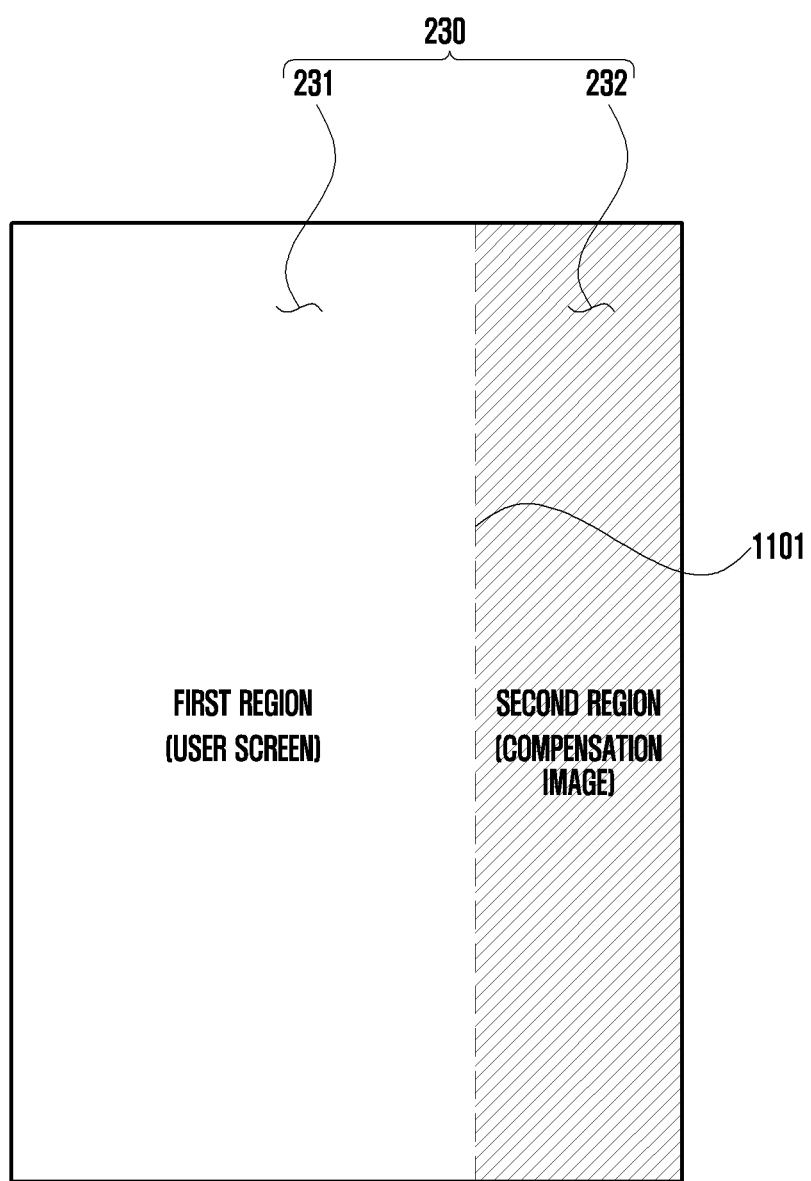
FIG. 11 schematically illustrates a screen displayed through a flexible display in a first state of an electronic device according to certain embodiments.

FIG. 11 schematically illustrates a screen displayed through the flexible display 230 in a first state of the electronic device 200 according to certain embodiments. For example, FIG. 11 illustrates an example state in which, while the electronic device 200 is disposed in the first state, a first region 231 of the flexible display 230 displays a user screen and a second region 232 displays a compensation image.

According to an embodiment, the flexible display 230 may include the first region 231 and the second region 232. The first region 231 may indicate a region of the display that is maintained in visible exposure to an exterior environment of the electronic device 200, regardless of movement or configuration of at least a portion of the housing (e.g., the housing 240 in FIG. 2). The second region 232, in contrast, may be variably exposed to the external environment, or stowed within the housing, depending on a change in the configuration of the housing 240.

According to an embodiment, the electronic device 200 may be configured in a first state in which the second region 232 is stowed within the housing (and thus not visible from an external environment), a second state in which the entire region of the second region 232 is extended out of the housing and thus visible, and a third state which may include an intermediate state between the first state and the second state, where the second region 232 is partly extended and partly stowed. According to an embodiment, the processor 120 may detect, through the sensor module 176, whether the electronic device 200 is in the first state, the second state, or the third state.

According to certain embodiments, in the first state, the first region 231 of the flexible display 230 may be configured to display a user screen (e.g., a user interface), and the second region 232 displays a compensation image. Although not illustrated, in the third state, the first region 231 and a portion of the second region 232 may display the user screen, and another portion of the second region 232, which is not viewed outside, may display a compensation image.

According to an embodiment, the processor 120 may output a synchronization signal, image data, and/or compensation data, such that the DDI 930 drives the flexible display 230. According to an embodiment, in the first state of the electronic device 200, the DDI 930 may drive, based on image data input from the processor 120, the flexible display 230 such that the first region 231 of the flexible display 230 displays a user screen. According to an embodiment, in the first state of the electronic device 200, the DDI 930 may drive, based on compensation data input from the processor 120, the flexible display 230 such that the second region 232, which is stowed within the housing, displays a compensation image. According to an embodiment, in the third state of the electronic device 200, the DDI 930 may drive, based on compensation data input from the processor 120, the flexible display 230 such that a portion of the second region 232, which is stowed within the housing, display a compensation image.

According to an embodiment, the processor 120 may generate compensation data using various methods. According to an embodiment, the processor 120 may predict whether, for an entire display region or at least one region-of-interest of the flexible display 230, a residual image issue is caused by a hysteresis characteristic of a thin film transistor disposed in a pixel, or whether burn-in is caused by the deviation between driving times (e.g., accumulated emission times) of an OLED for multiple pixels. According to an embodiment, the processor 120 may divide the entire display region into multiple block regions having a designated size or a designated resolution, and calculate the degree of a residual image or the degree of burn-in for each block region. According to an embodiment, the processor 120 may change information about the luminance of each block region into histogram information, and may use statistical information (e.g., maximum value calculation, minimum value calculation, average value calculation, mode value calculation, or median value calculation) such as average and variance to evaluate whether a residual image or burn-in is caused in each block region. In another embodiment, the processor 120 may change information about the chrominance and color temperature of each block region into histogram information, and may use statistical information such as average or variance to evaluate whether a residual image or burn-in is caused in each block region. In another embodiment, the processor 120 may image information corresponding to each block region, and may use an image-processing technique, such as an image edge detection technique, an image segmentation technique, or an image feature detection technique, to evaluate whether a residual image or burn-in is caused. In another embodiment, the processor 120 may configure image information correspond-ing to each block region as an input value of machine learning algorithm, and may train the algorithm such that the algorithm can evaluate whether a residual image or burn-in is caused. According to an embodiment, the processor 120 may generate compensation data on the basis of the result of calculating the degree of a residual image or the degree of burn-in in each block region. According to an embodiment, the processor 120 may perform control such that the entire second region 232 displays compensation image based on the compensation data in the first state, or that a portion of the second region 232, which is not visually exposed outwards, displays a compensation image based on the compensation data in the third state, thereby reducing a so-called residual image or burn-in phenomenon in which a boundary line 1101 between the first region 231 and the second region 232 is viewed or lines is viewed around the boundary line 1101 is view.

According to an embodiment, the processor 120 may generate compensation data at a designated period, and may supply the generated compensation data to the DDI 930. According to an embodiment, the DDI 930 may receive compensation data for each designated period, and may drive the flexible display 230 to display a compensation image according to the received compensation data. In another embodiment, the DDI 930 itself may generate compensation data. In this case, the DDI 930 itself may generate compensation data without receiving compensation data from the processor 120.

Figure 12:
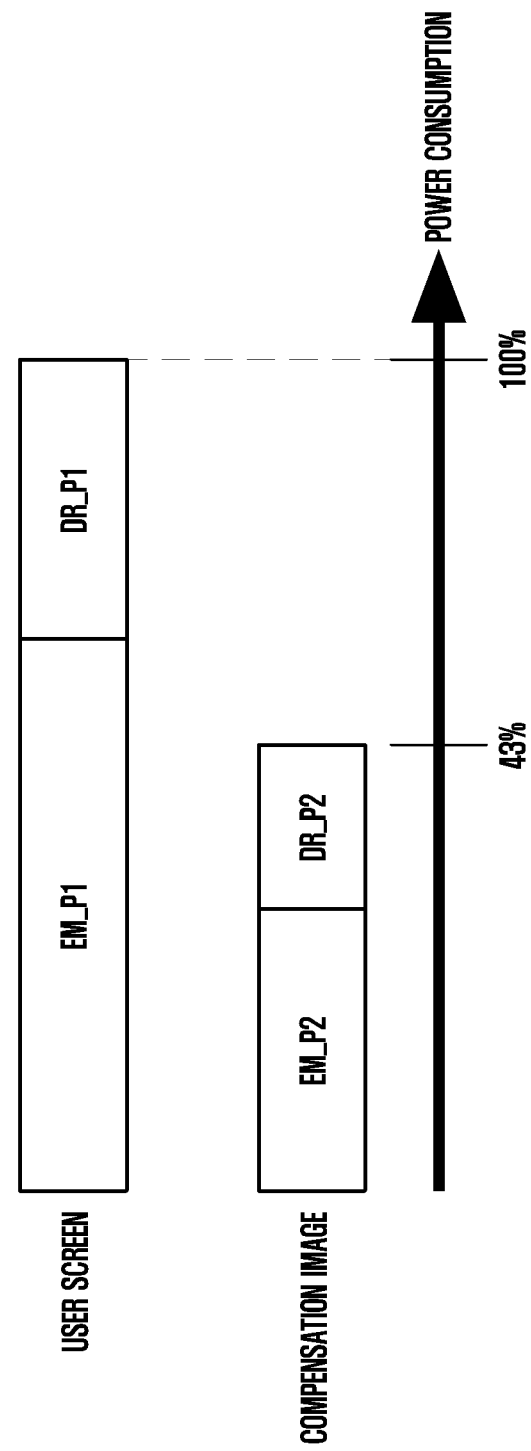
FIG. 12 illustrates an example in which an electronic device according to certain embodiments reduces power consumption by controlling a driving frequency and/or a light emission frequency for each partial region of a flexible display.

FIG. 12 illustrates an example in which the electronic device 200 according to certain embodiments reduces power consumption by controlling a driving frequency and/or a light emission frequency for each partial region of the flexible display 230.

Referring to FIG. 12, the electronic device 200 according to certain embodiments may control a driving frequency and/or a light emission frequency of the second region 232 displaying a compensation image to be different from a driving frequency and/or a light emission frequency of the first region 231 displaying a user screen in a first state (or a third state). For example, the electronic device 200 may control the driving frequency and/or the light emission frequency of the second region 232 displaying a compensation image to be equal to or lower than the driving frequency and/or the light emission frequency of the first region 231 displaying a user screen. For example, in the first state of the electronic device 200, a compensation image output through the second region 232 may be visually invisible to a user, and thus, image degradations, such as flickering, may be less of a concern. Therefore, the electronic device 200 according to certain embodiments may reduce power consumption by controlling display in the second region 232 to utilize low-frequency driving and low-frequency light emission, while the first region 231 which remains visible to users continues to operate at a normal frequency.

According to the illustrated example, a first power consumption degree may be utilized when a portion of the first region 231 is normalized according to a first display resolution. Here, a user screen may be displayed having a value obtained by adding first light-emitting power consumption EM_P1 according to light-emitting of a pixel to first driving power consumption DR_P1 according to driving of a pixel. For example, the first light-emitting power consumption EM_P1 may be determined based on a first light emission frequency for controlling a duration of light emission of the first region 231. For example, the first driving power consumption DR_P1 may be determined based on a first driving frequency for controlling operation of the first region 231.

According to the illustrated example, a second power consumption degree may be utilized when a portion of the second region 232 is normalized according to the first display resolution, like the first region 231. Here, a compensation image may be displayed having a value obtained by adding second light-emitting power consumption EM_P2 according to light-emitting of a pixel, to second driving power consumption DR_P2 according to driving of a pixel. For example, the second light-emitting power consumption EM_P2 may be determined based on a second light emission frequency for controlling the light-emitting duration of the second region 232. For example, the second driving power consumption DR_P2 may be determined based on a second driving frequency for controlling driving of the second region 232.

According to the illustrated example, in the first state, the electronic device 200 may reduce an amount of power consumption by controlling the driving frequency and light emission frequency of the second region 232 to be low, while displaying in the second region 232 a compensation image. For example, if a first degree of power consumed when a portion of the first region 231 is displays the user screen and is normalized to the first resolution corresponds to 100%, the second degree of power consumed when a portion of the second region 232 is normalized to the first resolution while displaying a compensation image may correspond to about 43%. This leverages improved gradual increases in scan rate for driving the flexible display 230. In certain embodiments herein, because operational power consumption increases as a driving frequency increases, it is possible to reduce power consumption by reducing the light emission frequency of at least a portion of the second region 232 when stowed.

A method in which the electronic device 200 according to certain embodiments herein controls the second region 232, which is displaying a compensation image in the first state or the third state, by low-frequency driving and low-frequency light emission may include various methods such as examples illustrated in FIGS. 13 to 18 according to the scan direction of the flexible display 230. For example, FIGS. 13 to 14C may show a method for controlling low-frequency driving and low-frequency light emission according to the case in which the first region 231 and the second region 232 are disposed adjacent to each other in the scan direction of the display. For example, FIGS. 15 to 18 may show a method for controlling low-frequency driving and low-frequency light emission according to the case in which the first region 231 and the second region 232 are disposed adjacent to each other in a direction perpendicular to the scan direction of the display.

Figure 13:
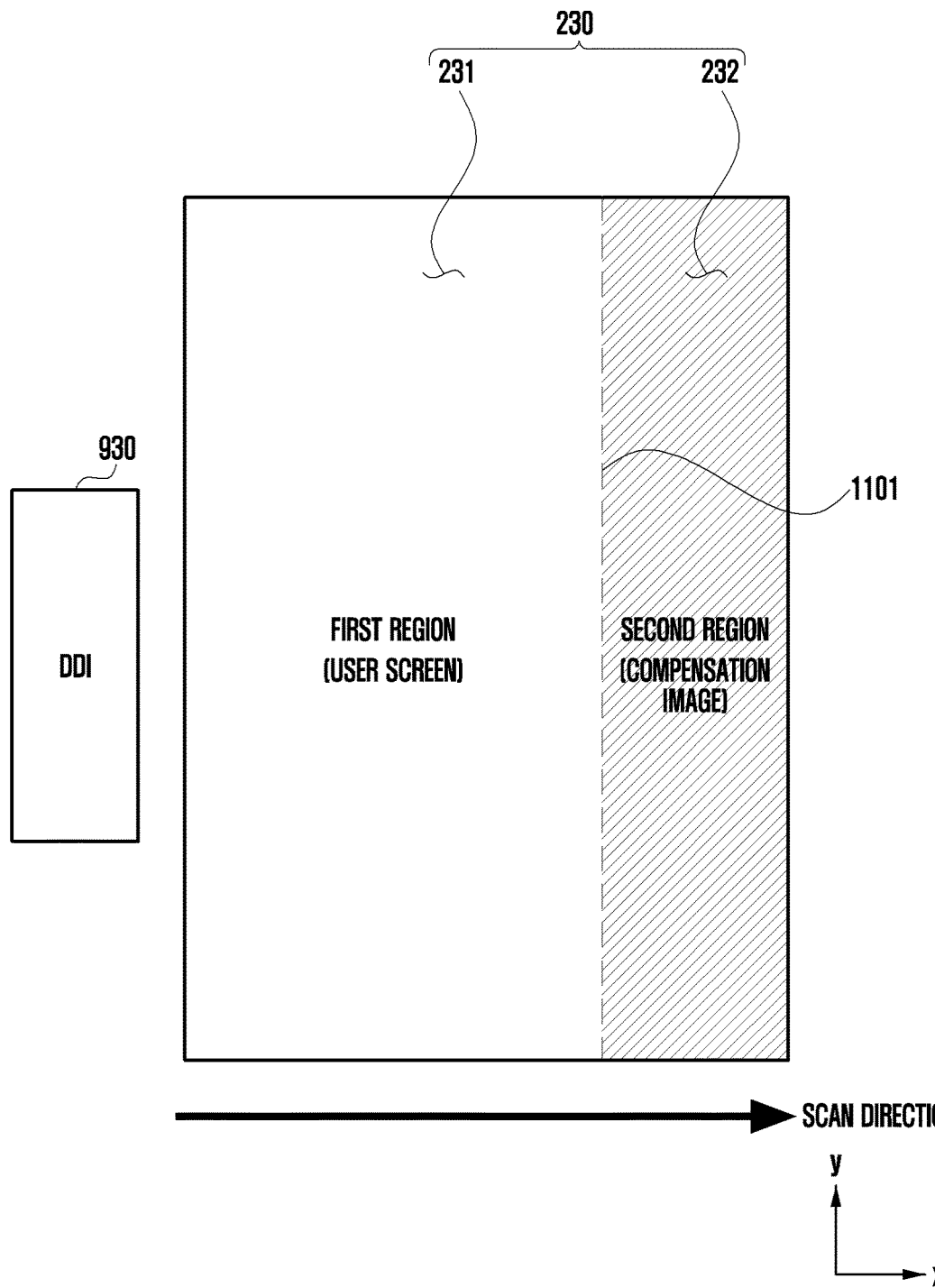
FIG. 13 illustrates a flexible display showing the case in which a first region and the second region according to an embodiment are disposed adjacent to each other in a scan direction of the display.
Figure 14A:
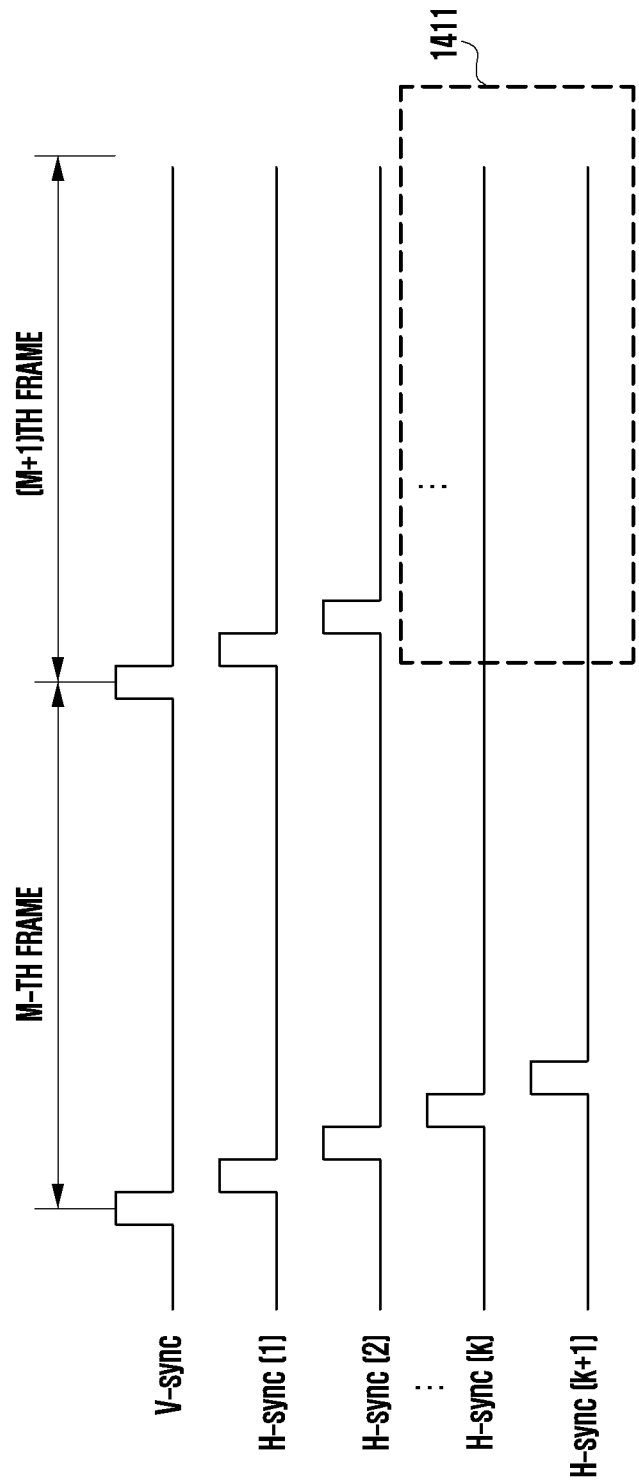
FIG. 14A illustrates a method in which an electronic device according to an embodiment controls low-frequency driving by masking at least a portion of a horizontal synchronization signal.
Figure 14B:
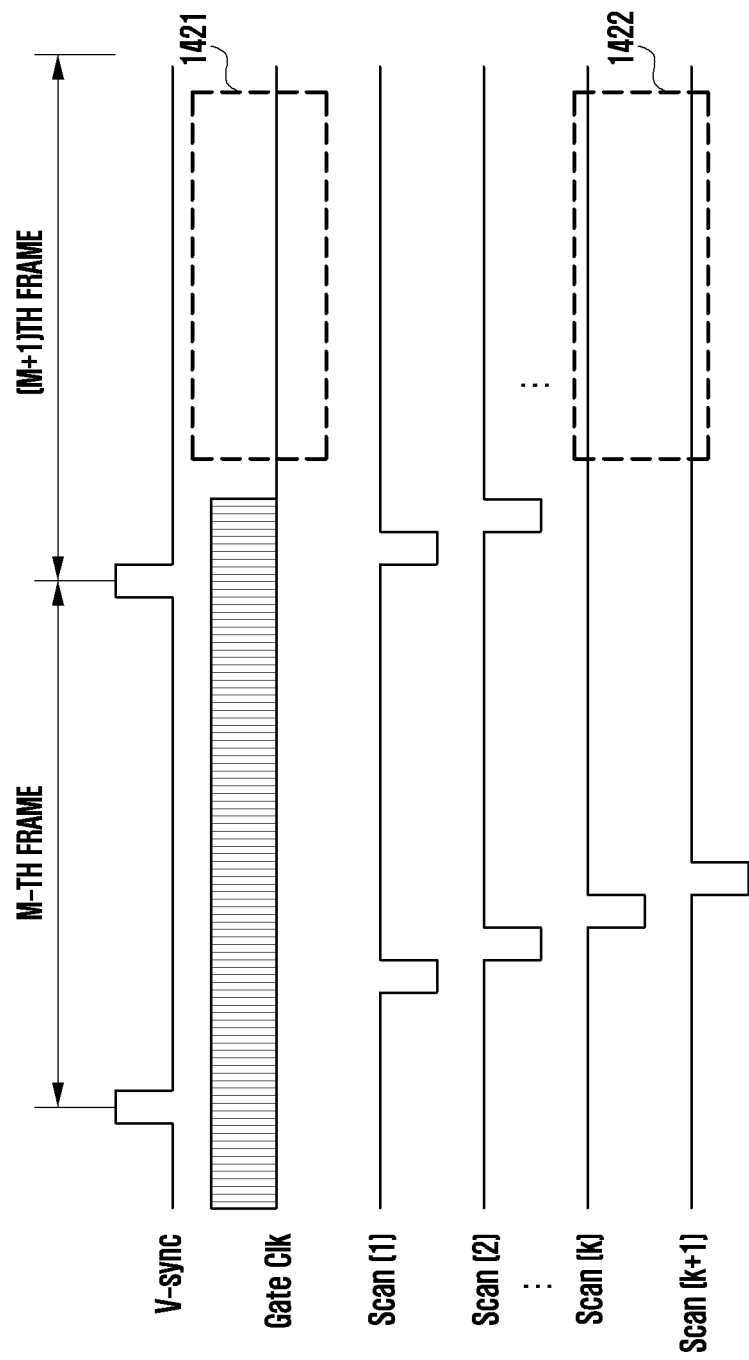
FIG. 14B illustrates a method in which an electronic device according to an embodiment controls low-frequency driving by masking at least a portion of a scan signal.
Figure 14C:
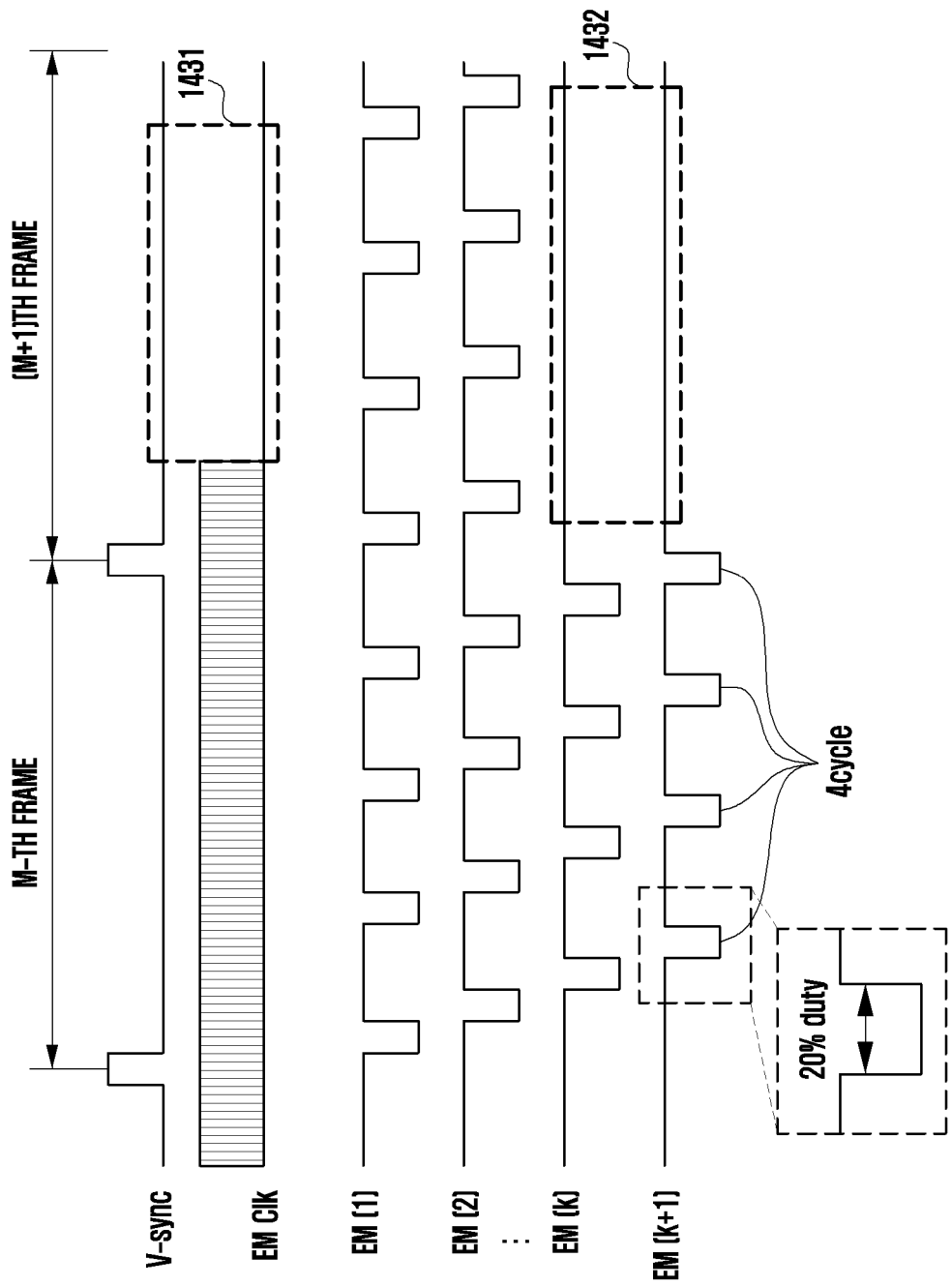
FIG. 14C illustrates a method in which an electronic device according to an embodiment controls low-frequency light emitting by masking at least a portion of a light emission signal.

FIG. 13 illustrates a flexible display 230 disposed in a state in which a first region 231 and a second region 232 according to an embodiment are adjacent to each other along a scan direction of the display. FIG. 14A illustrates a method in which the electronic device 200 according to an embodiment controls low-frequency driving by masking at least a portion of a horizontal synchronization signal. FIG. 14B illustrates a method in which the electronic device 200 according to an embodiment controls low-frequency driving by masking at least a portion of a scan signal. FIG. 14C illustrates a method in which the electronic device 200 according to an embodiment controls low-frequency light emitting by masking at least a portion of a light emission signal.

Referring to FIG. 13, the flexible display 230 may include multiple gate lines (not shown) and multiple data lines (not shown). According to an embodiment, the flexible display 230 may include multiple pixels (not shown) disposed in respective regions in which the gate lines cross the data lines. According to an embodiment, the multiple gate lines, for example, may be formed in the x-direction (e.g., transverse direction) of the flexible display 230, and may be disposed to be spaced apart each other in the y-direction (e.g., longitudinal direction). According to an embodiment, the multiple data lines, for example, may be formed in the y-direction (e.g., longitudinal direction) perpendicular to the x-direction of flexible display 230, and may be disposed to be spaced apart from each other in the x-direction (e.g., the transverse direction). According to an embodiment, each pixel may receive a scan signal and a light emission signal through a gate line, and may receive a data signal through a data line.

In certain embodiments herein, the scan direction of the flexible display 230 may be defined as a direction perpendicular to the direction in which the gate lines are disposed. For example, when the multiple gate lines are disposed in the x-direction, the scan direction of the flexible display 230 may be defined to be the y-direction. For example, when the multiple gate lines are disposed in the y-direction, the scan direction of the flexible display 230 may be defined to be the x-direction.

According to the example illustrated in FIG. 13, the multiple gate lines may be disposed in the y-direction, and the scan direction of the flexible display 230 may be defined to be the x-direction. According to an embodiment, the DDI 930 and the flexible display 230 may be adjacent to each other along the scan direction. According to an embodiment, when the first region 231 and the second region 232 are disposed adjacent to each other along the scan direction of the display, the boundary line 1101 between the first region 231 and the second region 232 may thus be perpendicular to the scan direction.

According to an embodiment, when the scan direction and the boundary line 1101 between the first region 231 and the second region 232 are disposed perpendicular to each other, the electronic device 200 may control, as illustrated in FIG. 14A, low-frequency driving of the second region 232 by masking at least a portion of a horizontal synchronization signal.

According to an embodiment, although not illustrated, the electronic device 200 may control low-frequency driving of the second region 232 by independently controlling a first gate start signal for controlling starting of the scan of the first region 231 and a second gate start signal for starting the scan of the second region 232.

Referring to FIG. 14A, in a first state (or a third state), the electronic device 200 according to an embodiment may output first horizontal synchronization signals H-sync (1) and H-sync (2) for controlling output timing of first scan signals (e.g., the first scan signals Scan (1) and Scan (2) in FIG. 14B) supplied to gate lines disposed in the first region 231 for each frame for low-frequency driving of the second region 232. In the first state (or the third state), the electronic device 200 according to an embodiment may output second horizontal synchronization signals H-sync (k) and H-sync (k+1) for controlling output timing of second scan signals (e.g., the second scan signals Scan (k) and Scan (k+1) in FIG. 14B) supplied to gate lines disposed in the second region 232 at a designated k frame period. For example, the electronic device 200 may output the second horizontal synchronization signals H-sync (k) and H-sync (k+1) at a specific frame (e.g., an m-th frame) in which the k frame period comes.

According to an embodiment, the m-th frame included in FIG. 14A may illustrate an example operation of the electronic device 200 for a k-th frame duration. According to an embodiment, similarly to the m-th frame illustrated in FIG. 14A, for the k-th frame duration, the electronic device 200 may output the first horizontal synchronization signals H-sync(1) and H-sync(2) for controlling output timing of the first scan signal Scan(1) and Scan(2), and may output the second horizontal synchronization signals H-sync(k) and H-sync(k+1) for controlling output timing of the second scan signals Scan(k) and Scan(k+1).

According to an embodiment, an (m+1)th frame include in FIG. 14A may illustrate an example operation of the electronic device 200 for one frame duration of a first frame to a (k−1)th frame duration. According to an embodiment, similarly to the (m+1)th frame illustrated in FIG. 14A, during the first frame to the (k−1)th frame, the electronic device 200 may output the first horizontal synchronization signals H-sync(1) and H-sync(2) for controlling output timing of the first scan signals Scan(1) and Scan(2), and, as in reference number 1411, may omit output of the second horizontal synchronization signals H-sync(k) and H-sync(k+1) for controlling output timing of the second scan signals Scan(k) and Scan(k+1). According to an embodiment, in the first state or the third state of the electronic device 200, the number of the second horizontal synchronization signals H-sync(k) and H-sync(k+1) which are masked, that is, the number of the second horizontal synchronization signals H-sync(k) and H-sync(k+1) which are omitted from output, may vary based on the width of a user region (e.g., the user region UA in FIG. 20) sensed through the sensor module 176. According to an embodiment, the user region UA may be a region for displaying a user screen. For example, the user region UA in the first state of the electronic device 200 may be the first region 231, and the user region UA in the third state may be a region which corresponds to the sum of the first region 231 and a portion of the second region 232 visually exposed outwards.

Similarly to the (m+1)th frame illustrated in FIG. 14A, during the first frame to the (k−1)th frame, the electronic device 200 according to certain embodiments may not output the second horizontal synchronization signals H-sync (k) and H-sync(k+1) for controlling output timing of the second scan signals Scan(k) and Scan(k+1), thereby performing control such that the driving frequency of the second region 232 is equal to or lower than the driving frequency of the first region 231.

According to an embodiment, when disposed such that the scan direction is set at right angles relative to the boundary line 1101 between the first region 231 and the second region 232, the electronic device 200 may control low-frequency driving by masking at least a portion of a gate clock signal or at least a portion of a scan signal, as illustrated in 14B.

Referring to FIG. 14B, the electronic device 200 according to an embodiment may output and/or supply, in a first state (or a third state), first scan signals Scan(1) and Scan(2) to gate lines disposed in the first region 231 for each frame for low-frequency driving of the second region 232. The electronic device 200 according to an embodiment may output and/or supply, in the first state (or the third state), second scan signals Scan (k) and Scan (k+1) to gate lines disposed in the second region 232 at a designated k frame period. For example, the electronic device 200 may output the second scan signals Scan (k) and Scan (k+1) at a specific frame in which the k frame period comes (e.g., and excluding output at other non k frame period frames).

According to an embodiment, an m-th frame illustrated in FIG. 14B may illustrate an example operation of the electronic device 200 for a k-th frame duration. According to an embodiment, similarly to the m-th frame illustrated in FIG. 14B, for the k-th frame duration, the electronic device 200 may output the first scan signals Scan(1) and Scan(2), and may output the second scan signals Scan(k) and Scan(k+1).

According to an embodiment, an (m+1)th frame illustrated in FIG. 14B may illustrate an example operation of the electronic device 200 for one frame duration of a first frame to (k−1)th frame duration. According to an embodiment, for the first frame to (k−1)th frame duration, the electronic device 200 may omit output of the second scan signals Scan (k) and Scan (k+1) by masking a portion of a gate clock signal like reference number 1421. According to an embodiment, similarly to the (m+1)th frame illustrated in FIG. 14B, during the first frame to the (k−1)th frame, the electronic device 200 may output the first scan signals Scan(1) and Scan(2), and may omit output of the second scan signals Scan(k) and Scan(k+1) as in reference number 1422. According to an embodiment, in the first state or the third state of the electronic device 200, the number of the second scan signals Scan(k) and Scan(k+1) which are masked, that is, the number of the second scan signals Scan(k) and Scan(k+1) which are omitted from output, may vary based on the width of a user region (e.g., the user region UA in FIG. 20) sensed through the sensor module 176. For example, the user region UA in the first state of the electronic device 200 may be the first region 231, and the user region UA in the third state may be a region which corresponds to the sum of the first region 231 and a portion of the second region 232 visually exposed outwards.

Similarly to the (m+1)th frame illustrated in FIG. 14B, during the first frame to the (k−1)th frame, the electronic device 200 according to certain embodiments may omit output of the second scan signals Scan(k) and Scan(k+1), thereby setting the driving frequency of the second region 232 to be equal to or less than the driving frequency of the first region 231.

According to an embodiment, when disposed such that the scan direction is set at right angles to the boundary line 1101 between the first region 231 and the second region 232, the electronic device 200 may control low-frequency light emission by masking at least a portion of a light emission signal, as illustrated in 14C.

Referring to FIG. 14C, the electronic device 200 according to an embodiment may output and/or supply, in a first state (or a third state), first light emission signals EM (1) and EM (2) to a light emission signal line (not shown) disposed in the first region 231 for each frame for low-frequency light emission of the second region 232. The electronic device 200 according to an embodiment may output and/or supply, in the first state (or the third state), the second light emission signals EM (k) and EM (k+1) to light emission signal lines disposed in the second region 232 at a designated k frame period. For example, the electronic device 200 may output the second light emission signals EM (k) and EM (k+1) at a specific frame in which the k frame period comes (e.g., and excluding other frames outside the k frame period).

According to an embodiment, an m-th frame illustrated in FIG. 14C may illustrate an example operation of the electronic device 200 for a k-th frame duration. According to an embodiment, similarly to the m-th frame illustrated in FIG. 14C, for the k-th frame duration, the electronic device 200 may output the first light emission signals EM (1) and EM (2), and the second light emission signals EM (k) and EM (k+1).

According to an embodiment, an (m+1)th frame illustrated in FIG. 14C may illustrate an example operation of the electronic device 200 for one frame duration of a first frame to (k−1)th frame duration. According to an embodiment, for the first frame to (k−1)th frame duration, the electronic device 200 may omit output of the second light emission signals EM (k) and EM (k+1) by masking a portion of a light emission clock signal as in reference number 1431. According to an embodiment, similar to the (m+1)th frame illustrated in FIG. 14C, during the first frame to the (k−1)th frame, the electronic device 200 may output the first light emission signals EM (1) and EM (2), and may omit output of the second light emission signals EM (k) and EM (k+1), as seen in reference number 1432. According to an embodiment, in the first state or the third state of the electronic device 200, the number of the second light emission signals EM (k) and EM (k+1) which are masked, that is, the number of the second light emission signals EM (k) and EM (k+1) which are omitted from output, may vary based on the width of a user region (e.g., the user region UA in FIG. 20) sensed through the sensor module 176. For example, the user region UA in the first state of the electronic device 200 may be the first region 231, and the user region UA in the third state may be a region which corresponds to the sum of the first region 231 and a portion of the second region 232 visually exposed outwards.

Similarly to the (m+1)th frame illustrated in FIG. 14C, during the first frame to the (k−1)th frame, the electronic device 200 according to certain embodiments may omit output of the second light emission signals EM (k) and EM (k+1), thereby setting the light emission frequency of the second region 232 to be lower than the light emission frequency of the first region 231.

According to certain embodiments, the electronic device 200 may differentiate the number of cycles of a light emission signal per frame with respect to the first region 231 and the second region 232. For example, the electronic device 200 may supply, for each frame, the first light emission signal to each of light emission signal lines disposed in the first region 231 "a" number of times (e.g., "a" cycle driving per frame), and may supply, at the k frame period, the second light emission signal to each of light emission signal lines disposed in the second region 232 "b" number of times, in which the "b" number of times is less than the "a" number of times (e.g., "b" cycle driving per frame).

Figure 15:
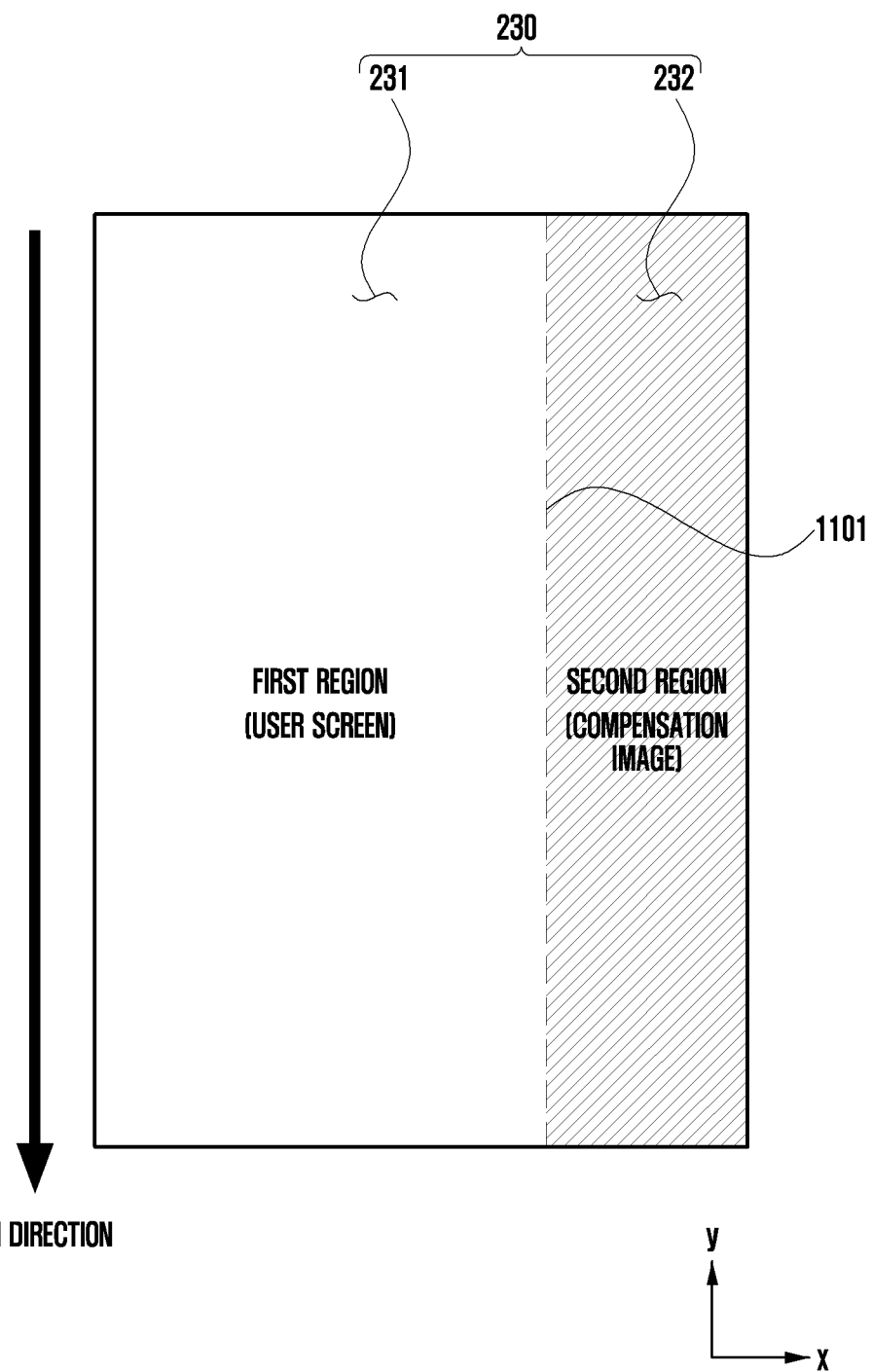
FIG. 15 illustrates a flexible display showing the case in which a first region and the second region according to an embodiment are disposed adjacent to each other in a direction perpendicular to the scan direction of the display.
Figure 16:
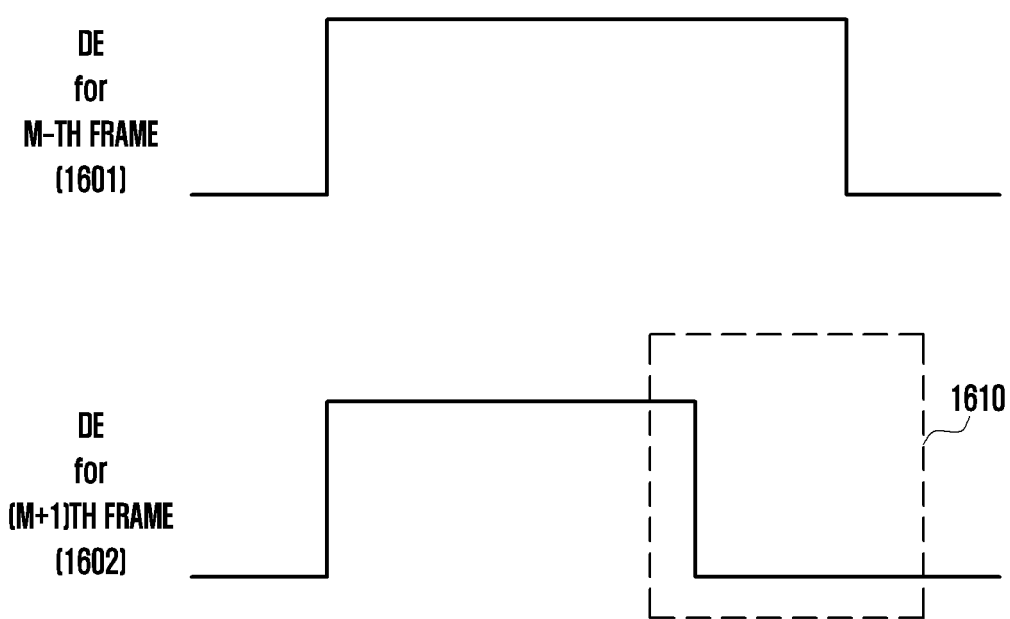
FIG. 16 illustrates a method in which an electronic device according to an embodiment controls low-frequency driving by masking at least a portion of a data enable signal.
Figure 17:
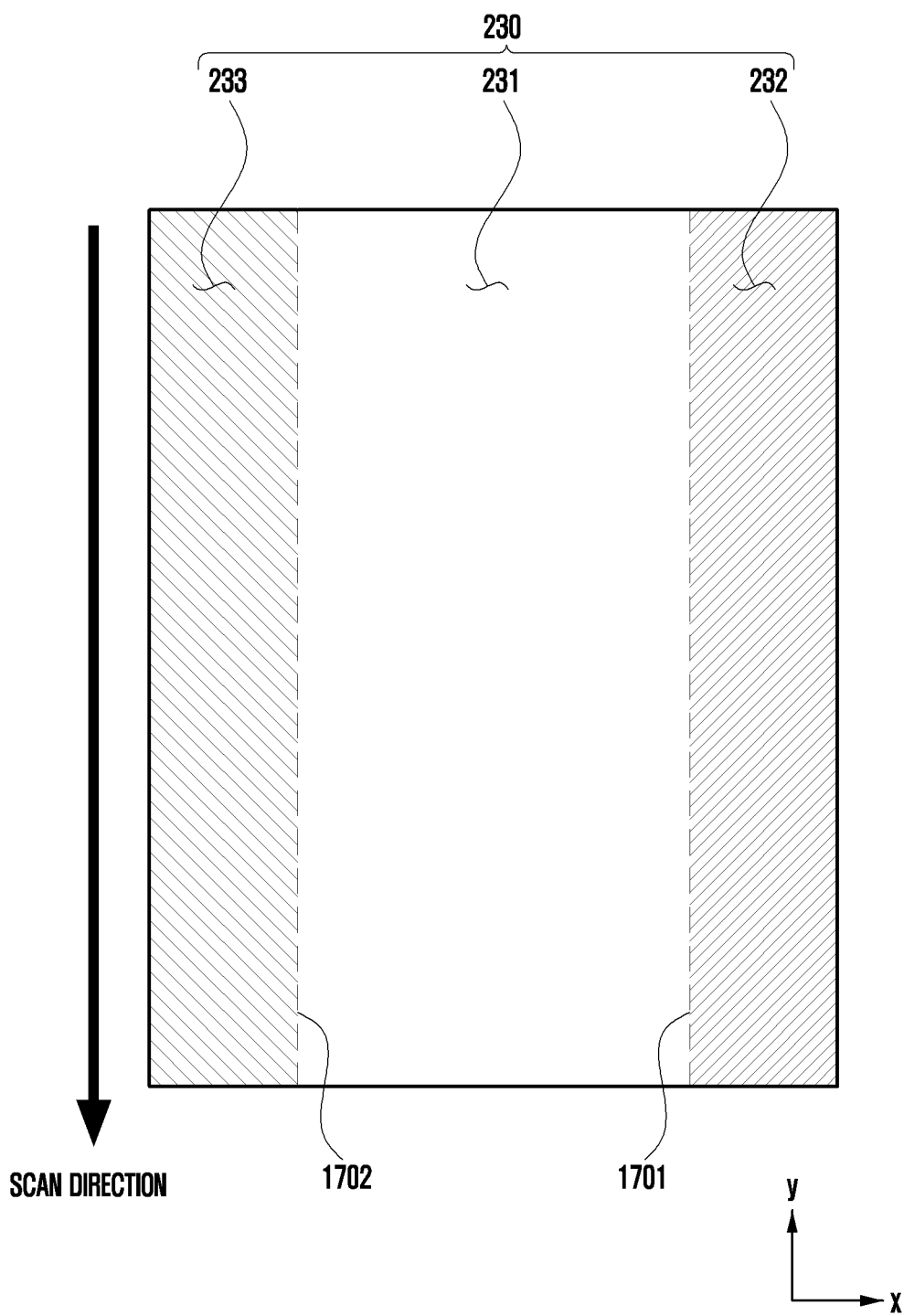
FIG. 17 illustrates a method in which an electronic device according to another embodiment controls low-frequency driving by masking at least a portion of a data enable signal.
Figure 18:
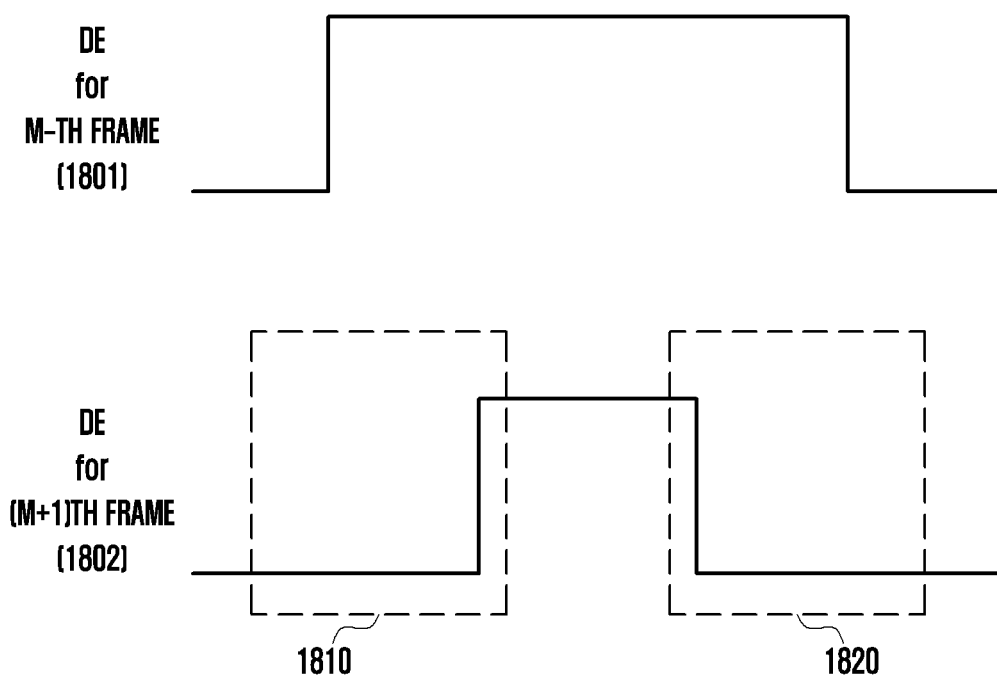
FIG. 18 illustrates an example in which an electronic device according to an embodiment controls low-frequency driving of a second region and a third region by masking at least a portion of a data enable signal.

FIG. 15 includes a flexible display 230 illustrating a state in which a first region 231 and a second region 232 according to an embodiment are disposed adjacent to each other along a direction perpendicular to the scan direction of the display. FIG. 16 illustrates a method in which an electronic device 200 according to an embodiment controls low-frequency driving by masking at least a portion of a data enable signal. FIG. 17 illustrates a method in which an electronic device 200 according to another embodiment controls low-frequency driving by masking at least a portion of a data enable signal. FIG. 18 illustrates an example in which an electronic device according to an embodiment controls low-frequency driving of a second region and a third region by masking at least a portion of a data enable signal.

Referring to FIG. 15, multiple gate lines (not shown) of the flexible display 230 may be disposed in the x-direction, and the scan direction of the flexible display 230 may be defined to be the −y-direction. According to an embodiment, the DDI 930 and the flexible display 230 may be disposed adjacent to each other along a direction perpendicular to the scan direction. According to an embodiment, when the first region 231 and the second region 232 are disposed adjacent to each other along a direction perpendicular to the scan direction of the display, a boundary line 1101 between the first region 231 and the second region 232 may be set parallel to the scan direction.

When disposed such that the scan direction is parallel to the boundary line 1101 between the first region 231 and the second region 232, the electronic device 200 according to certain embodiments may control, as illustrated in FIG. 16, low-frequency driving of the second region 232 by masking at least a portion of a data enable signal.

Referring to FIG. 16, the electronic device 200 according to an embodiment may output, in a first state (or a third state), a first data enable signal controlling output timing of a data signal supplied to each of data lines disposed in the first region 231 for each frame. According to an embodiment, in the first state (or the third state), the electronic device may output a second data enable signal controlling a data signal supplied to each of data lines disposed in the second region 232 at a k frame period, for low-frequency operation of the second region 232.

According to an embodiment, a signal 1601 in FIG. 16 may indicate a data enable signal DE for an m-th frame, which is an example of k-th frame duration of the electronic device 200. According to an embodiment, the electronic device 200 may output both the first data enable signal and the second data enable signal for the k-th frame duration.

According to an embodiment, a signal 1602 in FIG. 16 may indicate a data enable signal DE for a (m+1)th frame, which may be an example of one frame duration of one frame of a first frame to (k−1)th frame duration of the electronic device 200. According to an embodiment, the electronic device 200 may output the first data enable signal for the first frame to (k−1)th frame duration, but may omit output of the second data enable signal, as in reference number 1610. According to an embodiment, in the first state or the third state of the electronic device 200, the width of the masked second data enable signal, that is, the second data enable signal which is omitted from output, may vary based on the width of a user region (e.g., the user region UA in FIG. 20) detect through the sensor module 176. For example, a user region UA in the first state of the electronic device 200 may be the first region 231, and a user region UA in the third state may be a region which corresponds to the sum of the first region 231 and a portion of the second region 232 that is visible from an external environment of the electronic device via extraction from the housing.

Similarly to the (m+1)th frame illustrated in FIG. 16, the electronic device 200 according to certain embodiments, may omit output of the second data enable signal during the first frame to (k−1)th frame, thereby controlling the driving frequency of the second region 232 to be equal to or less than the driving frequency of the first region 231.

Referring to FIG. 17, the flexible display 230 according to another embodiment may include a first region 231 that is maintained visibly exposed to the exterior environment, a second region 232 extending from one end the first region 231 that is variably exposed or stowed, according to a configuration of the housing (e.g., the housing 240 in FIG. 2), or a third region 233 extending from an opposite end of the first region 231 and also variably exposed or stowed, depending on the configuration of the housing 240.

Referring FIG. 17, multiple gate lines (not shown) of the flexible display 230 may be disposed in the x-direction, and the scan direction of the flexible display 230 may be defined to be the −y-direction. According to an embodiment, the DDI 930 and the flexible display 230 may be disposed adjacent to one another along a direction perpendicular to the scan direction. According to an embodiment, when the first region 231 to the third region 233 are disposed adjacent to each other along a direction perpendicular to the scan direction of the display, a first boundary line 1701 between the first region 231 and the second region 232 may be set parallel to the scan direction, or a second boundary line 1702 between the first region 231 and the third region 233 may be set parallel to the scan direction.

According to an embodiment, when disposed such that the first boundary line 1701 between the first region 231 and the second region 232 is parallel to the scan direction, or the second boundary line 1702 between the first region 231 and the third region 233 is parallel to the scan direction, as illustrated in FIG. 18, the electronic device 200 may control low-frequency driving of the second region 232 and the third region 233 by masking at least a portion of a data enable signal.

Referring FIG. 18, the electronic device 200 according to an embodiment may output, in a first state (or a third state), a first data enable signal for controlling output timing of a data signal supplied to each of data lines disposed in the first region 231 for each frame. According to an embodiment, in the first state (or the third state), the electronic device 200 may output a second data enable signal for controlling a data signal supplied to each of data lines disposed in the second region 232 at a k frame period for low-frequency driving of the second region 232, and a third data enable signal for controlling a data signal supplied to each of data lines disposed in the third region 233.

According to an embodiment, a signal 1801 in FIG. 18 may indicate a data enable signal DE for an m-th frame, which is an example of k-th frame duration of the electronic device 200. According to an embodiment, the electronic device 200 may output for the k-frame duration, all of the first data enable signal to the third data enable signal.

According to an embodiment, a signal 1802 in FIG. 18 may indicate a data enable signal DE for a (m+1)th frame, which is an example of one frame duration of one frame of a first frame to a (k−1)th frame duration of the electronic device 200. According to an embodiment, the electronic device 200 may output the first data enable signal for the first frame to the (k−1)th frame duration, but may not output the second data enable signal as in reference number 1810 and may not output the third data enable signal as in reference number 1820. According to an embodiment, in the first state or the third state of the electronic device 200, the width of the second data enable signal or the third data enable signal, which is masked, that is, the second data enable signal or the data enable signal which is not output, may vary based on the width of a user region (e.g., the user region UA in FIG. 20), sensed through the sensor module 176. For example, a user region UA in the first state of the electronic device 200 may be the first region 231, and a user region UA in the third state may be a region which corresponds to the sum of the first region 231 and a portion of the second region 232 and/or a portion of the third region 233 visible exposed to the exterior environment.

Similarly to the (m+1)th frame illustrated in FIG. 18, during the first frame to the (k−1)th frame, the electronic device 200 according to certain embodiments may omit output of the second data enable signal and the third data enable signal, thereby performing control such that the driving frequency of the second region 232 and the driving frequency of the third region 233 is equal to or lower than the driving frequency of the first region 231.

Figure 19:
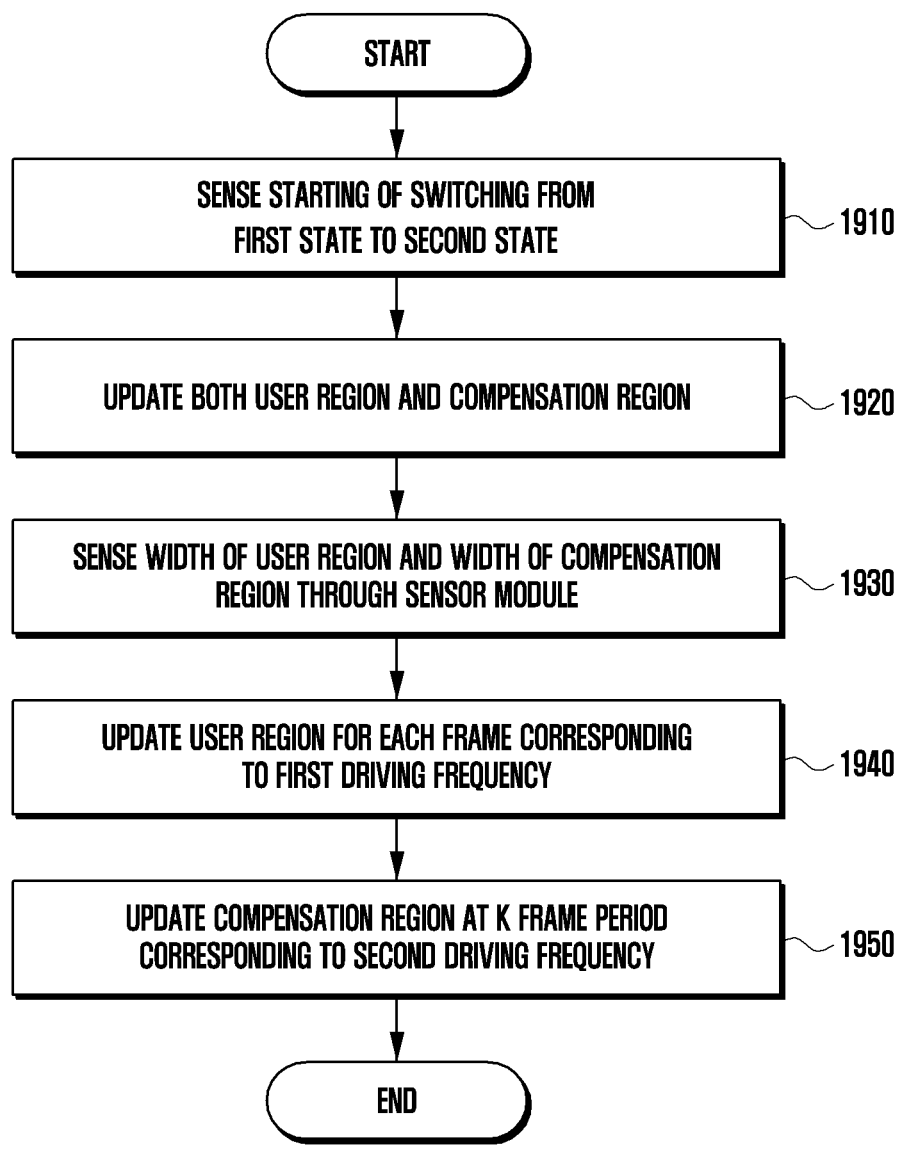
FIG. 19 is a flowchart illustrating operation of an electronic device according to certain embodiments.

FIG. 19 is a flowchart illustrating operations of the electronic device 200 according to certain embodiments.

At least some of the operations illustrated in FIG. 19 may be omitted. At least some operations described with reference to other drawings herein may be added before or after at least some operations illustrated in FIG. 19. The operations illustrated in FIG. 19 may be performed by a processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 19.

In operation 1910, the electronic device 200 according to an embodiment may detect initiation of a switch of the electronic device configuration from a first state to a second state. For example, the electronic device 200 may detect that the second region 232 is being extended out from the inner space of a housing (e.g., the housing 240 in FIG. 2).

Figure 20:
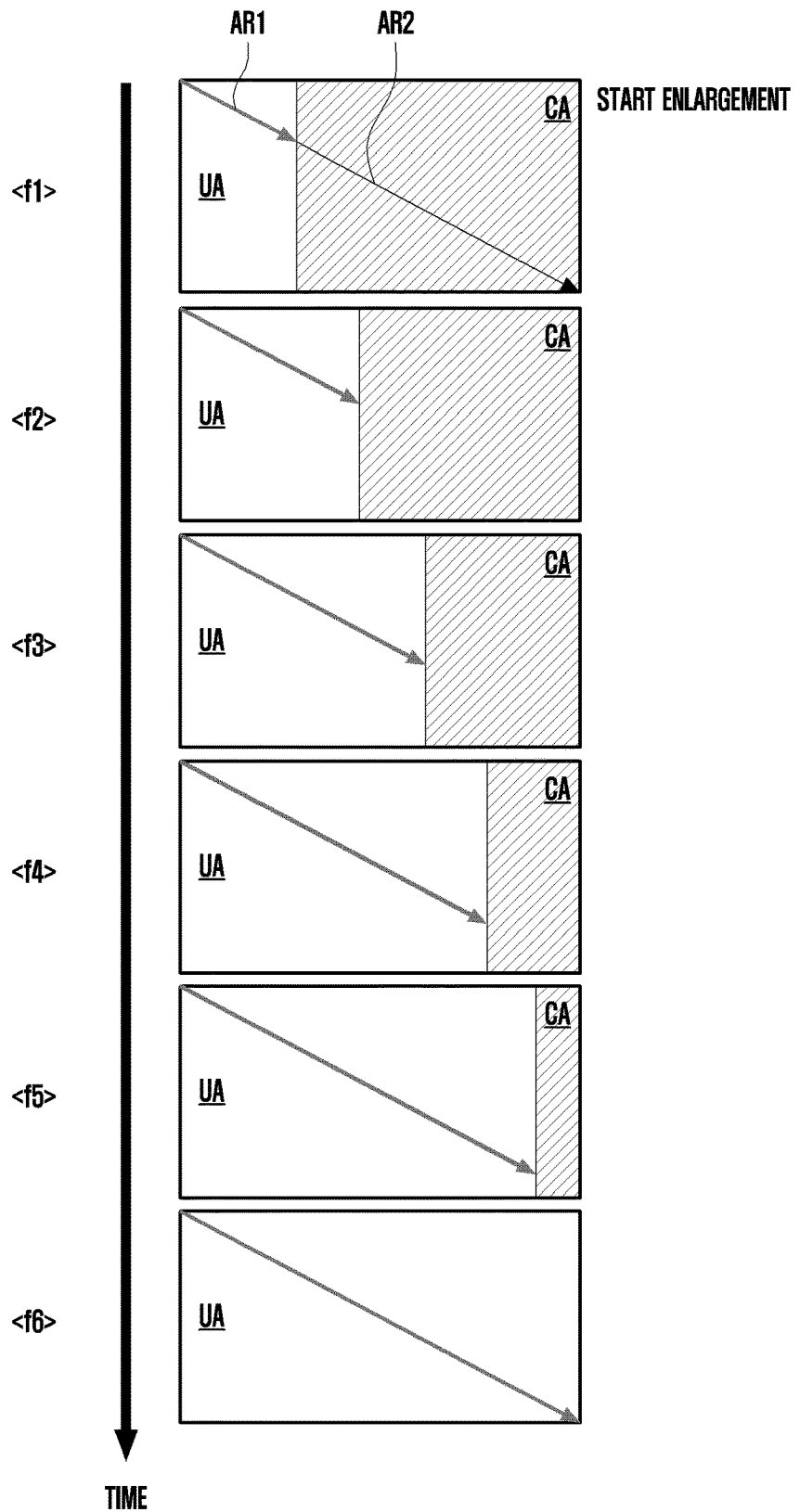
FIG. 20 illustrates a method in which an electronic device according to an embodiment updates, when switching from a first state to a second state, a screen on the basis of a time point of initially sensing the switching.

In operation 1920, the electronic device 200 according to an embodiment may update, in response to detecting the switching from the first state to the second state, both a user region (e.g., the user region UA in FIG. 20) and a compensation region (e.g., the compensation region CA in FIG. 20).

Hereinafter, the "user region UA" herein may indicate a region for displaying a user screen. For example, the user region UA in the first state of the electronic device 200 may include the first region 231, and the user region UA in the third state of the electronic device 200 may include a region obtained by adding the first region 231 and a portion of the second region 232, which is visually exposed outwards.

Hereinafter, the "compensation region CA" herein may indicate a region for displaying a compensation image. For example, the compensation region CA in the first state of the electronic device 200 may include the second region 232, and the compensation region CA in the third state of the electronic device 200 may include a portion the second region 232, which is not visible from an exterior environment.

According to an embodiment, when switching from the first state to the second state, the electronic device 200 may update both the user region UA and the compensation region CA. For example, regardless of a period of updating a compensation image displayed through the compensation region CA, and likewise, for example, regardless of the above-described k frame period, the compensation image may be updated when switching from the first state to the second state is detected.

In operation 1930, the electronic device 200 according to an embodiment may detect the width of the user region UA and the width of the compensation region CA through the sensor module 176. For example, the electronic device 200 may detect, while switching from the first state to the second state, that the width of the user region UA increases and the width of the compensation region CA decreases.

In operation 1940, the electronic device 200 according to an embodiment may update the user region UA for each frame, according to a first driving frequency. For example, the electronic device 200 may detect the width of a current user region UA for each frame, and may update a user screen based on the detected width of the user region UA.

In operation 1950, the electronic device 200 according to an embodiment may update the compensation region CA at a K frame period corresponding to a second driving frequency. For example, the electronic device 200 may update the compensation image when initiating the switch from the first state to the second state, and after the update, may update the compensation image based on the width of a current compensation region CA at the K frame period.

FIG. 20 illustrates a method in which the electronic device 200 according to an embodiment updates, when switching from a first state to a second state, a screen on the basis of a time point of initially sensing the switching.

In FIG. 20, the longitudinal direction indicates time, a first frame to a sixth frame f1, f2, f3, f4, f5, and f6 are illustrated.

In FIG. 20, UA may indicate a user region UA, and CA may indicate a compensation region CA.

In FIG. 20, AR1 may indicate that an update operation for the user region UA is performed, and AR2 may indicate that an update operation for the compensation region CA is performed.

Referring to FIG. 20, the electronic device 200 according to an embodiment may update an entire screen on the basis of starting of a switching operation, and subsequently may update a screen on the basis of a driving frequency predetermined for each of the first region 231 and the second region 232. In this case, since a component for generating a compensation image, for example, the processor 120 or the DDI 930, may not predict a time point of starting of the switching operation of the electronic device 200, and thus may control a compensation image preparation operation and a compensation image update operation in an asynchronous (ASync) manner. According to an embodiment, the electronic device 200 may store the maximum size of a compensation image in a frame buffer memory (not shown). According to an embodiment, the electronic device 200 may read a user screen (e.g., active contents) of the first region 231 from GRAM (e.g., the memory 933 in FIG. 9), and may read a compensation image of the second region 232 from a separate frame buffer memory (not shown).

Referring to FIG. 20, at a first frame f1, switching of the electronic device 200 according to an embodiment from the first state to the second state may start. At the first frame f1, the electronic device 200 according to an embodiment may update both the user region UA and the compensation region CA, as in operation 1920 in FIG. 19. According to an embodiment, the electronic device 200 may update both the user region UA and the compensation region CA in response to sensing (e.g., a "sensor trigger" time point) starting of switching from the first state to the second state. In another embodiment, the electronic device 200 may update both the user region UA and the compensation region CA at a time point at which a designated time (e.g., an n-th frame) has elapsed after sensing starting of switching from the first state to the second state (e.g., the "sensor trigger" time point).

During a second frame to a sixth frame f2 to f6 duration, the electronic device 200 according to an embodiment may update the user region UA so as to correspond to the width of the user region UA, which increases for each frame. If a designated period for updating the compensation region CA is longer than the duration of 6 frames, the electronic device 200 according to an embodiment may not update the compensation region CA while the user region UA is updated. For example, during a second frame to the sixth frame (f2 to f6), the electronic device 200 may perform control such that the compensation image updated at the first frame f1 is continuously displayed through the compensation region CA.

Figure 21:
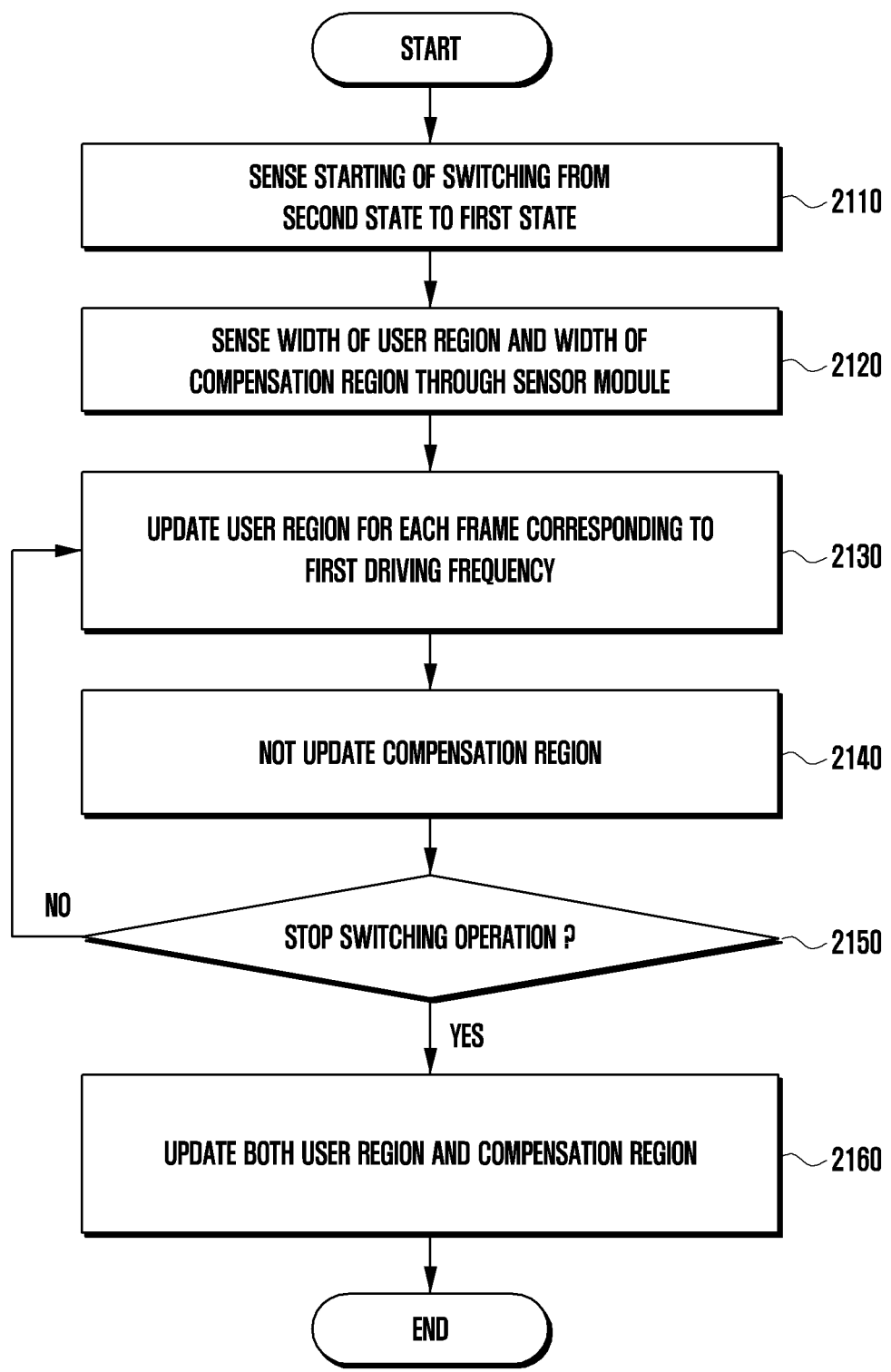
FIG. 21 is an operation flowchart illustrating a method for updating a screen when an electronic device according to an embodiment switches from a second state to a first state.

FIG. 21 is an operation flowchart illustrating a method for updating a screen when the electronic device 200 according to an embodiment switches from a second state to a first state.

At least some of the operations illustrated in FIG. 21 may be omitted. At least some operations described with reference to other drawings herein may be added before or after at least some operations illustrated in FIG. 21. The operations illustrated in FIG. 21 may be performed by a processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 21.

In operation 2110, the electronic device 200 according to an embodiment may detect initiation of a switch in electronic device configuration from a second state to a first state. For example, the electronic device 200 may detect that the second region 232 starts to retract into the inner space of a housing (e.g., the housing 240 in FIG. 2).

In operation 2120, the electronic device 200 according to an embodiment may detect the width of a user region UA and the width of a compensation region CA through the sensor module 176. For example, the electronic device 200 may detect that, while the electronic device is being switched from the second state to the first state, the width of the user region UA decreases and the width of the compensation region CA increases.

In operation 2130, the electronic device 200 according to an embodiment may update the user region UA for each frame corresponding to a first driving frequency. For example, the electronic device 200 may detect, for each frame, the width of a current user region UA, and may update the display of the user screen based on the detected width of the user region UA.

In operation 2140, the electronic device 200 according to an embodiment may omit update of the compensation region CA as the width of the compensation region CA increases.

In operation 2150, the electronic device 200 according to an embodiment may detect whether the switching from the second state to the first state terminates. For example, the electronic device 200 may detect whether increase in the width of the compensation region CA ceases. A state in which the electronic device 200 determines that the width of the compensation region CA ceases to increase may include the case in which the electronic device 200 has completed the switch to the first state, or the case in which the electronic device 200 stops while still disposed in the interim third state.

When detecting that the switch from the second state to the first state stops (e.g., when the result of operation 2150 is Yes), the electronic device 200 according to an embodiment may perform operation 2160.

When it is not detected that the switching from the second state to the first state stops (e.g., when the result of operation 2150 is No), the electronic device 200 according to an embodiment may reperform operation 2130.

In operation 2160, the electronic device 200 according to an embodiment may update both the user region UA and the compensation region CA.

Figure 22:
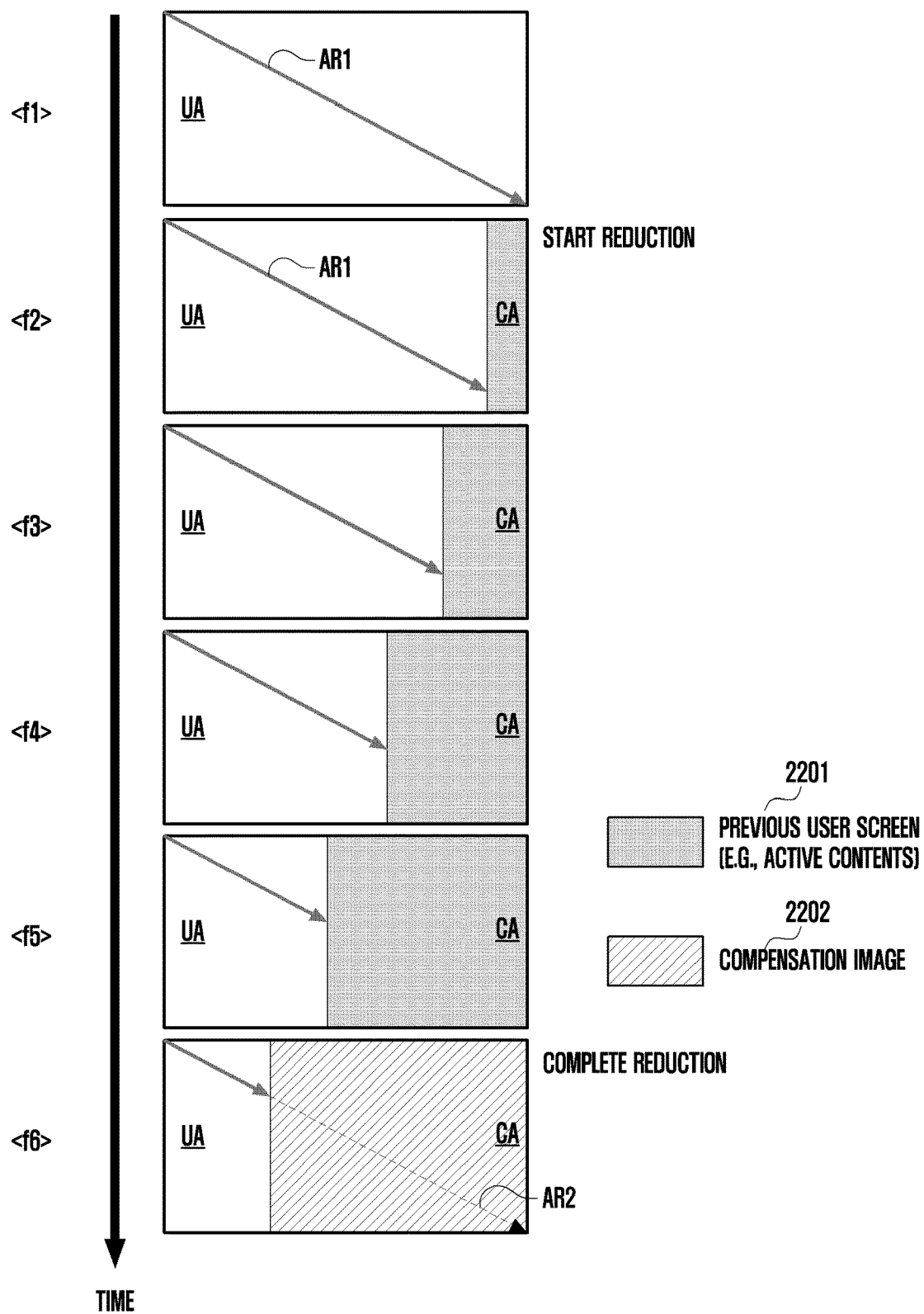
FIG. 22 illustrates a method for updating a screen when an electronic device according to an embodiment switches from a second state to a first state.

FIG. 22 illustrates a method for updating a screen when the electronic device 200 according to an embodiment switches from a second state to a first state.

In FIG. 22, the longitudinal direction indicates time, a first frame to a sixth frame f1, f2, f3, f4, f5, and f6 are illustrated.

In FIG. 22, UA may indicate a user region UA, and CA may indicate a compensation region CA.

In FIG. 22, AR1 may indicate that an update operation for the user region UA is performed, and AR2 may indicate that an update operation for the compensation region CA is performed.

In operation 22, a portion illustrated as hatching 2201 may indicate that the corresponding portion displays a previous user screen (e.g., active contents).

In operation 22, a portion illustrated as hatching 2202 may indicate that the corresponding portion displays a compensation image.

Referring to FIG. 22, at a second frame f2, switching of the electronic device 200 according to an embodiment from the second state to the first state may start. As in operations 21 2130 to 2150 in FIG. 21, during the second frame to a fifth frame f2 to f5, the electronic device 200 according to an embodiment may update the user region UA, but may not update the compensation region CA. For example, the electronic device 200 may display a previous user screen through the compensation region CA during the second frame to the fifth frame f2 to f5. The previous user screen may include, for example, a portion of a user screen displayed at a first frame f1.

The electronic device 200 according to an embodiment may sense, at a sixth frame f6, that the switching from the second state to the first state stops. According to an embodiment, as in operation 2160 in FIG. 21, the electronic device 200 may update both the user region UA and the compensation region CA in response to sensing that the switching is stopped. For example, the electronic device 200 may first update a corrected image, displayed through the compensation region CA, at the sixth frame f6 during which it is sensed that the switching is stopped.

Figure 23:
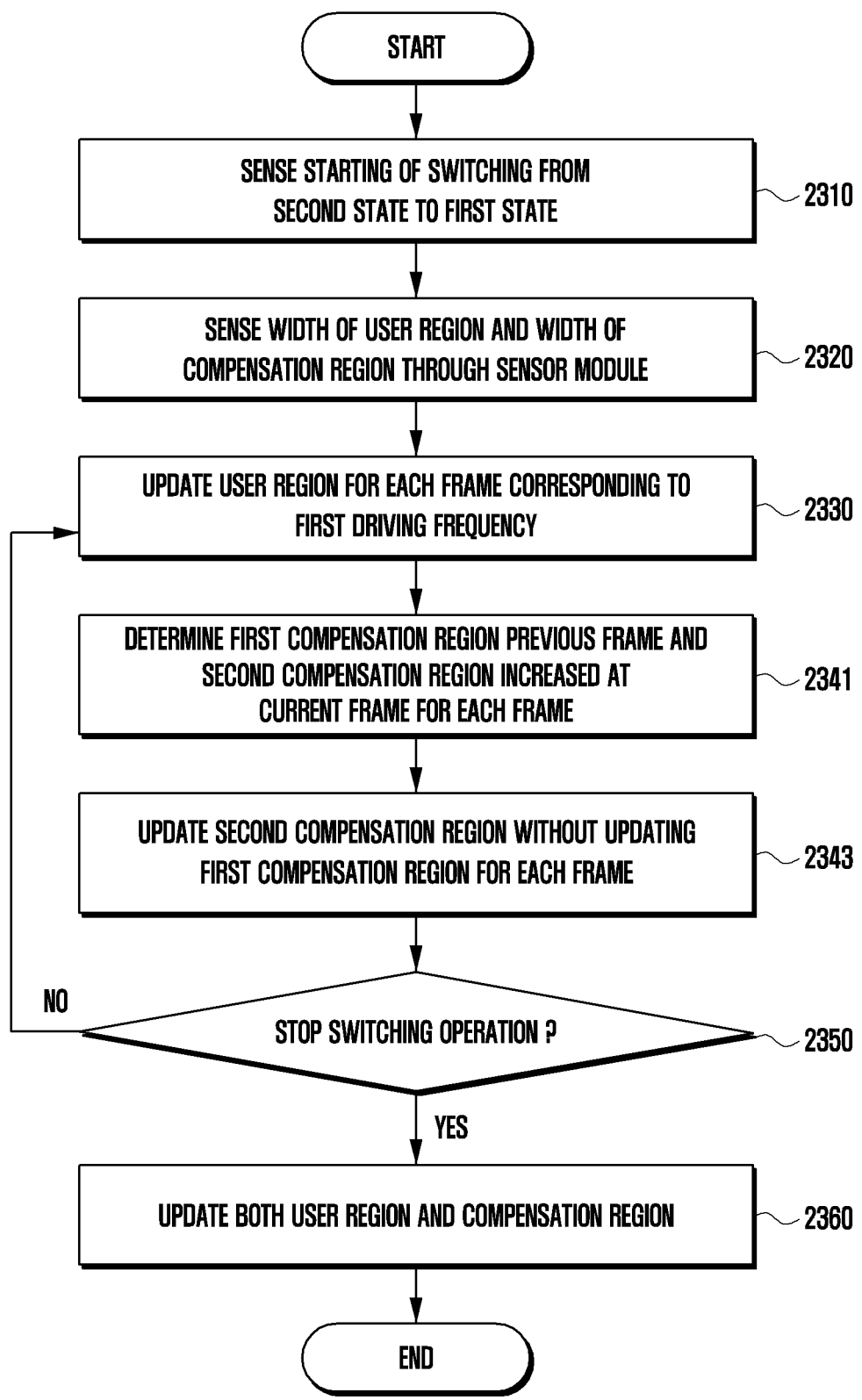
FIG. 23 is an operation flowchart illustrating a method for updating a screen when an electronic device according to another embodiment switches from a second state to a first state.

FIG. 23 is an operation flowchart illustrating a method for updating a screen when the electronic device 200 according to another embodiment switches from a second state to a first state.

At least some of the operations illustrated in FIG. 23 may be omitted. At least some operations described with reference to other drawings herein may be added before or after at least some operations illustrated in FIG. 23. The operations illustrated in FIG. 23 may be performed by the processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 23.

In operation 2310, the electronic device 200 according to an embodiment may detect initiation of a switch from a second state to a first state. For example, the electronic device 200 may detect that the second region 232 begins a retraction into the inner space of a housing (e.g., the housing 240 in FIG. 2).

In operation 2320, the electronic device 200 according to an embodiment may detect the width of a user region UA and the width of a compensation region CA through the sensor module 176. For example, the electronic device 200 may detect that, while the device switches from the second state to the first state, the width of the user region UA decreases and the width of the compensation region CA increases.

In operation 2330, the electronic device 200 according to an embodiment may update the user region UA for each frame corresponding to a first driving frequency. For example, the electronic device 200 may detect, for each frame, the width of a current user region UA, and may update a user screen based on the detected width of the user region UA.

In operation 2341, the electronic device 200 according to an embodiment may determine, for each frame, a first compensation region CA1 of a previous frame and a second compensation region CA2 increased at a current frame. For example, the electronic device 200 may determine, for each frame, the first compensation region CA1, which was the compensation region CA of the previous frame, in a current compensation region CA, and the second compensation region CA2 newly added (or increased) at the current frame.

In operation 2343, the electronic device 200 according to an embodiment may update the second compensation region CA2 for each frame, but may omit update of the first compensation region CA1. For example, when the width of the compensation region CA increases at a current frame, the electronic device 200 may update a compensation image with respect to the increased width of the compensation region CA, but may omit update of a compensation image of a previous frame.

In operation 2350, the electronic device 200 according to an embodiment may detect whether the switching from the second state to the first state is stopped. For example, the electronic device 200 may detect whether increase in the width of the compensation region CA ceases. A state in which the electronic device 200 determines that the width of the compensation region CA ceases increase may include the case in which the electronic device 200 has completed the switch to the first state, or the case in which the electronic device 200 stops in the interim third state.

When it is detected that the switching from the second state to the first state ceases (e.g., when the result of operation 2350 is Yes), the electronic device 200 according to an embodiment may perform operation 2360.

When it is not detected that the switching from the second state to the first state stops (e.g., when the result of operation 2350 is No), the electronic device 200 according to an embodiment may reperform operation 2330.

In operation 2360, the electronic device 200 according to an embodiment may update both the user region UA and the compensation region CA.

Figure 24:
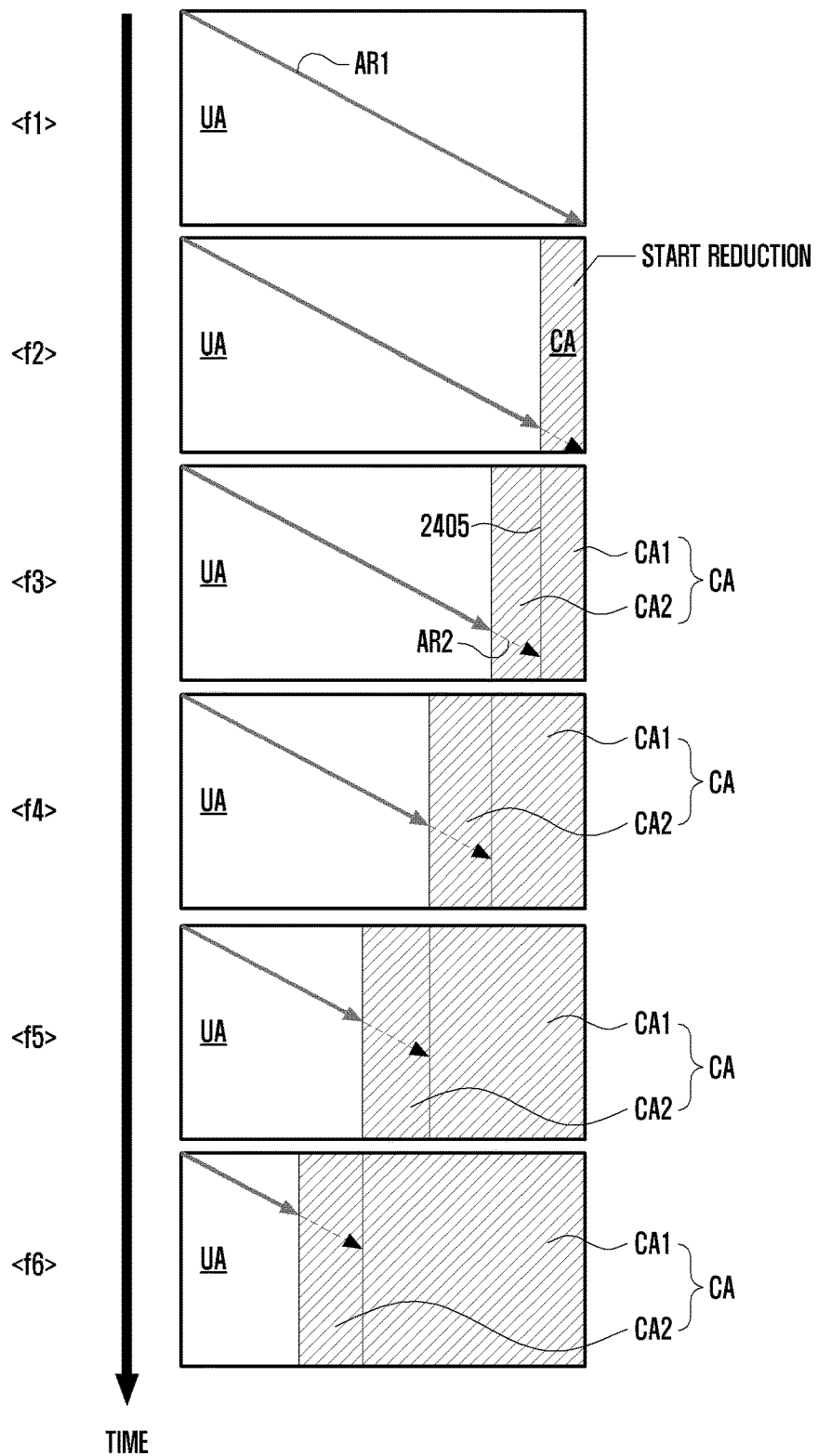
FIG. 24 illustrates a method for, when an electronic device according to another embodiment switches from a second state to a first state, updating a screen on the basis of a time point of sensing the switching.

FIG. 24 illustrates a method for, when the electronic device 200 according to another embodiment switches from a second state to a first state, updating a screen on the basis of a time point of sensing the switching.

In FIG. 24, the longitudinal direction indicates time, a first frame to a sixth frame f1, f2, f3, f4, f5, and f6 are illustrated.

In FIG. 24, UA may indicate a user region UA, and CA may indicate a compensation region CA.

In operation 24, CA1 may indicate a first compensation region CA1, which was a compensation region CA of a previous frame, in the compensation region CA.

In operation 24, CA2 may indicate a second compensation region CA2, which has been newly added (or increased) at a current frame, in the compensation region CA.

In FIG. 24, AR1 may indicate that an update operation for the user region UA is performed, and AR2 may indicate that an update operation for the compensation region CA is performed.

In FIG. 24, line 2405, which divides the compensation region CA, is a boundary line between the first compensation region CA1 and the second compensation region CA2, and may imply a light emission frequency boundary line and/or a driving frequency boundary line by which the electronic device 200 divides a driving frequency and is driven.

Referring to FIG. 24, at a second frame f2, switching of the electronic device 200 according to an embodiment from the second state to the first state may start. The electronic device 200 according to an embodiment may update both the user region UA and the compensation region CA at the second frame f2.

The electronic device 200 according to an embodiment may sense that, during a third frame to a sixth frame f3 to f6, the width of the user region UA continuously decreases and the width of the compensation region CA continuously increases. The electronic device 200 according to an embodiment may update both the user region UA and the compensation region CA for each frame on the basis of the continuous increasing of the width of the compensation region CA during the third frame to the sixth frame f3 to f6. As in operation 2343 in FIG. 23, the electronic device 200 according to an embodiment may update the second compensation region CA2 for each frame, but may not update the first compensation region CA1. For example, when the width of the compensation region CA increases at a current frame, the electronic device 200 may update a compensation image with respect to the increased width of the compensation region CA, but may not update a compensation image of a previous frame.

The electronic device 200 according to an embodiment may configure a boundary line 2405 between the first compensation region CA and the second compensation region CA2 as a driving frequency boundary line, may drive the second compensation region CA2 and the user region UA at a first driving frequency, and may drive the first compensation region CA1 at a second driving frequency that is equal to or lower than the first driving frequency. The electronic device 200 according to an embodiment may configure the boundary line 2405 between the first compensation region CA and the second compensation region CA2 as a light emission frequency boundary line, may drive the second compensation region CA2 and the user region UA at a first light emission frequency, and may drive the first compensation region CA1 at a second light emission frequency that is equal to or lower than the first light emission frequency.

Figure 25:
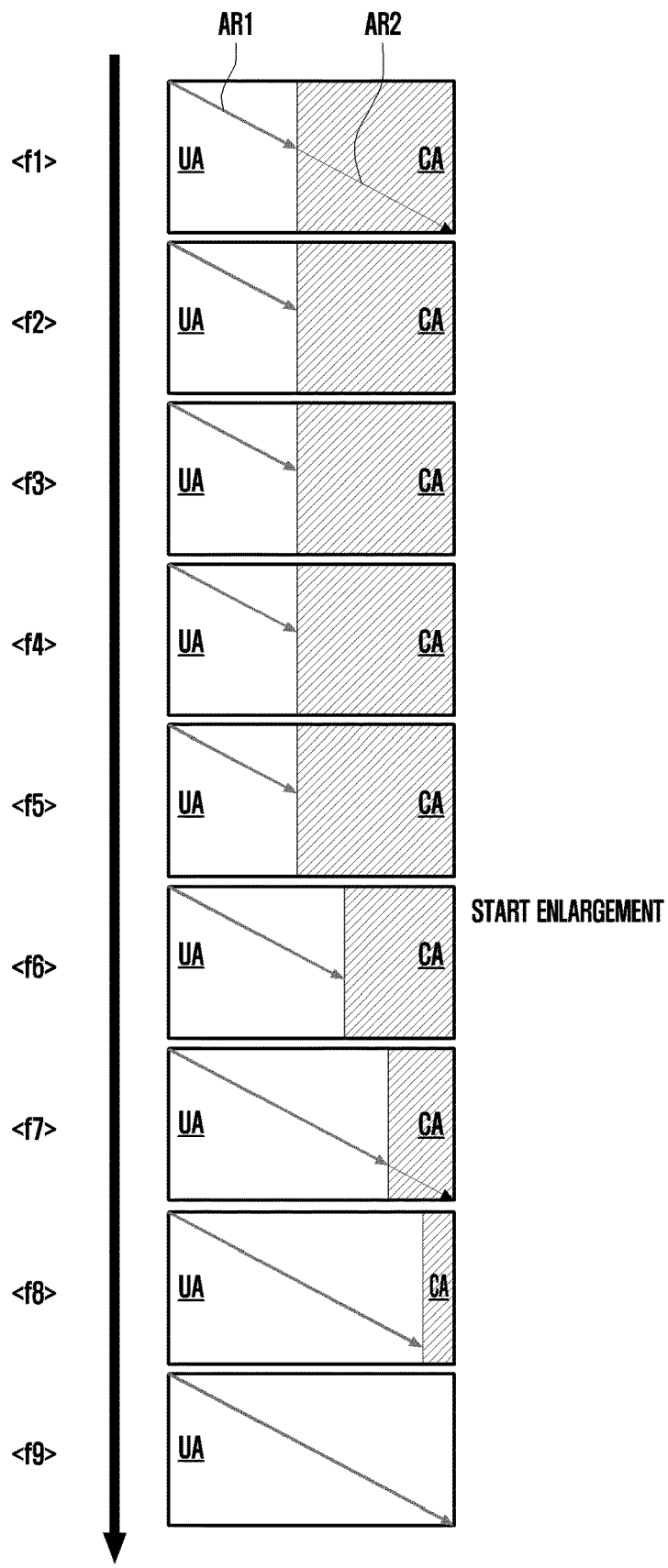
FIG. 25 illustrates a method for, when an electronic device according to another embodiment switches from a first state to a second state, updating a compensation image regardless of a time point of initially sensing the switching.

FIG. 25 illustrates a method for, when the electronic device 200 according to another embodiment switches from a first state to a second state, updating a compensation image regardless of a time point of initially sensing the switching.

In FIG. 25, the longitudinal direction indicates time, a first frame to a ninth frame f1, f2, f3, f4, f5, f6, f7, f8, and f9 are illustrated.

In FIG. 25, UA may indicate a user region UA, and CA may indicate a compensation region CA.

In FIG. 25, AR1 may indicate that an update operation for the user region UA is performed, and AR2 may indicate that an update operation for the compensation region CA is performed.

Referring to FIG. 25, the electronic device 200 according to an embodiment may control a driving frequency of the first region 231 and a driving frequency of the second region 232 on the basis of an internal counter with reference to a time point of turning-on of the flexible display 230. According to an embodiment, the electronic device 200 may update a compensation image on the basis of the internal counter, regardless of a time point of sensing switching from the first state to the second state. For example, a component for generating a compensation image, for example, the processor 120 or the DDI 930, may predict, in advance, a time point at which the compensation image is updated, and may prepare, in advance, a compensation image without a frame buffer memory (not shown).

Referring to FIG. 25, during a first frame to a fifth frame f1 to f5, the electronic device 200 may maintain the first state, and may update the user region UA for each frame. According to an embodiment, the electronic device 200 may update the compensation region CA (i.e., the second region 232) at the first frame f1.

The electronic device 200 according to an embodiment may sense switching from the first state to the second state at a sixth frame f6. According to an embodiment, despite the sensing, the electronic device 200 may not update the compensation region CA.

The electronic device 200 according to an embodiment may update the compensation region CA at a seventh frame f7 at which a specific time has elapsed based on the internal counter since the first frame f1 at which the compensation region CA was updated. That is, an operation of updating the compensation region CA by the electronic device 200 may be performed independently of sensing that the shape of the electronic device 200.

Figure 26:
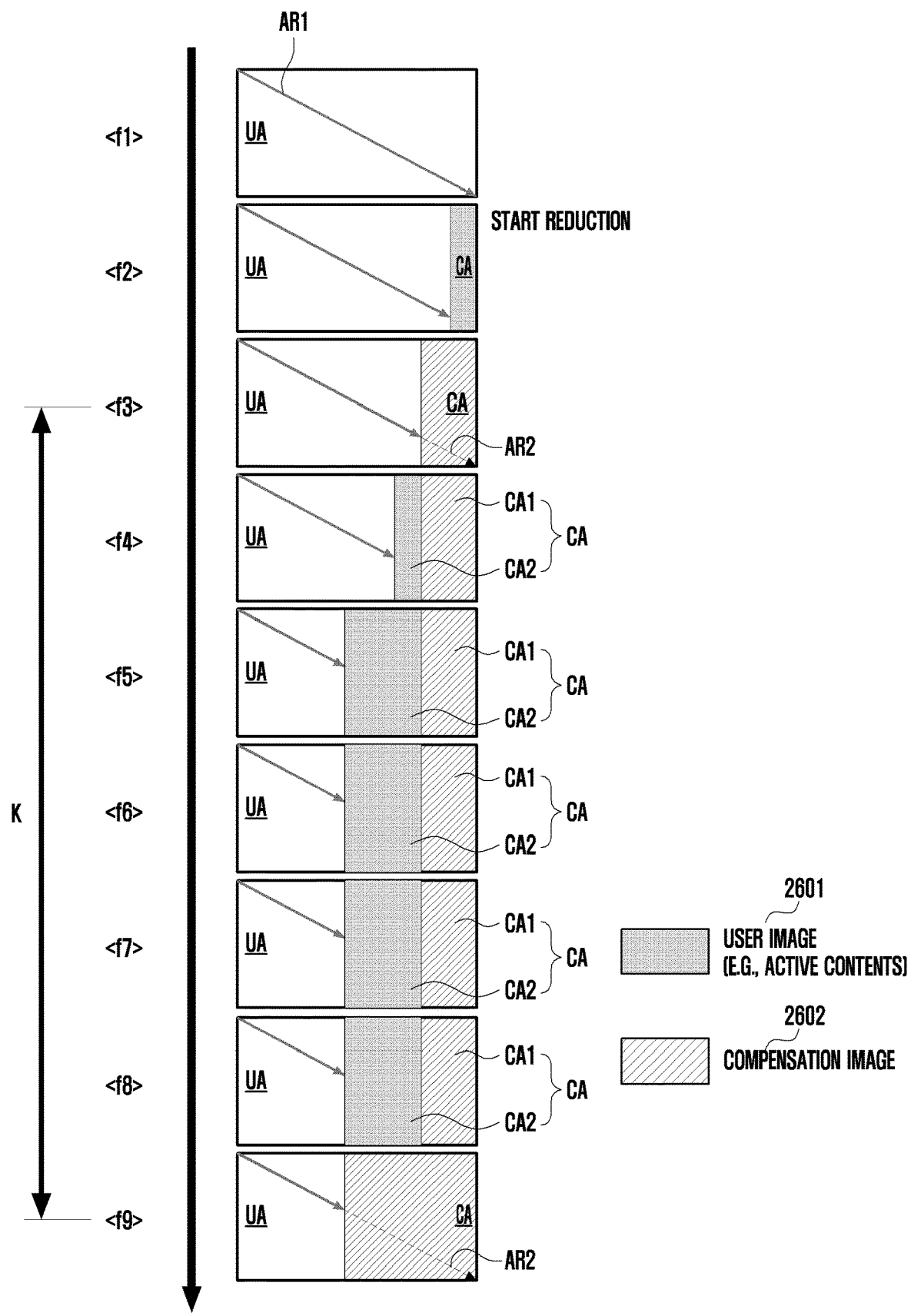
FIG. 26 illustrates a method for, when an electronic device according to another embodiment switches from a second state to a first state, updating a compensation image regardless of a time point of initially sensing the switching.

FIG. 26 illustrates a method for, when the electronic device 200 according to another embodiment switches from a second state to a first state, updating a compensation image regardless of a time point of initially sensing the switching.

In FIG. 26, the longitudinal direction indicates time, a first frame to a ninth frame f1, f2, f3, f4, f5, f6, f7, f8, and f9 are illustrated.

In FIG. 26, UA may indicate a user region UA, and CA may indicate a compensation region CA.

In FIG. 26, AR1 may indicate that an update operation for the user region UA is performed, and AR2 may indicate that an update operation for the compensation region CA is performed.

In operation 26, a portion illustrated as hatching 2601 may indicate that the corresponding portion displays a previous user screen.

In operation 26, a portion illustrated as hatching 2602 may indicate that the corresponding portion displays a compensation image.

In FIG. 26, CA1 may indicate a first compensation region CA1 updated at a previous period.

In FIG. 26, CA2 may indicate a second compensation region CA2 newly added (or increased) after the first compensation region CA1 was updated at the previous period.

Referring to FIG. 26, at a second frame, switching of the electronic device 200 according to an embodiment from the second state to the first state may start. According to an embodiment, the electronic device 200 may update the compensation region CA at a specific period based on an internal counter, regardless of a time point of initially sensing the switching. For example, the electronic device 200 may update the compensation region CA at a third frame f3, and may update the compensation region CA at a ninth frame f9 at which designated k frames have elapsed. According to an embodiment, the electronic device 200 may not update the compensation region CA during a fourth frame to an eighth frame f4 to f8. For example, the electronic device 200 may perform control such that, during the fourth frame to the eighth frame f4 to f8, the first compensation region CA1, updated at a previous period (i.e., the third frame f3) continuously displays a compensation image and the newly added (or increased) second compensation region CA2 displays a previous user screen. The previous user screen may include a portion of a user screen displayed through the corresponding region at a previous frame.

Figure 27:
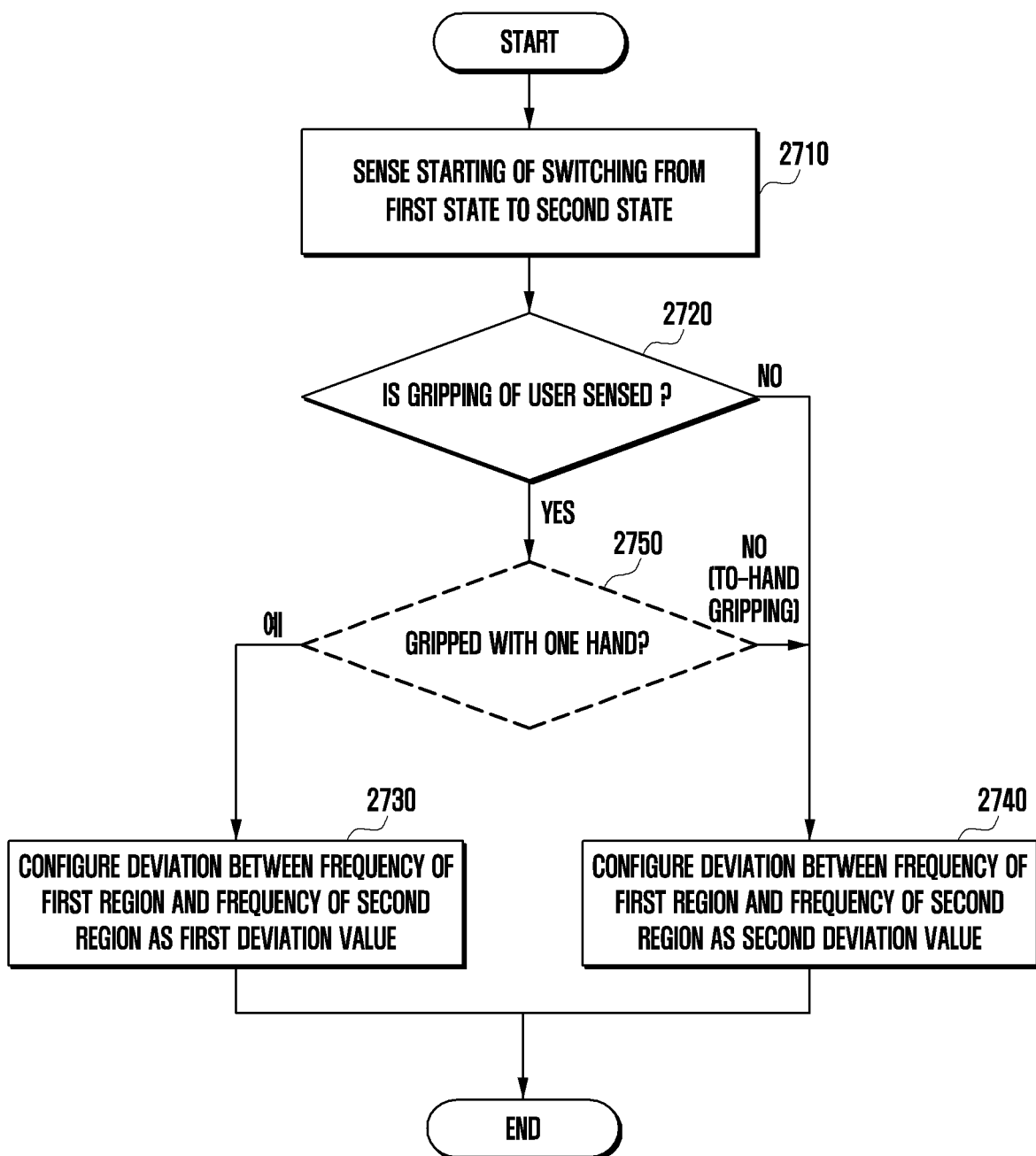
FIG. 27 is a flowchart of operations which an electronic device according to certain embodiments performs based on gripping of a user.

FIG. 27 is a flowchart of operations which the electronic device 200 according to certain embodiments performs based on gripping of a user.

At least some of the operations illustrated in FIG. 27 may be omitted. At least some operations described with reference to other drawings herein may be added before or after at least some operations illustrated in FIG. 27. The operations illustrated in FIG. 27 may be performed by the processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 27.

In operation 2710, the electronic device 200 according to an embodiment may detect starting of switching from a first state to a second state. For example, the electronic device 200 may detect that the second region 232 begins extraction from the inner space of a housing (e.g., the housing 240 in FIG. 2).

In operation 2720, the electronic device 200 according to an embodiment may detect a grip of the user on the electronic device 200 through the sensor module 176. For example, the electronic device 200 may detect that the user grips at least a portion of the housing 240.

According to an embodiment, the electronic device 200 may perform operation 2730 when the gripping of the user is sensed (e.g., when the result of operation 2720 is Yes).

According to an embodiment, the electronic device 200 may perform operation 2750 when the gripping of the user is not sensed (e.g., when the result of operation 2720 is No).

In operation 2730, the electronic device 200 according to an embodiment may determine whether the grip of the user is one-handed or two-handed. For example, the electronic device 200 may determine whether the user grips the electronic device 200 with one hand or whether the user grips the electronic device 200 with two hands. According to an embodiment, the electronic device 200 may determine one-hand gripping or two-hand gripping using a grip sensor and/or by performing analysis of a detected area in which the touch input is indicated.

According to an embodiment, the electronic device 200 may perform operation 2740 when the grip of the user is one-handed (e.g., when the result of operation 2730 is Yes).

According to an embodiment, the electronic device 200 may perform operation 2750 when the gripping of the user is not one-handed (or is two-hand gripping) (e.g., when the result of operation 2730 is No).

In operation 2740, the electronic device 200 according to an embodiment may configure, as a first deviation value, the deviation between the frequency of the first region 231 and the frequency of the second region 232.

In operation 2750, the electronic device 200 according to an embodiment may configure, as a second deviation value greater than the first deviation value, the deviation between the frequency of the first region 231 and the frequency of the second region 232.

According to certain embodiments, when the flexible display 230 switches from the first state to the second state, and when the deviation between driving frequencies (or light emission frequencies) of the first region 231 and the second region 232 is sufficient large (e.g., greater than a certain preset threshold), a difference in image quality may be viewed in a boundary region between the first region 231 and the second region 232. When the user grips the electronic device 200, the electronic device 200 according to certain embodiments may determine that the user will switch the electronic device from the first state to the second state, and configure the deviation between the frequency of the first region 231 and the frequency of the second region 232 as the first deviation value, which is a relatively smaller value.

When the user does not grip the electronic device 200, the electronic device 200 according to certain embodiments may determine that the user will not perform switching from the first state to the second state is low, and may configure, as in operation 2750, the deviation between the frequency of the first region 231 and the frequency of the second region 232 as the second deviation value, which is a relatively larger value than the first deviation value. For example, while being placed on the floor or placed on a holder, the electronic device 200 may reduce the driving frequency and/or light emission frequency of the second region 232 to drive the same.

When the user grips the electronic device 200, the electronic device 200 according to certain embodiments may separately detect a case in which the user grips the opposite side surfaces of the housing 240 of the electronic device 200 and the case in which the user grips one side surface of the housing 240.

When one side surface of the housing 240 of the electronic device 200 is gripped, the electronic device 200 according to certain embodiments may determine that the user is switch the electronic device from the first state to the second state, and may set, as in operation 2740, the deviation between the frequency of the first region 231 and the frequency of the second region 232 as the first deviation value, which is relatively small value.

When the opposite side surfaces of the housing 240 of the electronic device 200 are gripped, the electronic device 200 according to certain embodiments may determine the user will not the electronic device from the first state to the second state, and may configure, as in operation 2750, the deviation between the frequency of the first region 231 and the frequency of the second region 232 as the second deviation value which may be larger than the first deviation value.

Figure 28:
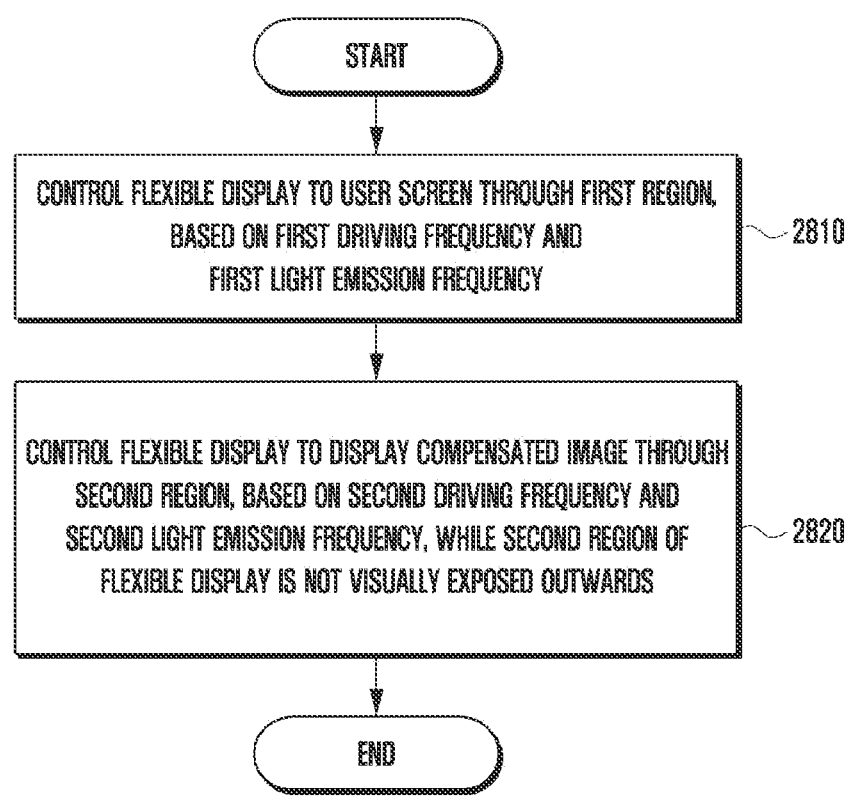
FIG. 28 is a flowchart of operations of an electronic device according to certain embodiments.

FIG. 28 is a flowchart of operations of the electronic device 200 according to certain embodiments.

At least some of the operations illustrated in FIG. 28 may be omitted. At least some operations described with reference to other drawings herein may be added before or after at least some operations illustrated in FIG. 28. The operations illustrated in FIG. 28 may be performed by the processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 28.

In operation 2810, in a first state in which the second region 232 is not visually exposed to an exterior environment, the electronic device 200 according to an embodiment may control the flexible display 230 to display a user screen through the first region 231 based on a first driving frequency and a first light emission frequency. According to an embodiment, in the first state, the electronic device 200 may update the user screen for each frame corresponding to the first driving frequency. According to an embodiment, in the first state, the electronic device 200 may control the first region 231 to display the user screen for a first light emission time corresponding to the first light emission frequency.

In operation 2820, in the first state, in which the second region 232 is not visually exposed to an exterior environment, the electronic device 200 according to an embodiment may control the flexible display 230 to display a compensation image through the second region 232 based on a second driving frequency, and a second light emission frequency. According to an embodiment, the second driving frequency may be equal to or less than the first driving frequency, and the second light emission frequency may be equal to or less than the first light emission frequency. According to an embodiment, the electronic device 200 may update the compensation image at a k (k>1) frame period corresponding to the second driving frequency. According to an embodiment, the electronic device 200 may control the second region 232 to display the compensation image for a second light emission time corresponding to the second light emission frequency, and the second light emission time may be shorter than the first light emission time.

Figure 29:
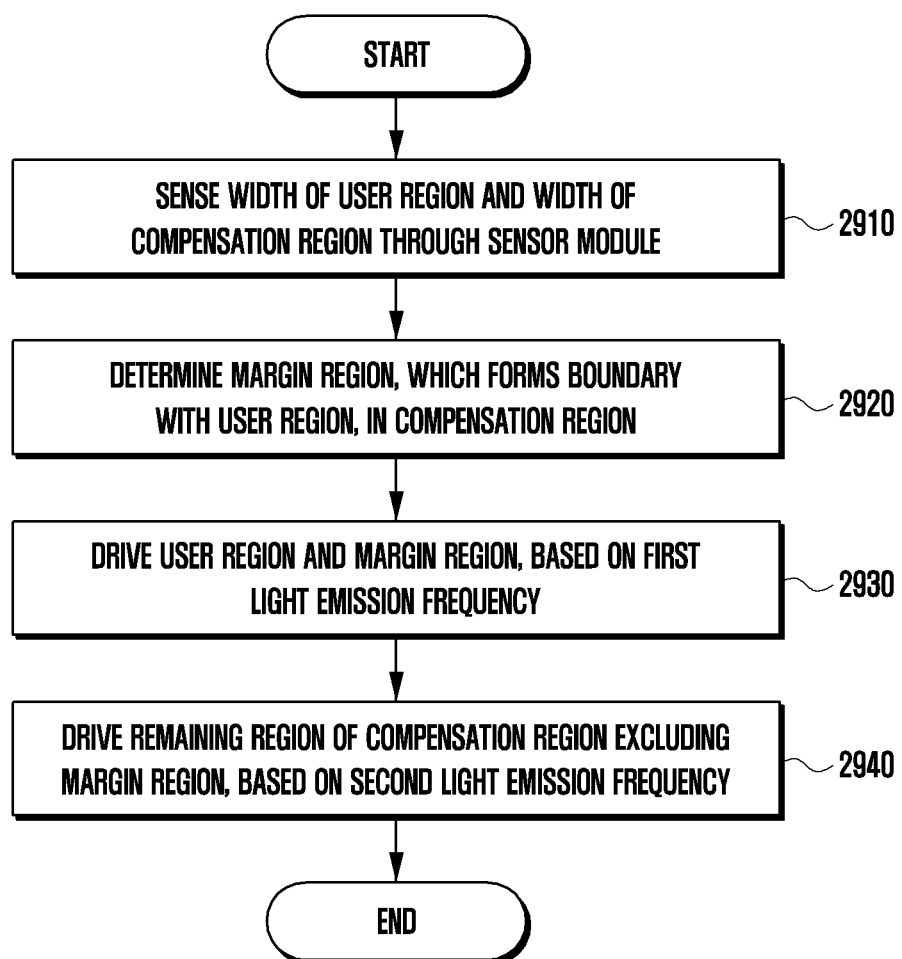
FIG. 29 is a flowchart of operations which an electronic device according to certain embodiments performs in consideration of a margin region.

FIG. 29 is a flowchart of operations which the electronic device 200 according to certain embodiments performs in consideration of a margin region.

At least some of the operations illustrated in FIG. 29 may be omitted. At least some operations described with reference to other drawings herein may be added before or after at least some operations illustrated in FIG. 29. The operations illustrated in FIG. 29 may be performed by the processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 29.

In operation 2910, the electronic device 200 according to an embodiment may detect the width of a user region UA and the width of a compensation region CA through the sensor module 176. For example, the electronic device 200 may detect the width of the user region UA and the width of the compensation region CA while the electronic device 200 is in a first state, switching from the first state to a second state, or switching from the second state to the first state.

In operation 2920, the electronic device 200 according to an embodiment may determine a margin region, which forms a boundary with the user region UA, in the compensation region CA. For example, the margin region may be a portion of the compensation region CA, and/or a region which forms a boundary with the user region UA.

In operation 2930, the electronic device 200 according to an embodiment may drive display within the user region UA and the margin region based on a first light emission frequency. For example, the electronic device 200 may drive display, using the first light emission frequency, not only within the user region UA but also in the margin region which is a portion of the compensation region CA adjacent to the user region UA.

In operation 2940, the electronic device 200 according to an embodiment may drive, based on a second light emission frequency, the remaining region of the compensation region CA excluding the margin region.

The electronic device 200 according to certain embodiments may configure the margin region to reduce a visual artifact or phenomenon occurring in a boundary portion between the first region 231 and the second region 232 caused differentiation of light emission frequency between the two regions.

Figure 30:
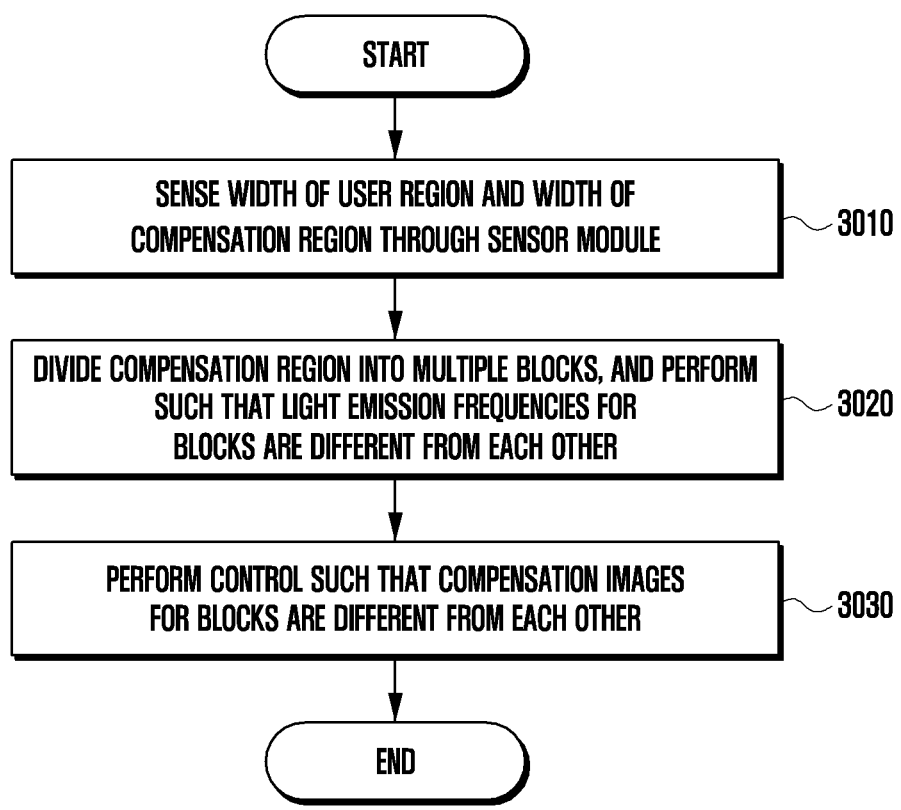
FIG. 30 is a flowchart of operations in which an electronic device according to certain embodiments divides a compensation region into multiple blocks and controls a compensation image.

FIG. 30 is a flowchart of operations in which the electronic device 200 according to certain embodiments divides a compensation region into multiple blocks and controls a compensation image.

At least some of the operations illustrated in FIG. 30 may be omitted. At least some operations described with reference to other drawings herein may be added before or after at least some operations illustrated in FIG. 30. The operations illustrated in FIG. 30 may be performed by the processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 30.

In operation 3010, the electronic device 200 according to an embodiment may detect the width of a user region UA and the width of a compensation region CA through the sensor module 176. For example, the electronic device 200 may detect the width of the user region UA and the width of the compensation region CA while the electronic device 200 is in a first state, switching from the first state to a second state, or switching from the second state to the first state.

In operation 3020, the electronic device 200 according to an embodiment may divide the compensation region CA into multiple blocks, and control each block such that light emission frequencies for each respective block is different. For example, the electronic device 200 may divide the compensation region CA into at least two blocks, and may drive each of the at least two blocks at different light emission frequencies.

In operation 3030, the electronic device 200 according to an embodiment may control the compensation images for the respective blocks to be different from each other. According to an embodiment, the electronic device 200 may display a compensation image having a relatively high average gradient with respect to some blocks of the compensation region CA which are driven at a relatively low light emission frequency, and may display a compensation image having a relative low average gradient with respect to other blocks of the compensation region CA at a relatively high light emission frequency. For example, the electronic device 200 may divide the compensation region CA into at least one first block, which is driven at a third light emission frequency, and at least one second block, which is driven at a fourth light emission frequency that is lower than the third light emission frequency. Furthermore, while the at least one first block is driven at the third light emission frequency, corresponding blocks may display a first compensation image having a first average gradient value. While the at least one second blocks are driven at the fourth light emission frequency, the corresponding blocks may display a second compensation image having a second average gradient value that is higher than the first average gradient value.

Figure 31:
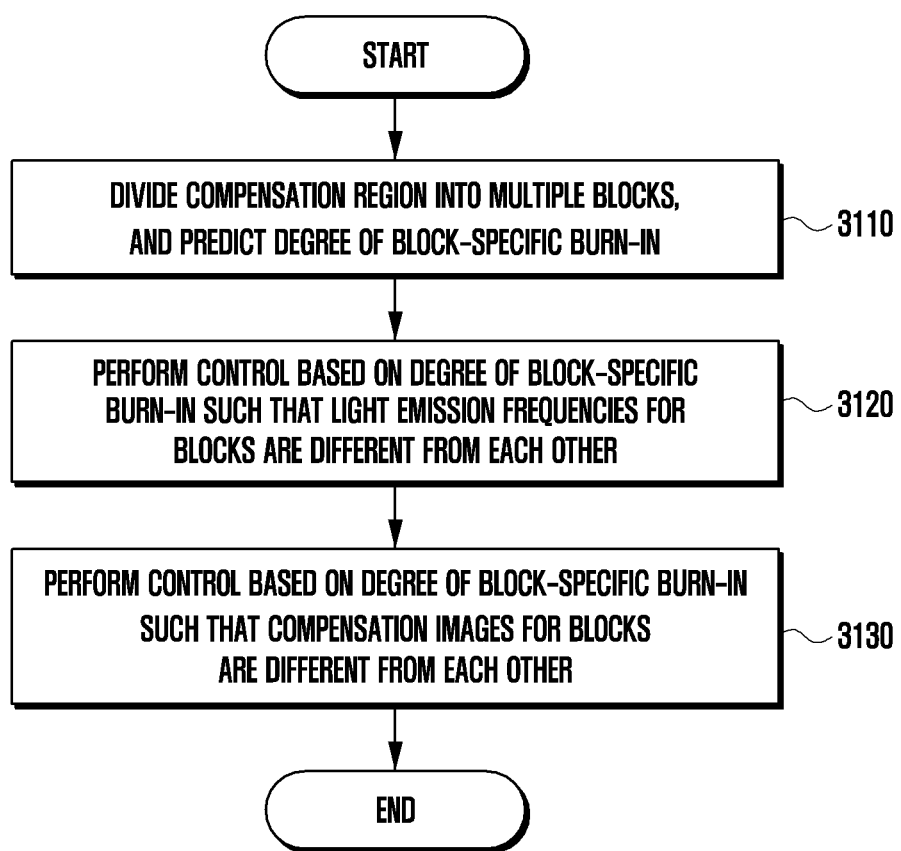
FIG. 31 is a flowchart illustrating an operation of controlling a compensation image on the basis of the degree of block-specific burn-in of an electronic device according to certain embodiments.

FIG. 31 is a flowchart illustrating an operation of controlling a compensation image on the basis of the degree of block-specific burn-in of the electronic device 200 according to certain embodiments.

At least some of the operations illustrated in FIG. 31 may be omitted. At least some operations described with reference to other drawings herein may be added before or after at least some operations illustrated in FIG. 31. The operations illustrated in FIG. 31 may be performed by the processor 120 (e.g., the processor 120 in FIG. 1). For example, a memory (e.g., the memory 130 in FIG. 1) of an electronic device (e.g., the electronic device 101 in FIG. 1) may store instructions which, when being executed, cause the processor 120 to perform at least some operations illustrated in FIG. 31.

In operation 3110, the electronic device 200 according to an embodiment may divide a compensation region CA into multiple blocks, and may predict the degree of block-specific burn-in.

In operation 3120, the electronic device 200 according to an embodiment, based on the predicted block-specific burn-in, may set light emission frequencies for each respective block to be different from each other. For example, the electronic device 200 may determine, based on the predicted degree of block-specific burn-in, light emission frequencies for each respective block.

In operation 3130, the electronic device 200, according to an embodiment, based on the predictive degree of block-specific burn-in, may set compensation images for each respective block to be different from each other. Operation 3130 may be at least partially similar or identical operation 3030 in FIG. 30.

According to certain embodiments, as shown in Table 1, the electronic device 200 may adjust, based on the remaining capacity (e.g., a charge level) of a battery, the driving frequency and light emission frequency of the first region 231 and the driving frequency and light emission frequency of the second region 232.

Figure 32:
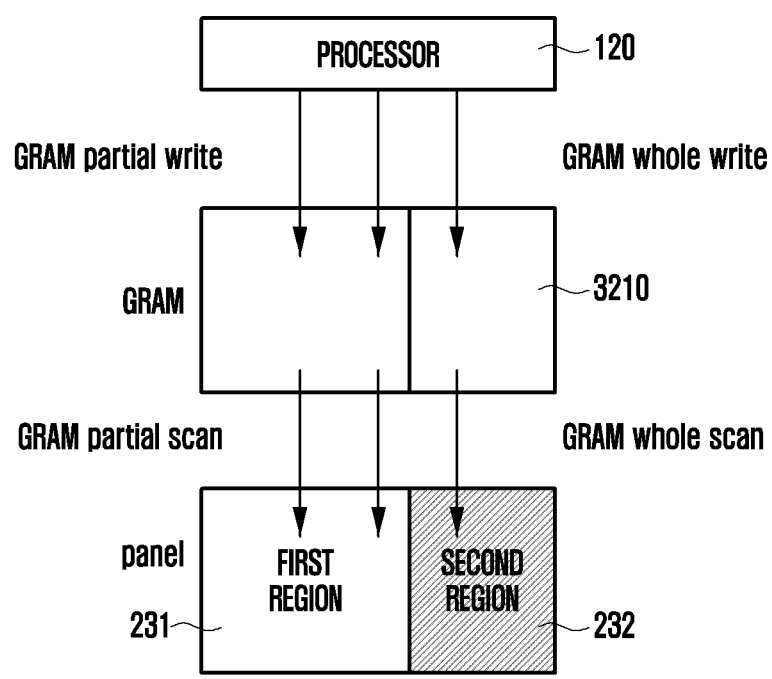
FIG. 32 illustrates an example in which an electronic device according to an embodiment generates a compensation image in a processor.

FIG. 32 illustrates an example in which the electronic device 200 according to an embodiment generates a compensation image in a processor 120.

Referring to FIG. 32, the electronic device 200 according to an embodiment may generate a compensation image in the processor 120. According to an embodiment, the processor 120 may generate the compensation image, and may supply the generated compensation image to GRAM 3210 (e.g., the memory 933 in FIG. 9). According to an embodiment, the processor 120 may control the flexible display 230 to perform image updating for the first region 231 (or, the user region UA) and the second region 232 (or the compensation region CA) through a read/write operation (scan/write operation) for the entire region of the flexible display 230 and a partial read/write operation (partial scan/write operation) of the flexible display 230 with reference to GRAM (3210) (e.g., the memory 933 in FIG. 9).

Figure 33:
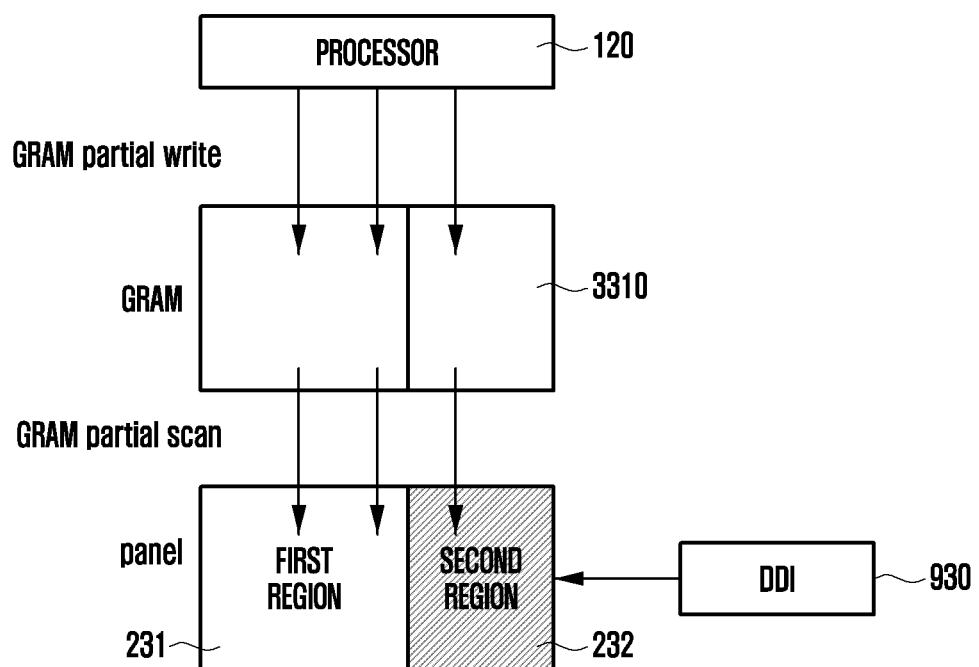
FIG. 33 illustrates an example in which an electronic device according to another embodiment itself generates a compensation image in a DDI.

FIG. 33 illustrates an example in which the electronic device 200 according to another embodiment itself generates a compensation image in the DDI 930.

Referring to FIG. 33, the electronic device 200 according to another embodiment may generate a compensation image in the DDI 930. In another embodiment, the processor 120

TABLE 1

| | | Remaining capacity of battery | | |
|---|---|---|---|---|
| | | First interval (below first reference value) | Second interval (first reference value or greater, not-fully charged state) | Fully charged interval |
| First region 231 | First driving frequency | 120 Hz | 120 Hz | 120 Hz |
| | First light emission frequency | 480 Hz | 120 Hz to 480 Hz | 120 Hz to 480 Hz |
| Second region 232 | Second driving frequency | off | 1 Hz | 1 Hz-120 Hz |
| | Second light emission frequency | Off | 30 Hz to 120 Hz | 120 Hz to 480 Hz |

Referring Table 1, when the remaining capacity of a battery corresponds to a first interval less than a first reference value, the electronic device 200 according to an embodiment may perform control such that the second region 232 omits display of a screen while the second region 232 is not visibly exposed to the exterior environment. According to an embodiment, the first reference value may correspond to a case in which the remaining capacity of the battery is about 15%.

When the remaining capacity of the battery is equal to or greater than the first reference value, and the battery is not fully charged, the electronic device 200 according to an embodiment may set a first light emission frequency and a second light emission frequency to be proportional to the remaining capacity of the battery.

When the battery of the electronic device 200 is charged by receiving power from an external device and when the remaining capacity of the battery is fully charged, the electronic device 200 according to an embodiment may perform control such that a first driving frequency is identical or similar to a second driving frequency, and may perform control that a first light emission frequency is identical or similar to a second light emission frequency.

may perform control such that the DDI 930 generates a compensation image. In another embodiment, the processor 120 may perform control such that the flexible display 230 updates an image of the first region 231 by performing a read/write operation (scan/write operation) for the first region 231 (or, the user region UA) with reference to GRAM 3310 (e.g., the memory 933 in FIG. 9), and may perform control such that the flexible display 230 updates an image of the second region 232 by performing a partial read/write operation (partial scan/write operation) for the second region 232 (or, the compensation region CA) through a compensation image generation logic included in the DDI 930.

The invention claimed is:
1. An electronic device, comprising:
a housing;
a flexible display having a display area that is visually exposed to an external environment and adjustable in size, including:
a first region maintained in exposure to the external environment, and
a second region extendable to increase the display area visually exposed to the external environment, according a configuration of the housing;

a display driver integrated circuit (DDI) configured to drive the flexible display; and
a processor, configured to:
when the housing is disposed in a first state in which the second region is stowed in the housing,
control, via the DDI, the flexible display to display a user interface (UI) screen through the first region based on a first driving frequency and a first light emission frequency, and
control, via the DDI, the flexible display to display a compensation image through the second region based on a second driving frequency and a second light emission frequency,
wherein the second driving frequency is equal to or less than the first driving frequency, and the second light emission frequency is less than the first light emission frequency.

2. The electronic device of claim 1, wherein the processor is further configured to:
in the first state, update the UI screen for each frame that corresponds to the first driving frequency, and
update the compensation image at a k (k>1) frame period corresponding to the second driving frequency.

3. The electronic device of claim 2, wherein the first region and the second region are adjacent to each other along a scan direction of the flexible display, and
wherein the processor is configured to:
in the first state, control the DDI to provide a first scan signal to gate lines disposed in the first region for each frame, and
control the DDI to provide a second scan signal to gate lines disposed in the second region at a k frame period.

4. The electronic device of claim 3, wherein the processor is further configured to:
in the first state, output, during a first frame to a (k−1)th frame, a first horizontal synchronization signal for controlling output timing of the first scan signal in absence of outputting a second horizontal synchronization signal for controlling output timing of the second scan signal, and
output the first horizontal synchronization signal and the second horizontal synchronization signal during a k-th frame.

5. The electronic device of claim 2, wherein the first region and the second region are adjacent to each other along a scan direction of the flexible display, and
wherein the processor is further configured to:
in the first state, control the DDI to provide a first light emission signal to light emission signal lines disposed in the first region for each frame, and
control the DDI to provide a second light emission signal to light emission signal lines disposed in the second region at the k frame period.

6. The electronic device of claim 5, wherein the processor is further configured to:
in the first state, output, from a first frame to a (k−1)th frame, a first light emission clock signal for generating the first light emission signal in absence of outputting a second light emission clock signal for generating the second light emission signal, and
output the first light emission clock signal and the second light emission clock signal during a k-th frame.

7. The electronic device of claim 5, wherein the processor is further configured to:
in the first state, provide the first light emission signal to each of the light emission signal lines disposed in the first region a first number of times for each frame, and
at the k frame period, provide the second light emission signal to each of the light emission signal lines disposed in the second region a second number of times less than the first number of times.

8. The electronic device of claim 2, wherein the first region and the second region are adjacent to each other along a direction perpendicular to a scan direction of the flexible display, and
wherein the processor is configured to:
in the first state, output, for each frame, a first data enable signal for controlling output timing of a data signal supplied to data lines disposed in the first region, and
output, at the k frame period, a second data enable signal for controlling output timing of a data signal supplied to data lines disposed in the second region.

9. The electronic device of claim 8, wherein the processor is further configured to:
in the first state, output the first data enable signal in absence outputting the second data enable signal during a first frame to a (k−1)th frame, and
output the first data enable signal and the second data enable signal during a k-th frame.

10. The electronic device of claim 1, wherein the processor is further configured to:
in the first state, control the first region to display the UI screen for a first light emission time corresponding to the first light emission frequency, and
control the second region to display the compensation image for a second light emission time corresponding to the second light emission frequency,
wherein the second light emission time is shorter than the first light emission time.

11. The electronic device of claim 1, wherein the processor is further configured to:
detect initiation of a switch from the first state to a second state in which the second region is extended out from an inner space of the housing as to be exposed to the external environment,
determine whether a grip is detected contacting the electronic device,
set a first deviation value between the first driving frequency and the second driving frequency when it is determined that the grip is detected, and
set a second deviation value greater than the first deviation value between the first driving frequency and the second driving frequency when the grip is undetected.

12. The electronic device of claim 11, wherein the processor is further configured to:
in the first state, set the first deviation value between the first driving frequency and the second driving frequency when detecting that one side of the housing is gripped, and
set the second deviation value between the first driving frequency and the second driving frequency when detecting that both side surfaces of the housing are gripped.

13. The electronic device of claim 1, wherein the processor is further configured to:
in the first state, when power is received from an external device to charge a battery of the electronic device is, determine a charge level of the battery, and
when the battery is detected as fully charged state, set the first driving frequency and the second driving frequency to a same value, and set the first light emission frequency and the second light emission frequency to have another same value.

14. The electronic device of claim 13, wherein the processor is further configured to:
- when the charge level of the battery is less than a first reference charge value, control the second region to omit display of a screen while the device is disposed in the first state, and
- when the charge level of the battery is equal to or greater than the first reference charge value, increase values of the second driving frequency and the second light emission frequency in proportion to increases in the charge level of the battery.

15. The electronic device of claim 1, wherein the processor is further configured to:
- detect initiation of a switch from the first state to a second state in which the second region is extended out from an inner space of the housing as to be exposed to the external environment, or initiation of a switch from the second state to the first state, and
- while the switch between the first state and the second state is performed, display a compensation image on at least a portion of the second region that is disposed within the inner space of the housing, and
- update the compensation image for each predetermined frame according to the second driving frequency.

16. The electronic device of claim 1, wherein the processor is further configured to:
- detect initiation of a switch from the first state to a second state in which the second region is extended out from an inner space of the housing to be visually exposed to the external environment, or detect initiation of a switch from the second state to the first state, and
- while the switch between the first and second states is performed, display a compensation image on at least a portion of the second region that is disposed within the inner space of the housing, and
- update the compensation image for each frame displayed while the switch is detected.

17. A method of an electronic device including a flexible display, the flexible display having a first region maintained in exposure to an external environment, and a second region extendable to increase a display area exposed to the external environment, the method comprising:
- in a first state in which the second region is stowed in a housing of the electronic device, displaying a user interface (UI) screen on the first region, according to a first driving frequency and a first light emission frequency; and
- displaying a compensation image on the second region, according to a second driving frequency and a second light emission frequency,
- wherein the second driving frequency is equal to or less than the first driving frequency, and
- wherein the second light emission frequency is less than the first light emission frequency.

18. The method of claim 17, further comprising:
- in the first state, updating the UI screen at each frame corresponding to the first driving frequency; and
- updating the compensation image for each frame that corresponds to the second driving frequency.

19. The method of claim 18, further comprising:
- in the first state, displaying the UI screen on the first region for a first light emission time according to the first light emission frequency; and
- displaying the compensation image on the second region for a second light emission time according to the second light emission frequency,
- wherein the second light emission time is shorter than the first light emission time.

20. The method of claim 18, further comprising:
- in the first state, controlling the first region to display the UI screen for a first light emission time corresponding to the first light emission frequency; and
- controlling the second region to display the compensation image for a second light emission time corresponding to the second light emission frequency,
- wherein the second light emission time is shorter than the first light emission time.

* * * * *